(12) United States Patent
Li et al.

(10) Patent No.: US 10,819,778 B2
(45) Date of Patent: Oct. 27, 2020

(54) SERVICE DISCOVERY METHOD AND SERVICE DISCOVERY APPARATUS

(71) Applicant: Huawei Technologies Co., Ltd., Shenzhen (CN)

(72) Inventors: Xiaoxian Li, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 16/348,260

(22) PCT Filed: Nov. 8, 2016

(86) PCT No.: PCT/CN2016/105125
§ 371 (c)(1),
(2) Date: May 8, 2019

(87) PCT Pub. No.: WO2018/085996
PCT Pub. Date: May 17, 2018

(65) Prior Publication Data
US 2019/0320017 A1    Oct. 17, 2019

(51) Int. Cl.
*H04L 29/08* (2006.01)
*H04W 40/24* (2009.01)
(Continued)

(52) U.S. Cl.
CPC ....... *H04L 67/1065* (2013.01); *H04W 40/246* (2013.01); *H04W 40/32* (2013.01); *H04W 84/12* (2013.01); *H04W 84/18* (2013.01)

(58) Field of Classification Search
None
See application file for complete search history.

(56) References Cited

U.S. PATENT DOCUMENTS

2006/0171403 A1    8/2006    Kim et al.
2007/0165544 A1*   7/2007    Zhang .................... H04L 45/12
                                                          370/254
(Continued)

FOREIGN PATENT DOCUMENTS

CN          102461314 A      5/2012
CN          104144465 A     11/2014
(Continued)

OTHER PUBLICATIONS

Foreign Communication From a Counterpart Application, European Application No. 16921359.2, Extended European Search Report dated Sep. 11, 2019, 9 pages.

(Continued)

*Primary Examiner* — Yaotang Wang
(74) *Attorney, Agent, or Firm* — Conley Rose, P.C.

(57) ABSTRACT

A service discovery method and a service discovery apparatus enable a NAN device that does not support a multi-hop service discovery not to respond to a relayed multi-hop service discovery message on the premise that the relayed service discovery message is correctly received by a NAN device that supports the multi-hop service discovery. The method includes: receiving, by a second NAN device, a first service discovery message that is sent by a first NAN device and that is used for a service discovery; and generating, by the second NAN device based on the first service discovery message, a second service discovery message used for the service discovery, and sending the second service discovery message, where the second NAN device serves as a service relay device that relays the service discovery initiated by the first NAN device.

16 Claims, 17 Drawing Sheets

(51) Int. Cl.
*H04W 40/32* (2009.01)
*H04W 84/12* (2009.01)
*H04W 84/18* (2009.01)

(56) References Cited

U.S. PATENT DOCUMENTS

| | | |
|---|---|---|
| 2010/0271959 A1 | 10/2010 | Qi et al. |
| 2014/0254569 A1 | 9/2014 | Abraham et al. |
| 2014/0269402 A1 | 9/2014 | Vasseur et al. |
| 2016/0073330 A1 | 3/2016 | Patil et al. |
| 2016/0223333 A1* | 8/2016 | Thakur .................. G01C 21/20 |
| 2016/0323925 A1* | 11/2016 | Alanen ................. H04W 8/005 |
| 2017/0048788 A1 | 2/2017 | Chen et al. |
| 2017/0055305 A1* | 2/2017 | Kurian .................. H04W 76/14 |
| 2017/0280377 A1* | 9/2017 | Patil .................. H04W 12/0013 |

FOREIGN PATENT DOCUMENTS

| | | |
|---|---|---|
| CN | 105052091 A | 11/2015 |
| CN | 105100137 A | 11/2015 |
| CN | 105122852 A | 12/2015 |

OTHER PUBLICATIONS

Foreign Communication From a Counterpart Application, Chinese Application No. 201680080799.7, Chinese Office Action dated Oct. 25, 2019, 5 pages.

Machine Translation and Abstract of Chinese Publication No. CN104144465, Nov. 12, 2014, 74 pages.

Foreign Communication From a Counterpart Application, PCT Application No. PCT/CN2016/105125, English Translation of International Search Report dated Jul. 26, 2017, 2 pages.

Foreign Communication From a Counterpart Application, PCT Application No. PCT/CN2016/105125, English Translation of Written Opinion dated Jul. 26, 2017, 5 pages.

* cited by examiner

SERVICE DISCOVERY METHOD AND SERVICE DISCOVERY APPARATUS

CROSS-REFERENCE TO RELATED APPLICATIONS

This application is a national stage of International Application No. PCT/CN2016/105125, filed on Nov. 8, 2016, which is hereby incorporated by reference in its entirety.

TECHNICAL FIELD

The present invention relates to the communications field, and in particular, to a service discovery method and a service discovery apparatus.

BACKGROUND

With the beginning of a mobile Internet era, a mainstream pattern in the Internet industry is social, localized, and mobile. Mobile devices equipped with Wireless Fidelity (Wireless Fidelity, Wi-Fi for short) interfaces are widely used in various industries because of high transmission rates of the Wi-Fi interfaces. With improvement of a Wi-Fi technology, a neighbor awareness networking (Neighbor Awareness Networking, NAN for short) technology based on the Wi-Fi technology is becoming a hotspot in the industry. The NAN technology allows all devices participating in NAN to be synchronized without a control center, namely, a central node. NAN maintenance and a service discovery are performed in a NAN-agreed discovery window (Discovery window, DW for short). In this way, a Wi-Fi device continuously discovers a nearby device and application and nearby information before creating a connection, and a user may configure the application to publish the user's information and application acceptance information.

In a typical application scenario of a NAN cluster (Cluster), a service discovery is performed between devices before association. To perform the service discovery between the devices, the devices (which may be referred to as NAN devices) in the NAN cluster need to keep synchronized, so that the device in the NAN cluster can work on a discovery channel in a DW and perform a service discovery and cluster synchronization. A NAN device may send a service discovery (Service Descriptor Frame, SDF for short) message in a DW, and notify, by adding a matching identifier indicating service information, another NAN device in a NAN network in which the NAN device is located of a service that needs to be subscribed to or published by the NAN device. Further, the NAN device exchanges the SDF message with some NAN devices, to further determine information used for subsequently establishing a data link for service data exchange. The SDF message may be a service publish (SDF Publish) message, a service query (SDF Subscribe) message, a service follow-up (SDF Follow-Up) message, or the like.

With the development of technologies, a NAN device develops from a NAN device supporting only a single-hop service discovery into a NAN device supporting a multi-hop service discovery. When an SDF message is applied to the multi-hop service discovery, the new NAN device supporting the multi-hop service discovery may determine, based on the received SDF message, whether the message is a single-hop SDF message or a multi-hop SDF message, and correspondingly respond to the message. However, because the original NAN device supporting only the single-hop service discovery identifies the relayed SDF message as a single-hop SDF message sent by a NAN relay device, when the original NAN device receives a multi-hop SDF message forwarded by the NAN relay device and service information indicated by a matching identifier carried in the multi-hop SDF message matches a service required by the original NAN device, the original NAN device responds to the NAN relay device for the multi-hop SDF message. Because the NAN relay device is not a NAN service initiating device of a service corresponding to the multi-hop SDF message, the NAN relay device cannot provide the service required by the original NAN device, and the NAN relay device does not reply to the response of the original NAN device. In this case, the response produced by the original NAN device for the relayed multi-hop SDF message becomes an invalid response, and consequently the original NAN device wastes device power and network resources.

SUMMARY

This application provides a multi-hop service discovery method and a multi-hop service discovery apparatus, to enable a NAN device that does not support a multi-hop service discovery not to respond to a relayed multi-hop service discovery message on the premise that the relayed service discovery message is correctly received by a NAN device that supports the multi-hop service discovery.

To achieve the foregoing objective, the following technical solutions are used in this application.

According to a first aspect, an embodiment of the present invention provides a service discovery method, including: receiving, by a second NAN device, a first service discovery message that is sent by a first NAN device and that is used for a service discovery, where the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and generating, by the second NAN device based on the first service discovery message, a second service discovery message used for the service discovery, and sending the second service discovery message, where the second NAN device serves as a service relay device that relays the service discovery initiated by the first NAN device, and the second service discovery message includes second service identifier information and second service relay indication information, where the generating the second service discovery message based on the first service discovery message includes:

generating, by the second NAN device, the second service identifier information based on the first service identifier information, and generating the second service relay indication information based on the first service relay indication information, where the first service identifier information is different from the second service identifier information, the second service identifier information is used to indicate a service that is subscribed to or published by using the second service discovery message, and the second service relay indication information is used to indicate a quantity of times the service discovery has been relayed.

In a first possible implementation of the first aspect, the first service discovery message further includes a maximum hop count, and the maximum hop count is used to indicate a maximum quantity of times the service discovery is allowed to be relayed; and the generating, based on the first service discovery message, a second service discovery message used for the service discovery is specifically:

when the second NAN device determines, based on the first service relay indication information, that the quantity of times the service discovery has been relayed is less than the maximum hop count, generating, by the second NAN device based on the first service discovery message, the second service discovery message used for the service discovery.

With reference to the first possible implementation of the first aspect, in a second possible implementation, the second service discovery message further includes the maximum hop count.

With reference to any one of the first aspect or the first to the second possible implementations of the first aspect, in a third possible implementation, the first service relay indication information is a first hop count, the second service relay indication information is a second hop count, and the service discovery method further includes:

when the first hop count is equal to 0, generating, by the second NAN device, the second service identifier information based on the first service identifier information, and generating the second hop count based on the first hop count, where the second hop count is greater than 0; or when the first hop count is greater than 0, generating, by the second NAN device, the second service identifier information based on the first service identifier information, and generating the second hop count based on the first hop count, where the second hop count is greater than or equal to the first hop count.

With reference to any one of the first aspect or the first to the third possible implementations of the first aspect, in a fourth possible implementation, the first service discovery message further includes an effective relay time; and the service discovery method further includes:

starting, by the second NAN device, a timer when receiving the first service discovery message; and when a time on the timer is greater than or equal to the effective relay time, canceling, by the second NAN device, sending of the second service discovery message.

According to a second aspect, an embodiment of the present invention provides a service discovery method, including: receiving, by a third NAN device, a second service discovery message that is sent by a second NAN device and that is used for a service discovery, where the second service discovery message includes second service identifier information and second service relay indication information, the second service identifier information is used to indicate a service corresponding to the second service discovery message, the second service relay indication information is used to indicate a quantity of times the service discovery has been relayed, and the second service discovery message is generated by the second NAN device based on a first service discovery message and is sent by the second NAN device, where the first service discovery message is sent by a first NAN device, is received by the second NAN device, and is used for the service discovery, and the second NAN device serves as a service relay device that relays the service discovery initiated by the first NAN device; the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and the first service identifier information is different from the second service identifier information; and sending, by the third NAN device, a service matching response message to the second NAN device when the third NAN device determines, based on the second service identifier information and the second service relay indication information, that the service that is subscribed to or published by the first NAN device to perform the service discovery matches a service requirement of the third NAN device.

In a first possible implementation of the second aspect, before the third NAN device determines, based on the second service identifier information and the second service relay indication information, that the service that is subscribed to or published by the first NAN device to perform the service discovery matches the service requirement of the third NAN device, the method further includes:

determining, by the third NAN device based on the second service relay indication information, that the second service discovery message is a relayed service discovery message.

In a second possible implementation of the second aspect, that the third NAN device determines, based on the second service identifier information and the second service relay indication information, whether the service that is subscribed to or published by the first NAN device to perform the service discovery matches the service requirement of the third NAN device includes:

obtaining, by the third NAN device, third service identifier information based on the second service identifier information and the second service relay indication information, where the third service identifier information is used to indicate the service that is subscribed to or published by the first NAN device; and determining, by the third NAN device, whether the third service identifier information matches a service corresponding to the service requirement of the third NAN device.

In a third possible implementation of the second aspect, that the third NAN device determines, based on the second service identifier information and the second service relay indication information, whether the service that is subscribed to or published by the first NAN device to perform the service discovery matches the service requirement of the third NAN device includes:

generating, by the third NAN device, fourth service identifier information based on the second service relay indication information and a service corresponding to the service requirement of the third NAN device, where the fourth service identifier information is used to indicate the service corresponding to the service requirement of the third NAN device; and determining, by the third NAN device, whether the fourth service identifier information matches the second service identifier information.

With reference to the first possible implementation of the second aspect, in a fourth possible implementation, the determining, by the third NAN device based on the second service relay indication information, that the second service discovery message is a relayed service discovery message includes:

determining, by the third NAN device based on the second service relay indication information, that the quantity of times the service discovery has been relayed is greater than 0.

With reference to any one of the first to the fourth possible implementations of the second aspect, in a fifth possible implementation, the sending, by the third NAN device, a service matching response message to the second NAN device includes:

when the second service discovery message is an SDF subscribe service subscribe message, sending, by the third NAN device, an SDF publish service publish message to the second NAN device; or when the second service discovery message is an SDF publish service publish message, sending, by the third NAN device, an SDF follow-up service follow-up message to the second NAN device.

With reference to the fifth possible implementation of the second aspect, in a sixth possible implementation, the SDF publish service publish message sent to the second NAN device carries multi-hop service matching indication information, or the SDF follow-up service follow-up message sent to the second NAN device carries the multi-hop service matching indication information, where the multi-hop service matching indication information is used to indicate that the service matching response message is used to respond to a relayed service discovery message.

According to a third aspect, an embodiment of the present invention provides a service discovery method, including: receiving, by a second NAN device, a first service discovery message that is sent by a first NAN device and that is used for a service discovery, where the first service discovery message includes first service identifier information, and the first service identifier information is used to indicate information about a service that is subscribed to or published by using the first service discovery message; and generating, by the second NAN device based on the first service discovery message, a second service discovery message used for the service discovery, and sending the second service discovery message, where the second NAN device serves as a service relay device that relays the service discovery initiated by the first NAN device, where the generating the second service discovery message based on the first service discovery message includes:

generating, by the second NAN device, the second service identifier information based on the first service identifier information, where the second service discovery message includes the second service identifier information and multi-hop service indication information, the second service identifier information is used to indicate information about a service that is subscribed to or published by using the second service discovery message, the second service identifier information is different from the first service identifier information, and the multi-hop service indication information is used to indicate that the second service discovery message is used to relay the service discovery.

In a first possible implementation of the third aspect, the first service discovery message further includes an effective relay time, and the service discovery method further includes:

starting, by the second NAN device, a timer when receiving the first service discovery message; and when a time on the timer is greater than or equal to the effective relay time, canceling, by the second NAN device, sending of the second service discovery message.

According to a fourth aspect, an embodiment of the present invention provides a service discovery method, including: receiving, by a third NAN device, a second service discovery message that is sent by a second NAN device and that is used for a service discovery, where the second service discovery message includes second service identifier information and multi-hop service indication information, the second service identifier information is used to indicate information about a service that is subscribed to or published by using the second service discovery message, the multi-hop service indication information is used to indicate that the second service discovery message is used to relay the service discovery, and the second service discovery message is generated by the second NAN device based on a first service discovery message and is sent by the second NAN device, where the first service discovery message is sent by a first NAN device, is received by the second NAN device, and is used for the service discovery, and the second NAN device serves as a service relay device that relays the service discovery initiated by the first NAN device; the first service discovery message includes first service identifier information, and the first service identifier information is used to indicate information about a service that is subscribed to or published by using the first service discovery message; and the second service identifier information is different from the first service identifier information;

when the third NAN device determines, based on the multi-hop service indication information, that the second service discovery is used to relay the service discovery, determining, by the third NAN device based on the second service identifier information, whether a service that is subscribed to or published by the first NAN device matches a service requirement of the third NAN device; and sending, by the third NAN device, a service matching response message to the second NAN device when the third NAN device determines that the service that is subscribed to or published by the first NAN device matches the service requirement of the third NAN device.

In a first possible implementation of the fourth aspect, the determining, by the third NAN device based on the second service identifier information, whether a service that is subscribed to or published by the first NAN device matches a service requirement of the third NAN device includes:

obtaining, based on the second service identifier information, the first service identifier information corresponding to the service that is subscribed to or published by the first NAN device; and determining whether the first service identifier information matches third service identifier information, where the third service identifier information is used to indicate a service that is subscribed to or published based on the service requirement of the third NAN device.

In a second possible implementation of the fourth aspect, the determining, by the third NAN device based on the second service identifier information, whether a service that is subscribed to or published by the first NAN device matches a service requirement of the third NAN device includes:

generating fourth service identifier information based on third service identifier information, where the third service identifier information is used to indicate a service corresponding to the service requirement of the third NAN device; and determining whether the second service identifier information matches the fourth service identifier information.

With reference to any one of the fourth aspect or the first to the second possible implementations of the fourth aspect, in a third possible implementation, the sending, by the third NAN device, a service matching response message to the second NAN device includes:

when the second service discovery message is an SDF subscribe service subscribe message, sending, by the third NAN device, an SDF publish service publish message to the second NAN device; or when the second service discovery message is an SDF publish service publish message, sending, by the third NAN device, an SDF follow-up service follow-up message to the second NAN device.

With reference to the third possible implementation of the fourth aspect, in a fourth possible implementation, the SDF publish service publish message sent to the second NAN device carries multi-hop service matching indication information, and the SDF follow-up service follow-up message sent to the second NAN device carries the multi-hop service matching indication information, where the multi-hop service matching indication information is used to indicate that the service matching response message is used to respond to a relayed service discovery message.

According to a fifth aspect, an embodiment of the present invention provides a service discovery method, including: receiving, by a second NAN device, a first service discovery message that is sent by a first NAN device and that is used for a service discovery, where the first service discovery message includes first service control type information and first service identifier information, the first service identifier information is used to indicate a service that is subscribed to or published by using the first service discovery message, and the first service control type information is used to indicate a control type of the service that is subscribed to or published by using the first service discovery message; and generating, by the second NAN device based on the first service discovery message, a second service discovery message used for the service discovery, and sending the second service discovery message, where the second NAN device serves as a service relay device that relays the service discovery initiated by the first NAN device, the second service discovery message includes second service control type information and the first service identifier information, the second service control type information is used to indicate a control type of a service that is subscribed to or published by using the second service discovery message, the second service control type information is different from the first service control type information, and the first service identifier information is used to indicate a service that is subscribed to or published by the first NAN device to perform the service discovery.

In a first possible implementation of the fifth aspect, the first service control type information includes subscribe, publish, or follow-up, the second service control type information includes another type, and the another type is different from subscribe, publish, or follow-up.

In a second possible implementation of the fifth aspect, the first service control type information includes 00, 01, or 10, and the second service control type information includes 11.

In a third possible implementation of the fifth aspect, the first service discovery message further includes service relay indication information; and the generating, by the second NAN device, a second service discovery message, and sending the second service discovery message includes:

when the second NAN device determines, based on the service relay indication information, to relay the service discovery, generating, by the second NAN device, the second service discovery message, and sending the second service discovery message.

With reference to the third possible implementation of the fifth aspect, in a fourth possible implementation, the service relay indication information includes a first hop count and a maximum hop count, the first hop count is used to indicate a quantity of times the service discovery corresponding to the first service discovery message has been relayed, and the maximum hop count is used to indicate a maximum quantity of times the service discovery is allowed to be relayed; and that the second NAN device determines, based on the service relay indication information, to relay the service discovery includes:

when the first hop count is less than the maximum hop count, determining, by the second NAN device, to relay the service discovery.

With reference to the fourth possible implementation of the fifth aspect, in a fifth possible implementation, the second service discovery message further includes a second hop count, and the second hop count is used to indicate a quantity of times the service discovery corresponding to the second service discovery message has been relayed.

With reference to the fifth possible implementation of the fifth aspect, in a sixth possible implementation, the service discovery method further includes:

when the first hop count is equal to 0, obtaining, by the second NAN device, the second service control type information, and generating the second hop count based on the first hop count, where the second hop count is greater than 0; or when the first hop count is greater than 0, generating, by the second NAN device, the second hop count based on the first hop count, where the second hop count is greater than or equal to the first hop count.

With reference to any one of the fifth aspect or the first to the sixth possible implementations of the fifth aspect, in a seventh possible implementation, the first service discovery message further includes an effective relay time, and the service discovery method further includes:

starting, by the second NAN device, a timer when receiving the first service discovery message; and when a time on the timer is greater than or equal to the effective relay time, canceling, by the second NAN device, sending of the second service discovery message.

With reference to any one of the fifth aspect or the first to the sixth possible implementations of the fifth aspect, in an eighth possible implementation, the service discovery method further includes:

receiving a third service discovery message sent by a third NAN device, where the third NAN device is a NAN device that responds to the second service discovery message, the third service discovery message includes third service control type information, and the third service control type information is used to indicate a control type of a service corresponding to a service requirement of the third NAN device; and when the second NAN device determines that a control type of the service that is subscribed to or published by the first NAN device to perform the service discovery matches a third service control type, sending, by the second NAN device, a fourth service discovery message to the third NAN device, where the fourth service discovery message is used to indicate, to the third NAN device, that the third service control type matches the control type of the service that is subscribed to or published by the first NAN device to perform the service discovery.

According to a sixth aspect, an embodiment of the present invention provides a service discovery method, including: receiving, by a third NAN device, a second service discovery message that is sent by a second NAN device and that is used for a service discovery, where the second service discovery message includes second service control type information and first service identifier information, the second service control type information is used to indicate a control type of a service that is subscribed to or published by using the second service discovery message, the first service identifier information is used to indicate a service that is subscribed to or published by a first NAN device to perform the service discovery, and the second service discovery message is generated by the second NAN device based on a first service discovery message and is sent by the second NAN device, where the first service discovery message is received by the second NAN device from the first NAN device and is used for the service discovery, and the second NAN device serves as a service relay device that relays the service discovery initiated by the first NAN device; the first service discovery message includes first service control type information and the first service identifier information, and the first service control type information is used to indicate a control type of a service that is subscribed to or published by using the first service discovery message; and the second service control type information is different from the first service control type information;

when the third NAN device determines, based on the second service control type information, that the second service discovery message is a relayed service discovery message, determining, by the third NAN device based on the first service identifier information, whether the service that is subscribed to or published by the first NAN device to perform the service discovery matches a service corresponding to a service requirement of the third NAN device; and sending, by the third NAN device, a service matching response message to the second NAN device when the third NAN device determines that the service that is subscribed to or published by the first NAN device to perform the service discovery matches the service corresponding to the service requirement of the third NAN device.

In a first possible implementation of the sixth aspect, that the third NAN device determines, based on the second service control type information, that the second service discovery message is a relayed service discovery message includes:

when the third NAN device determines that the second service control type is none of subscribe, publish, and follow-up, determining, by the third NAN device, that the second service discovery message is a relayed service discovery message.

With reference to the first possible implementation of the sixth aspect, in a second possible implementation, the second service discovery message further includes the first service control type information; and the determining, by the third NAN device based on the first service identifier information, whether the service that is subscribed to or published by the first NAN device to perform the service discovery matches a service corresponding to a service requirement of the third NAN device includes:

when the first service control type information is subscribe, and the service indicated by the first service identifier information can be provided based on the service requirement of the third NAN device, determining that the service that is subscribed to or published by the first NAN device to perform the service discovery matches the service corresponding to the service requirement of the third NAN device; or when the first service control type information is publish, and the service indicated by the first service identifier information needs to be used based on the service requirement of the third NAN device, determining that the service that is subscribed to or published by the first NAN device to perform the service discovery matches the service corresponding to the service requirement of the third NAN device.

With reference to the first possible implementation of the sixth aspect, in a third possible implementation, the determining, by the third NAN device based on the first service identifier information, whether the service that is subscribed to or published by the first NAN device to perform the service discovery matches a service corresponding to a service requirement of the third NAN device includes:

generating, by the third NAN device, fifth service identifier information based on the service corresponding to the service requirement of the third NAN device, where the fifth service identifier information is used to indicate the service corresponding to the service requirement of the third NAN device; and when the first service identifier information matches the fifth service identifier information, determining that the service that is subscribed to or published by the first NAN device to perform the service discovery matches the service corresponding to the service requirement of the third NAN device.

With reference to any one of the sixth aspect, the first possible implementation of the sixth aspect, or the third possible implementation of the sixth aspect, in a fourth possible implementation, the sending, by the third NAN device, a service matching response message to the second NAN device includes:

sending, by the third NAN device, a third service discovery message to the second NAN device, where the third service discovery message includes third service control type information, and the third service control type information is used to indicate a control type of the service corresponding to the service requirement of the third NAN device.

With reference to any one of the sixth aspect, the first possible implementation of the sixth aspect, or the third possible implementation of the sixth aspect, in a fifth possible implementation, the service discovery method further includes:

receiving, by the third NAN device, a fifth service discovery message sent by the second NAN device, where the fifth service discovery message includes the first service control type information; and when the first service control type information is subscribe, and a service indicated by the second service identifier information can be provided based on the service requirement of the third NAN device, determining that the service that is subscribed to by the first NAN device matches the service requirement of the third NAN device; or when the first service control type information is publish, and the third NAN device needs to use a service indicated by the second service identifier information, determining that the service that is published by the first NAN device matches the service requirement of the third NAN device.

With reference to any one of the sixth aspect or the first to the third possible implementations of the sixth aspect, in a sixth possible implementation, the service matching response message carries multi-hop service matching indication information, and the multi-hop service matching indication information is used to indicate that the service matching response message is used to respond to a relayed service discovery message.

According to a seventh aspect, an embodiment of the present invention provides a service discovery apparatus.

The service discovery apparatus is a second NAN device and includes a receiving unit, a sending unit, and a processing unit, where the receiving unit is configured to receive a first service discovery message that is sent by a first NAN device and that is used for a service discovery, where the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and the processing unit is configured to: when the service discovery apparatus serves as a service relay device that relays the service discovery initiated by the first NAN device, generate, based on the first service discovery message, a second service discovery message used for the service discovery, and control the sending unit to send the second service discovery message, where the second service discovery message includes second service identifier information and second service relay indication information, where the generating the second service discovery message based on the first service discovery message includes:

generating the second service identifier information based on the first service identifier information, and generating the second service relay indication information based on the first service relay indication information, where the first service identifier information is different from the second service identifier information, the second service identifier information is used to indicate a service that is subscribed to or published by using the second service discovery message, and the second service relay indication information is used to indicate a quantity of times the service discovery has been relayed.

In a first possible implementation of the seventh aspect, the first service discovery message further includes a maximum hop count, and the maximum hop count is used to indicate a maximum quantity of times the service discovery is allowed to be relayed; and the processing unit is specifically configured to:

when determining, based on the first service relay indication information, that the quantity of times the service discovery has been relayed is less than the maximum hop count, generate, based on the first service discovery message, the second service discovery message used for the service discovery.

With reference to the first possible implementation of the seventh aspect, in a second possible implementation, the second service discovery message further includes the maximum hop count.

With reference to any one of the seventh aspect or the first to the second possible implementations of the seventh aspect, in a third possible implementation, the first service relay indication information is a first hop count, the second service relay indication information is a second hop count, and the processing unit is further configured to:

when the first hop count is equal to 0, generate the second service identifier information based on the first service identifier information, and generate the second hop count based on the first hop count, where the second hop count is greater than 0; or when the first hop count is greater than 0, generate the second service identifier information based on the first service identifier information, and generate the second hop count based on the first hop count, where the second hop count is greater than or equal to the first hop count.

With reference to any one of the seventh aspect or the first to the third possible implementations of the seventh aspect, in a fourth possible implementation, the first service discovery message further includes an effective relay time; and the processing unit is further configured to:

start a timer when the first service discovery message is received; and when a time on the timer is greater than or equal to the effective relay time, control the sending unit to cancel sending of the second service discovery message.

According to an eighth aspect, an embodiment of the present invention provides a service discovery apparatus. The service discovery apparatus is a third NAN device, for example, the service discovery apparatus may be the third NAN device in the embodiment of the second aspect, and includes a receiving unit, a sending unit, and a processing unit, where the receiving unit is configured to receive a second service discovery message that is sent by a second NAN device and that is used for a service discovery, where the second service discovery message includes second service identifier information and second service relay indication information, the second service identifier information is used to indicate a service corresponding to the second service discovery message, the second service relay indication information is used to indicate a quantity of times the service discovery has been relayed, and the second service discovery message is generated by the second NAN device based on a first service discovery message and is sent by the second NAN device, where the first service discovery message is sent by a first NAN device, is received by the second NAN device, and is used for the service discovery, and the second NAN device serves as a service relay device that relays the service discovery initiated by the first NAN device; the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and the first service identifier information is different from the second service identifier information; and the processing unit is configured to: when determining, based on the second service identifier information and the second service relay indication information, that the service that is subscribed to or published by the first NAN device to perform the service discovery matches a service requirement of the service discovery apparatus, control the sending unit to send a service matching response message to the second NAN device.

In a first possible implementation of the eighth aspect, the processing unit is further configured to determine, based on the second service relay indication information, that the second service discovery message is a relayed service discovery message.

In a second possible implementation of the eighth aspect, the processing unit is specifically configured to: obtain third service identifier information based on the second service identifier information and the second service relay indication information, where the third service identifier information is used to indicate the service that is subscribed to or published by the first NAN device; and determine whether the third service identifier information matches a service corresponding to the service requirement of the third NAN device.

In a third possible implementation of the eighth aspect, the processing unit is specifically configured to: generate fourth service identifier information based on the second service relay indication information and a service corresponding to the service requirement of the service discovery apparatus, where the fourth service identifier information is used to indicate the service corresponding to the service requirement of the service discovery apparatus; and determine whether the fourth service identifier information matches the second service identifier information.

With reference to the first possible implementation of the eighth aspect, in a fourth possible implementation, the processing unit is specifically configured to determine, based on the second service relay indication information, that the quantity of times the service discovery has been relayed is greater than 0.

With reference to any one of the first to the fourth possible implementations of the eighth aspect, in a fifth possible implementation, the processing unit is specifically configured to:

when the second service discovery message is an SDF subscribe service subscribe message, control the sending unit to send an SDF publish service publish message to the second NAN device; or when the second service discovery message is an SDF publish service publish message, control the sending unit to send an SDF follow-up service follow-up message to the second NAN device.

With reference to the fifth possible implementation of the eighth aspect, in a sixth possible implementation, the SDF publish service publish message sent to the second NAN device carries multi-hop service matching indication information, or the SDF follow-up service follow-up message sent to the second NAN device carries the multi-hop service matching indication information, where the multi-hop service matching indication information is used to indicate that the service matching response message is used to respond to a relayed service discovery message.

According to a ninth aspect, an embodiment of the present invention provides a service discovery apparatus. The service discovery apparatus is a second NAN device, for example, the service discovery apparatus may be the second NAN device in the embodiment of the third aspect, and includes a receiving unit, a sending unit, and a processing unit, where the receiving unit is configured to receive a first service discovery message that is sent by a first NAN device and that is used for a service discovery, where the first service discovery message includes first service identifier information, and the first service identifier information is used to indicate information about a service that is subscribed to or published by using the first service discovery message; and the processing unit is configured to: when the service discovery apparatus serves as a service relay device that relays the service discovery initiated by the first NAN device, generate, based on the first service discovery message, a second service discovery message used for the service discovery, and control the sending unit to send the second service discovery message, where the generating the second service discovery message based on the first service discovery message includes:

generating the second service identifier information based on the first service identifier information, where the second service discovery message includes the second service identifier information and multi-hop service indication information, the second service identifier information is used to indicate information about a service that is subscribed to or published by using the second service discovery message, the second service identifier information is different from the first service identifier information, and the multi-hop service indication information is used to indicate that the second service discovery message is used to relay the service discovery.

In a first possible implementation of the ninth aspect, the first service discovery message further includes an effective relay time, and the processing unit is further configured to: start a timer when the first service discovery message is received, and when a time on the timer is greater than or equal to the effective relay time, control the sending unit to cancel sending of the second service discovery message.

According to a tenth aspect, an embodiment of the present invention provides a service discovery apparatus. The service discovery apparatus is a third NAN device, for example, the service discovery apparatus may be the third NAN device in the embodiment of the fourth aspect, and includes a receiving unit, a sending unit, and a processing unit, where the receiving unit is configured to receive a second service discovery message that is sent by a second NAN device and that is used for a service discovery, where the second service discovery message includes second service identifier information and multi-hop service indication information, the second service identifier information is used to indicate information about a service that is subscribed to or published by using the second service discovery message, the multi-hop service indication information is used to indicate that the second service discovery message is used to relay the service discovery, and the second service discovery message is generated by the second NAN device based on a first service discovery message and is sent by the second NAN device, where the first service discovery message is sent by a first NAN device, is received by the second NAN device, and is used for the service discovery, and the second NAN device serves as a service relay device that relays the service discovery initiated by the first NAN device; the first service discovery message includes first service identifier information, and the first service identifier information is used to indicate information about a service that is subscribed to or published by using the first service discovery message; and the second service identifier information is different from the first service identifier information; and the processing unit is configured to: when determining, based on the multi-hop service indication information, that the second service discovery is used to relay the service discovery, determine, based on the second service identifier information, whether a service that is subscribed to or published by the first NAN device matches a service requirement of the service discovery apparatus; and when determining that the service that is subscribed to or published by the first NAN device matches the service requirement of the service discovery apparatus, control the sending unit to send a service matching response message to the second NAN device.

In a first possible implementation of the tenth aspect, the processing unit is specifically configured to:

obtain, based on the second service identifier information, the first service identifier information corresponding to the service that is subscribed to or published by the first NAN device; and determine whether the first service identifier information matches third service identifier information, where the third service identifier information is used to indicate a service corresponding to the service requirement of the service discovery apparatus.

In a second possible implementation of the tenth aspect, the processing unit is specifically configured to:

generate fourth service identifier information based on third service identifier information, where the third service identifier information is used to indicate a service corresponding to the service requirement of the service discovery apparatus; and determine whether the second service identifier information matches the fourth service identifier information.

With reference to any one of the tenth aspect or the first to the second possible implementations of the tenth aspect, in a third possible implementation, the processing unit is specifically configured to:

when the second service discovery message is an SDF subscribe service subscribe message, control the sending unit to send an SDF publish service publish message to the second NAN device; or when the second service discovery message is an SDF publish service publish message, control the sending unit to send an SDF follow-up service follow-up message to the second NAN device.

With reference to the third possible implementation of the tenth aspect, in a fourth possible implementation, the SDF publish service publish message sent to the second NAN device carries multi-hop service matching indication information, and the SDF follow-up service follow-up message sent to the second NAN device carries the multi-hop service matching indication information, where the multi-hop service matching indication information is used to indicate that the service matching response message is used to respond to a relayed service discovery message.

According to an eleventh aspect, an embodiment of the present invention provides a service discovery apparatus. The service discovery apparatus is a second NAN device, for example, the service discovery apparatus may be the second NAN device in the embodiment of the fifth aspect, and includes a receiving unit, a sending unit, and a processing unit, where the receiving unit is configured to receive a first service discovery message that is sent by a first NAN device and that is used for a service discovery, where the first service discovery message includes first service control type information and first service identifier information, the first service identifier information is used to indicate a service that is subscribed to or published by using the first service discovery message, and the first service control type information is used to indicate a control type of the service that is subscribed to or published by using the first service discovery message; and the processing unit is configured to: when the service discovery apparatus serves as a service relay device that relays the service discovery initiated by the first NAN device, generate, based on the first service discovery message, a second service discovery message used for the service discovery, and control the sending unit to send the second service discovery message, where the second service discovery message includes second service control type information and the first service identifier information, the second service control type information is used to indicate a control type of a service that is subscribed to or published by using the second service discovery message, the second service control type information is different from the first service control type information, and the first service identifier information is used to indicate a service that is subscribed to or published by the first NAN device to perform the service discovery.

In a first possible implementation of the eleventh aspect, the first service control type information includes subscribe, publish, or follow-up, the second service control type information includes another type, and the another type is different from subscribe, publish, or follow-up.

In a second possible implementation of the eleventh aspect, the first service control type information includes 00, 01, or 10, and the second service control type information includes 11.

In a third possible implementation of the eleventh aspect, the first service discovery message further includes service relay indication information, and the processing unit is specifically configured to:

when determining, based on the service relay indication information, to relay the service discovery, generate the second service discovery message, and control the sending unit to send the second service discovery message.

With reference to the third possible implementation of the eleventh aspect, in a fourth possible implementation, the service relay indication information includes a first hop count and a maximum hop count, the first hop count is used to indicate a quantity of times the service discovery corresponding to the first service discovery message has been relayed, and the maximum hop count is used to indicate a maximum quantity of times the service discovery is allowed to be relayed; and the processing unit is specifically configured to: when the first hop count is less than the maximum hop count, determine to relay the service discovery.

With reference to the fourth possible implementation of the eleventh aspect, in a fifth possible implementation, the second service discovery message further includes a second hop count, and the second hop count is used to indicate a quantity of times the service discovery corresponding to the second service discovery message has been relayed.

With reference to the fifth possible implementation of the eleventh aspect, in a sixth possible implementation, the processing unit is specifically further configured to:

when the first hop count is equal to 0, obtain the second service control type information, and generate the second hop count based on the first hop count, where the second hop count is greater than 0; or when the first hop count is greater than 0, generate the second hop count based on the first hop count, where the second hop count is greater than or equal to the first hop count.

With reference to any one of the eleventh aspect or the first to the sixth possible implementations of the eleventh aspect, in a seventh possible implementation, the first service discovery message further includes an effective relay time; and the processing unit is further configured to:

start a timer when the first service discovery message is received, and when a time on the timer is greater than or equal to the effective relay time, control the sending unit to cancel sending of the second service discovery message.

With reference to any one of the eleventh aspect or the first to the sixth possible implementations of the eleventh aspect, in an eighth possible implementation, the receiving unit is further configured to:

receive a third service discovery message sent by a third NAN device, where the third NAN device is a NAN device that responds to the second service discovery message, the third service discovery message includes third service control type information, and the third service control type information is used to indicate a control type of a service corresponding to a service requirement of the third NAN device; and the processing unit is further configured to:

when determining that a control type of the service that is subscribed to or published by the first NAN device to perform the service discovery matches a third service control type, control the sending unit to send a fourth service discovery message to the third NAN device, where the fourth service discovery message is used to indicate, to the third NAN device, that the third service control type matches the control type of the service that is subscribed to or published by the first NAN device to perform the service discovery.

According to a twelfth aspect, an embodiment of the present invention provides a service discovery apparatus. The service discovery apparatus is a third NAN device, for example, the service discovery apparatus may be the third NAN device in the embodiment of the sixth aspect, and includes a receiving unit, a sending unit, and a processing unit, where the receiving unit is configured to receive a second service discovery message that is sent by a second NAN device and that is used for a service discovery, where the second service discovery message includes second service control type information and first service identifier information, the second service control type information is used to indicate a control type of a service that is subscribed to or published by using the second service discovery message, the first service identifier information is used to indicate a service that is subscribed to or published by a first NAN device to perform the service discovery, and the second service discovery message is generated by the second NAN device based on a first service discovery message and is sent by the second NAN device, where the first service discovery message is received by the second NAN device from the first NAN device and is used for the service discovery, and the second NAN device serves as a service relay device that relays the service discovery initiated by the first NAN device; the first service discovery message includes first service control type information and the first service identifier information, and the first service control type information is used to indicate a control type of a service that is subscribed to or published by using the first service discovery message; and the second service control type information is different from the first service control type information; and the processing unit is configured to: when determining, based on the second service control type information, that the second service discovery message is a relayed service discovery message, determine, based on the first service identifier information, whether the service that is subscribed to or published by the first NAN device to perform the service discovery matches a service corresponding to a service requirement of the service discovery apparatus; and when determining that the service that is subscribed to or published by the first NAN device to perform the service discovery matches the service corresponding to the service requirement of the service discovery apparatus, control the sending unit to send a service matching response message to the second NAN device.

In a first possible implementation of the twelfth aspect, the processing unit is specifically configured to: when determining that the second service control type is none of subscribe, publish, and follow-up, determine that the second service discovery message is a relayed service discovery message.

With reference to the first possible implementation of the twelfth aspect, in a second possible implementation, the second service discovery message further includes the first service control type information; and the processing unit is specifically configured to:

when the first service control type information is subscribe, and the service indicated by the first service identifier information can be provided based on the service requirement of the service discovery apparatus, determine that the service that is subscribed to or published by the first NAN device to perform the service discovery matches the service corresponding to the service requirement of the service discovery apparatus; or when the first service control type information is publish, and the service indicated by the first service identifier information needs to be used based on the service requirement of the service discovery apparatus, determine that the service that is subscribed to or published by the first NAN device to perform the service discovery matches the service corresponding to the service requirement of the service discovery apparatus.

With reference to the first possible implementation of the twelfth aspect, in a third possible implementation, the processing unit is specifically configured to:

generate fifth service identifier information based on the service corresponding to the service requirement of the service discovery apparatus, where the fifth service identifier information is used to indicate the service corresponding to the service requirement of the third NAN device; and when the first service identifier information matches the fifth service identifier information, determine that the service that is subscribed to or published by the first NAN device to perform the service discovery matches the service corresponding to the service requirement of the service discovery apparatus.

With reference to any one of the twelfth aspect, the first possible implementation of the twelfth aspect, or the third possible implementation of the twelfth aspect, in a fourth possible implementation, the processing unit is specifically configured to:

control the sending unit to send a third service discovery message to the second NAN device, where the third service discovery message includes third service control type information, and the third service control type information is used to indicate a control type of the service corresponding to the service requirement of the service discovery apparatus.

With reference to any one of the twelfth aspect, the first possible implementation of the twelfth aspect, or the third possible implementation of the twelfth aspect, in a fifth possible implementation, the receiving unit is further configured to:

receive a fifth service discovery message sent by the second NAN device, where the fifth service discovery message includes the first service control type information; and the processing unit is specifically configured to:

when the first service control type information is subscribe, and a service indicated by the second service identifier information can be provided based on the service requirement of the third NAN device, determine that the service that is subscribed to by the first NAN device matches the service requirement of the third NAN device; or when the first service control type information is publish, and the third NAN device needs to use a service indicated by the second service identifier information, determine that the service that is published by the first NAN device matches the service requirement of the third NAN device.

With reference to any one of the twelfth aspect or the first to the third possible implementations of the twelfth aspect, in a sixth possible implementation, the service matching response message carries multi-hop service matching indication information, and the multi-hop service matching indication information is used to indicate that the service matching response message is used to respond to a relayed service discovery message.

According to a thirteenth aspect, an embodiment of the present invention provides a service discovery apparatus. The service discovery apparatus is a second NAN device, for example, the service discovery apparatus may be the second NAN device in the embodiment of the first aspect, and includes a processor, an interface circuit, a memory, and a bus, where the processor, the interface circuit, and the memory are connected to and communicate with each other through the bus; and the processor is configured to receive, by using the interface circuit, a first service discovery message that is sent by a first NAN device and that is used for a service discovery, where the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and the processor is further configured to: when the service discovery apparatus serves as a service relay device that relays the service discovery initiated by the first NAN device, generate, based on the first service discovery message, a second service discovery message used for the service discovery, and send the second service discovery message by using the interface circuit, where the second service discovery message includes second service identifier information and second service relay indication information, where the generating the second service discovery message based on the first service discovery message includes:

generating the second service identifier information based on the first service identifier information, and generating the second service relay indication information based on the first service relay indication information, where the first service identifier information is different from the second service identifier information, the second service identifier information is used to indicate a service that is subscribed to or published by using the second service discovery message, and the second service relay indication information is used to indicate a quantity of times the service discovery has been relayed.

In a first possible implementation of the thirteenth aspect, the first service discovery message further includes a maximum hop count, and the maximum hop count is used to indicate a maximum quantity of times the service discovery is allowed to be relayed; and the processor is specifically configured to: when determining, based on the first service relay indication information, that the quantity of times the service discovery has been relayed is less than the maximum hop count, generate, based on the first service discovery message, the second service discovery message used for the service discovery.

With reference to the first possible implementation of the thirteenth aspect, in a second possible implementation, the second service discovery message further includes the maximum hop count.

With reference to any one of the thirteenth aspect or the first to the second possible implementations of the thirteenth aspect, in a third possible implementation, the first service relay indication information is a first hop count, the second service relay indication information is a second hop count, and the processor is further configured to:

when the first hop count is equal to 0, generate the second service identifier information based on the first service identifier information, and generate the second hop count based on the first hop count, where the second hop count is greater than 0; or when the first hop count is greater than 0, generate the second service identifier information based on the first service identifier information, and generate the second hop count based on the first hop count, where the second hop count is greater than or equal to the first hop count.

With reference to any one of the thirteenth aspect or the first to the third possible implementations of the thirteenth aspect, in a fourth possible implementation, the first service discovery message further includes an effective relay time; and the processor is further configured to:

start a timer when the first service discovery message is received by using the interface circuit, and when a time on the timer is greater than or equal to the effective relay time, cancel sending of the second service discovery message.

According to a fourteenth aspect, an embodiment of the present invention provides a service discovery apparatus. The service discovery apparatus is a third NAN device, for example, the service discovery apparatus may be the third NAN device in the embodiment of the second aspect, and includes a processor, an interface circuit, a memory, and a bus, where the processor, the interface circuit, and the memory are connected to and communicate with each other through the bus; and the processor is configured to receive, by using the interface circuit, a second service discovery message that is sent by a second NAN device and that is used for a service discovery, where the second service discovery message includes second service identifier information and second service relay indication information, the second service identifier information is used to indicate a service corresponding to the second service discovery message, the second service relay indication information is used to indicate a quantity of times the service discovery has been relayed, and the second service discovery message is generated by the service discovery apparatus based on a first service discovery message and is sent by the service discovery apparatus, where the first service discovery message is sent by a first NAN device, is received by the service discovery apparatus, and is used for the service discovery, and the service discovery apparatus serves as a service relay device that relays the service discovery initiated by the first NAN device; the first service discovery message includes first service identifier information and first service relay indication information, the first service identifier information is used to indicate a service that is subscribed to or published by using the first service discovery message, and the first service relay indication information is used to indicate a quantity of times the service discovery has been relayed; and the first service identifier information is different from the second service identifier information; and the processor is configured to: when determining, based on the second service identifier information and the second service relay indication information, that the service that is subscribed to or published by the first NAN device to perform the service discovery matches a service requirement of the service discovery apparatus, send a service matching response message to the second NAN device by using the interface circuit.

In a first possible implementation of the fourteenth aspect, the processor is further configured to:

determine, based on the second service relay indication information, that the second service discovery message is a relayed service discovery message.

In a second possible implementation of the fourteenth aspect, the processor is specifically configured to:

obtain third service identifier information based on the second service identifier information and the second service relay indication information, where the third service identifier information is used to indicate the service that is subscribed to or published by the first NAN device; and determine whether the third service identifier information matches a service corresponding to the service requirement of the third NAN device.

In a third possible implementation of the fourteenth aspect, the processor is specifically configured to:

generate fourth service identifier information based on the second service relay indication information and a service corresponding to the service requirement of the service discovery apparatus, where the fourth service identifier information is used to indicate the service corresponding to the service requirement of the service discovery apparatus; and determine whether the fourth service identifier information matches the second service identifier information.

With reference to the first possible implementation of the fourteenth aspect, in a fourth possible implementation, the processor is specifically configured to determine, based on the second service relay indication information, that the quantity of times the service discovery has been relayed is greater than 0.

With reference to any one of the first to the fourth possible implementations of the fourteenth aspect, in a fifth possible implementation, the processor is specifically configured to:

when the second service discovery message is an SDF subscribe service subscribe message, send an SDF publish service publish message to the second NAN device by using the interface circuit; or when the second service discovery message is an SDF publish service publish message, send an SDF follow-up service follow-up message to the second NAN device by using the interface circuit.

With reference to the fifth possible implementation of the fourteenth aspect, in a sixth possible implementation, the SDF publish service publish message sent to the second NAN device carries multi-hop service matching indication information, or the SDF follow-up service follow-up message sent to the second NAN device carries the multi-hop service matching indication information, where the multi-hop service matching indication information is used to indicate that the service matching response message is used to respond to a relayed service discovery message.

According to a fifteenth aspect, an embodiment of the present invention provides a service discovery apparatus. The service discovery apparatus is a second NAN device, for example, the service discovery apparatus may be the second NAN device in the embodiment of the third aspect, and includes a processor, an interface circuit, a memory, and a bus, where the processor, the interface circuit, and the memory are connected to and communicate with each other through the bus; and the processor is configured to receive, by using the interface circuit, a first service discovery message that is sent by a first NAN device and that is used for a service discovery, where the first service discovery message includes first service identifier information, and the first service identifier information is used to indicate information about a service that is subscribed to or published by using the first service discovery message; and the processor is further configured to: when the service discovery apparatus serves as a service relay device that relays the service discovery initiated by the first NAN device, generate, based on the first service discovery message, a second service discovery message used for the service discovery, and send the second service discovery message by using the interface circuit, where the generating the second service discovery message based on the first service discovery message includes: generating the second service identifier information based on the first service identifier information, where the second service discovery message includes the second service identifier information and multi-hop service indication information, the second service identifier information is used to indicate information about a service that is subscribed to or published by using the second service discovery message, the second service identifier information is different from the first service identifier information, and the multi-hop service indication information is used to indicate that the second service discovery message is used to relay the service discovery.

In a first possible implementation of the fifteenth aspect, the first service discovery message further includes an effective relay time, and the processor is further configured to: start a timer when the first service discovery message is received by using the interface circuit, and when a time on the timer is greater than or equal to the effective relay time, cancel sending of the second service discovery message.

According to a sixteenth aspect, an embodiment of the present invention provides a service discovery apparatus. The service discovery apparatus is a third NAN device, for example, the service discovery apparatus may be the third NAN device in the embodiment of the fourth aspect, and includes a processor, an interface circuit, a memory, and a bus, where the processor, the interface circuit, and the memory are connected to and communicate with each other through the bus; and the processor is configured to receive, by using the interface circuit, a second service discovery message that is sent by a second NAN device and that is used for a service discovery, where the second service discovery message includes second service identifier information and multi-hop service indication information, the second service identifier information is used to indicate information about a service that is subscribed to or published by using the second service discovery message, the multi-hop service indication information is used to indicate that the second service discovery message is used to relay the service discovery, and the second service discovery message is generated by the service discovery apparatus based on a first service discovery message and is sent by the service discovery apparatus, where the first service discovery message is sent by a first NAN device, is received by the service discovery apparatus, and is used for the service discovery, and the service discovery apparatus serves as a service relay device that relays the service discovery initiated by the first NAN device; the first service discovery message includes first service identifier information, and the first service identifier information is used to indicate information about a service that is subscribed to or published by using the first service discovery message; and the second service identifier information is different from the first service identifier information; and the processor is further configured to: when determining, based on the multi-hop service indication information, that the second service discovery is used to relay the service discovery, determine, based on the second service identifier information, whether a service that is subscribed to or published by the first NAN device matches a service requirement of the service discovery apparatus; and when determining that the service that is subscribed to or published by the first NAN device matches the service requirement of the service discovery apparatus, send a service matching response message to the second NAN device by using the interface circuit.

In a first possible implementation of the sixteenth aspect, the processor is specifically configured to:

obtain, based on the second service identifier information, the first service identifier information corresponding to the service that is subscribed to or published by the first NAN device; and determine whether the first service identifier information matches third service identifier information, where the third service identifier information is used to indicate a service corresponding to the service requirement of the service discovery apparatus.

In a second possible implementation of the sixteenth aspect, the processor is specifically configured to:

generate fourth service identifier information based on third service identifier information, where the third service identifier information is used to indicate a service corresponding to the service requirement of the service discovery apparatus; and determine whether the second service identifier information matches the fourth service identifier information.

With reference to any one of the sixteenth aspect or the first to the second possible implementations of the sixteenth aspect, in a third possible implementation, the processor is specifically configured to: when the second service discovery message is an SDF subscribe service subscribe message, send an SDF publish service publish message to the second NAN device by using the interface circuit; or when the second service discovery message is an SDF publish service publish message, send an SDF follow-up service follow-up message to the second NAN device by using the interface circuit.

With reference to the third possible implementation of the sixteenth aspect, in a fourth possible implementation, the SDF publish service publish message sent to the second NAN device carries multi-hop service matching indication information, and the SDF follow-up service follow-up message sent to the second NAN device carries the multi-hop service matching indication information, where the multi-hop service matching indication information is used to indicate that the service matching response message is used to respond to a relayed service discovery message.

According to a seventeenth aspect, an embodiment of the present invention provides a service discovery apparatus. The service discovery apparatus is a second NAN device, for example, the service discovery apparatus may be the second NAN device in the embodiment of the fifth aspect, and includes a processor, an interface circuit, a memory, and a bus, where the processor, the interface circuit, and the memory are connected to and communicate with each other through the bus; and the processor is configured to receive, by using the interface circuit, a first service discovery message that is sent by a first NAN device and that is used for a service discovery, where the first service discovery message includes first service control type information and first service identifier information, the first service identifier information is used to indicate a service that is subscribed to or published by using the first service discovery message, and the first service control type information is used to indicate a control type of the service that is subscribed to or published by using the first service discovery message; and the processor is further configured to: when the service discovery apparatus serves as a service relay device that relays the service discovery initiated by the first NAN device, generate, based on the first service discovery message, a second service discovery message used for the service discovery, and send the second service discovery message by using the interface circuit, where the second service discovery message includes second service control type information and the first service identifier information, the second service control type information is used to indicate a control type of a service that is subscribed to or published by using the second service discovery message, the second service control type information is different from the first service control type information, and the first service identifier information is used to indicate a service that is subscribed to or published by the first NAN device to perform the service discovery.

In a first possible implementation of the seventeenth aspect, the first service control type information includes subscribe, publish, or follow-up, the second service control type information includes another type, and the another type is different from subscribe, publish, or follow-up.

In a second possible implementation of the seventeenth aspect, the first service control type information includes 00, 01, or 10, and the second service control type information includes 11.

In a third possible implementation of the seventeenth aspect, the first service discovery message further includes service relay indication information, and the processor is specifically configured to: when determining, based on the service relay indication information, to relay the service discovery, generate the second service discovery message, and send the second service discovery message by using the interface circuit.

With reference to the third possible implementation of the seventeenth aspect, in a fourth possible implementation, the service relay indication information includes a first hop count and a maximum hop count, the first hop count is used to indicate a quantity of times the service discovery corresponding to the first service discovery message has been relayed, and the maximum hop count is used to indicate a maximum quantity of times the service discovery is allowed to be relayed; and the processor is specifically configured to: when the first hop count is less than the maximum hop count, determine to relay the service discovery.

With reference to the fourth possible implementation of the seventeenth aspect, in a fifth possible implementation, the second service discovery message further includes a second hop count, and the second hop count is used to indicate a quantity of times the service discovery corresponding to the second service discovery message has been relayed.

With reference to the fifth possible implementation of the seventeenth aspect, in a sixth possible implementation, the processor is further configured to:

when the first hop count is equal to 0, obtain the second service control type information, and generate the second hop count based on the first hop count, where the second hop count is greater than 0; or when the first hop count is greater than 0, generate the second hop count based on the first hop count, where the second hop count is greater than or equal to the first hop count.

With reference to any one of the seventeenth aspect or the first to the sixth possible implementations of the seventeenth aspect, in a seventh possible implementation, the first service discovery message further includes an effective relay time, and the processor is further configured to: start a timer when the first service discovery message is received by using the interface circuit, and when a time on the timer is greater than or equal to the effective relay time, cancel sending of the second service discovery message.

With reference to any one of the seventeenth aspect or the first to the sixth possible implementations of the seventeenth aspect, in an eighth possible implementation, the processor is further configured to: receive, by using the interface circuit, a third service discovery message sent by a third NAN device, where the third NAN device is a NAN device that responds to the second service discovery message, the third service discovery message includes third service control type information, and the third service control type information is used to indicate a control type of a service corresponding to a service requirement of the third NAN device; and when determining that a control type of the service that is subscribed to or published by the first NAN device to perform the service discovery matches a third service control type, send a fourth service discovery message to the third NAN device by using the interface circuit, where the fourth service discovery message is used to indicate, to the third NAN device, that the third service control type matches the control type of the service that is subscribed to or published by the first NAN device to perform the service discovery.

According to an eighteenth aspect, an embodiment of the present invention provides a service discovery apparatus. The service discovery apparatus is a third NAN device, for example, the service discovery apparatus may be the third NAN device in the embodiment of the sixth aspect, and includes a processor, an interface circuit, a memory, and a bus, where the processor, the interface circuit, and the memory are connected to and communicate with each other through the bus; and the processor is configured to: receive, by using the interface circuit, a second service discovery message that is sent by a second NAN device and that is used for a service discovery, where the second service discovery message includes second service control type information and first service identifier information, the second service control type information is used to indicate a control type of a service that is subscribed to or published by using the second service discovery message, the first service identifier information is used to indicate a service that is subscribed to or published by a first NAN device to perform the service discovery, and the second service discovery message is generated by the service discovery apparatus based on a first service discovery message and is sent by the service discovery apparatus, where the first service discovery message is sent by a first NAN device, is received by the service discovery apparatus, and is used for the service discovery, and the service discovery apparatus serves as a service relay device that relays the service discovery initiated by the first NAN device; the first service discovery message includes first service control type information and the first service identifier information, and the first service control type information is used to indicate a control type of a service that is subscribed to or published by using the first service discovery message; and the second service control type information is different from the first service control type information; and the processor is further configured to: when determining, based on the second service control type information, that the second service discovery message is a relayed service discovery message, determine, based on the first service identifier information, whether the service that is subscribed to or published by the first NAN device to perform the service discovery matches a service corresponding to a service requirement of the service discovery apparatus; and when determining that the service that is subscribed to or published by the first NAN device to perform the service discovery matches the service corresponding to the service requirement of the service discovery apparatus, send a service matching response message to the second NAN device by using the interface circuit.

In a first possible implementation of the eighteenth aspect, the processor is specifically configured to:
when determining that the second service control type is none of subscribe, publish, and follow-up, determine that the second service discovery message is a relayed service discovery message.

With reference to the first possible implementation of the eighteenth aspect, in a second possible implementation, the second service discovery message further includes the first service control type information; and the processor is specifically configured to: when the first service control type information is subscribe, and the service indicated by the first service identifier information can be provided based on the service requirement of the service discovery apparatus, determine that the service that is subscribed to or published by the first NAN device to perform the service discovery matches the service corresponding to the service requirement of the service discovery apparatus; or when the first service control type information is publish, and the service indicated by the first service identifier information needs to be used based on the service requirement of the service discovery apparatus, determine that the service that is subscribed to or published by the first NAN device to perform the service discovery matches the service corresponding to the service requirement of the service discovery apparatus.

With reference to the first possible implementation of the eighteenth aspect, in a third possible implementation, the processor is specifically configured to: generate fifth service identifier information based on the service corresponding to the service requirement of the service discovery apparatus, where the fifth service identifier information is used to indicate the service corresponding to the service requirement of the third NAN device; and when the first service identifier information matches the fifth service identifier information, determine that the service that is subscribed to or published by the first NAN device to perform the service discovery matches the service corresponding to the service requirement of the service discovery apparatus.

With reference to any one of the eighteenth aspect, the first possible implementation of the eighteenth aspect, or the third possible implementation of the eighteenth aspect, in a fourth possible implementation, the processor is specifically configured to send a third service discovery message to the second NAN device by using the interface circuit, where the third service discovery message includes third service control type information, and the third service control type information is used to indicate a control type of the service corresponding to the service requirement of the service discovery apparatus.

With reference to any one of the eighteenth aspect, the first possible implementation of the eighteenth aspect, or the third possible implementation of the eighteenth aspect, in a fifth possible implementation, the processor is further configured to: receive, by using the interface circuit, a fifth service discovery message sent by the second NAN device, where the fifth service discovery message includes the first service control type information; and when the first service control type information is subscribe, and a service indicated by the second service identifier information can be provided based on the service requirement of the third NAN device, determine that the service that is subscribed to by the first NAN device matches the service requirement of the third NAN device; or when the first service control type information is publish, and the third NAN device needs to use a service indicated by the second service identifier information, determine that the service that is published by the first NAN device matches the service requirement of the third NAN device.

With reference to any one of the eighteenth aspect or the first to the third possible implementations of the eighteenth aspect, in a sixth possible implementation, the service matching response message carries multi-hop service matching indication information, and the multi-hop service matching indication information is used to indicate that the service matching response message is used to respond to a relayed service discovery message.

According to the service discovery method and the service discovery apparatus provided in the embodiments of the present invention, the service that is subscribed to or published by the first NAN device to perform the service discovery can be matched with the service requirement of the third NAN device, and when the matching succeeds, responding is performed based on the service that is subscribed to or published by the first NAN device to perform the service discovery. In addition, a NAN device that does not support a multi-hop service discovery is enabled not to respond to a relayed multi-hop service discovery message on the premise that the relayed service discovery message is correctly received by a NAN device that supports the multi-hop service discovery.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
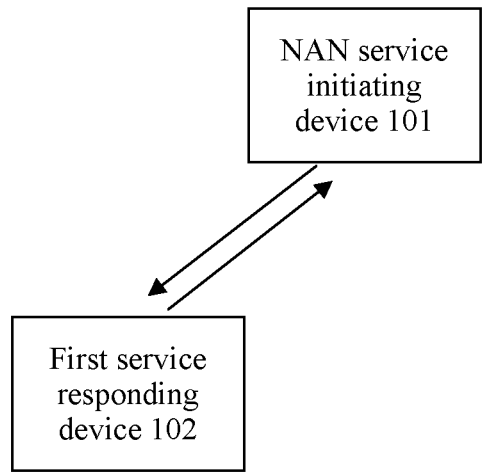
FIG. 1 is a schematic structural diagram of a NAN network according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To facilitate clear description of the technical solutions in the embodiments of the present invention, words such as "first" and "second", are used in the embodiments of the present invention to distinguish between same items or similar items with basically same functions or purposes. A person skilled in the art may understand that the words such as "first" and "second" do not restrict a quantity and an execution sequence.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. For example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

In addition, this application describes each aspect with reference to a wireless network device. The wireless network device may be a base station. The base station may be configured to communicate with one or more user equipments, or may be configured to communicate with one or more base stations having some functions of user equipment (for example, communication between a macro base station and a micro base station such as an access point). Alternatively, the wireless network device may be user equipment. The user equipment may be configured to communicate with one or more user equipments (for example, D2D communication), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a Session Initiation Protocol (session initiation protocol, SIP for short) phone, a smartphone, a wireless local loop (wireless local loop, WLL for short) station, a personal digital assistant (personal digital assistant, PDA for short), a laptop computer, a handheld communications device, a handheld computing device, a satellite wireless device, a wireless modem card, and/or another processing device for communication in a wireless system. The base station may also be referred to as an access point, a node, a NodeB, an evolved NodeB (eNB), or another network entity, and may include some or all functions of the foregoing network entities. The base station may communicate with a wireless terminal through an air interface. The communication may be performed by using one or more sectors. The base station may convert a received air interface frame into an IP packet, and is used as a router between the wireless terminal and a remaining part of an access network. The access network includes an Internet Protocol (Internet Protocol, IP for short) network. The base station may further coordinate air interface attribute management, and may be used as a gateway between a wired network and a wireless network.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of the present invention is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In the embodiments of the present invention, information (information), signal (signal), message (message), and channel (channel) may be interchangeably used sometimes. It should be noted that expressed meanings are consistent when differences are not emphasized. "Of (of)", "corresponding (corresponding or relevant)", and "corresponding (corresponding)" may be interchangeably used sometimes. It should be noted that expressed meanings are consistent when differences are not emphasized.

Network architectures and service scenarios described in the embodiments of the present invention are intended to more clearly describe the technical solutions in the embodiments of the present invention, but are not intended to limit the technical solutions provided in the embodiments of the present invention. A person of ordinary skill in the art may learn that as the network architectures evolve and a new service scenario emerges, the technical solutions provided in the embodiments of the present invention are also applicable to a similar technical problem.

The embodiments of the present invention may be applied to not only a time division duplex (time division duplexing, TDD for short) scenario but also a frequency division duplex (frequency division duplexing, FDD for short) scenario.

The embodiments of the present invention are illustrated based on a 4G network scenario in a wireless communications network. It should be noted that the solutions in the embodiments of the present invention may also be applied to another wireless communications network, and a corresponding name may be replaced with a corresponding function name in the another wireless communications network.

With the beginning of a mobile Internet era, a mainstream pattern in the Internet industry is social, localized, and mobile. Mobile devices equipped with Wireless Fidelity (Wireless Fidelity, Wi-Fi for short) interfaces are widely used in various industries because of high transmission rates of the Wi-Fi interfaces. With improvement of a Wi-Fi technology, a neighbor awareness networking (Neighbor Awareness Networking, NAN for short) technology based on the Wi-Fi technology is becoming a hotspot in the industry. The NAN technology allows all devices participating in NAN to be synchronized without a central node. NAN maintenance and a service discovery are performed in a NAN-agreed discovery window (Discovery window, DW for short). In this way, a Wi-Fi device continuously discovers a nearby device and application and nearby information before creating a connection, and a user may configure the application to publish the user's information and application acceptance information. A NAN network including a plurality of NAN devices is referred to as a NAN cluster, devices in a same NAN cluster have a same cluster identifier, and each device has its own attribute, including a role (Role) and a state (State). There are two roles: a master (Master) device and a non-master (non-Master) device. There are two states: synchronization (Synchronization, sync for short) and non-synchronization (non-Synchronization, non-sync for short). A device in a sync state is responsible for maintaining cluster synchronization. The master is certainly in a sync state, and the non-master may be in a sync state or a non-sync state. Each device further includes a master rank (Master Rank, MR for short), and a master with a highest MR in the NAN cluster is an anchor master (Anchor Master, AM for short) device, and all other devices keep time synchronization with the AM, so that synchronization of the entire NAN cluster is ensured.

In a typical application scenario of a NAN cluster, a service discovery is performed between devices before association. To perform the service discovery between the devices, the devices in the NAN cluster need to keep synchronized, so that the device in the NAN cluster can work on a NAN discovery channel in a specific time period and keep in an awake (awake) state. For example, the NAN discovery channel is a channel 6. The device wakes up only when a DW arrives, and performs a service discovery and cluster synchronization on the discovery channel. A device outside the DW other than a master device may be in a standby state.

A device in the NAN network may notify, by sending a discovery service (Service Descriptor Frame, SDF for short) message in a DW, another device in the NAN network of a status change of the device, that is, notify the another NAN device in the NAN network in which the device is located of a service that needs to be subscribed to or published by the device. Further, the device exchanges the service discovery message with some NAN devices, to further determine information used for subsequently establishing a data link for service data exchange. The service discovery message may carry two types of information: information indicating a service, where the service may be indicated by using a service identifier or a service name; and information indicating a requirement for the service, where the requirement may be indicated by using a service control type in the service discovery message. For example, in an existing NAN standard, the service control type carried in the service discovery message may be service publish (SDF Publish), service subscribe (SDF Subscribe), and service follow-up (SDF Follow-Up). A NAN device receiving the service discovery message can determine that service matching succeeds only when the foregoing two types of information can be matched. Specifically, when a NAN device can provide a service indicated by the NAN device, the NAN device sends a service publish message to enable a nearby NAN device that needs to use the service to receive the service publish message and then determine that service matching succeeds, so that a data connection can be further established to exchange service data of the service that is subscribed to or published, and a nearby NAN device that also provides the service does not respond to the service publish message. A service query message indicates that the NAN device needs to use the service indicated by the NAN device. A service subscribe message is sent to enable a nearby NAN device that can provide the service to receive the service subscribe message and then determine that service matching succeeds, so that a data connection can be further established to exchange service data of the service that is subscribed to or published, and a nearby NAN device that also needs to use the service does not respond. The device receiving the service discovery message may match a service that is subscribed to or published by using the service discovery message to perform a service discovery with a service that is provided or required by the device, and when the matching succeeds, the device receiving the service discovery message responds to the device sending the service discovery message.

Embodiment 1

Figure 2:
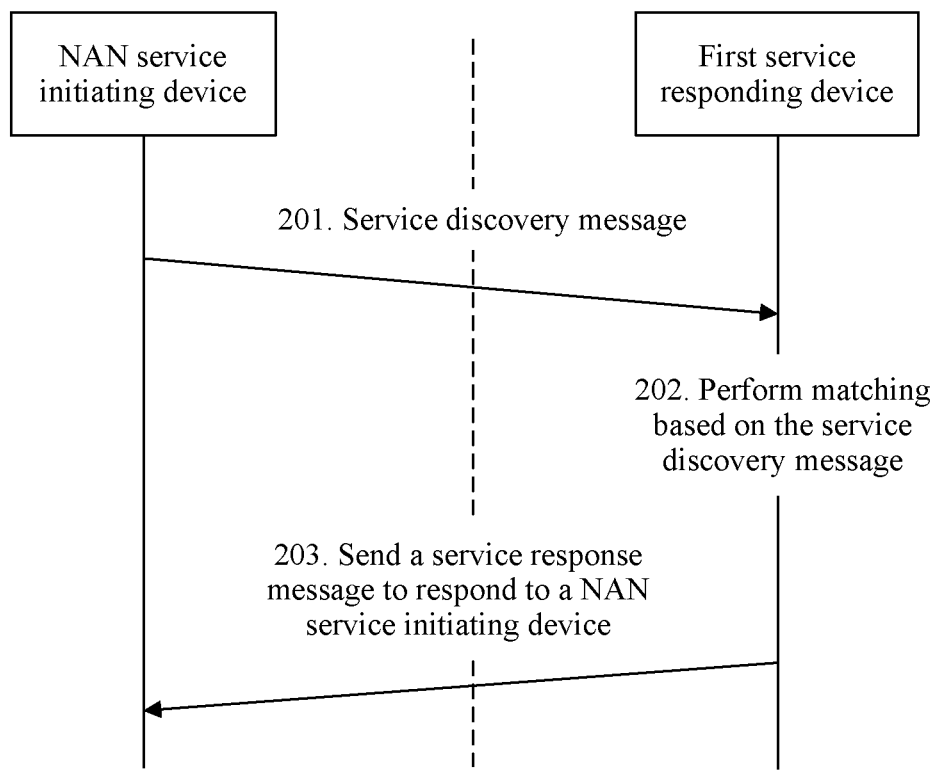
FIG. 2 is a schematic flowchart of a service discovery method performed by a device in a NAN network according to an embodiment of the present invention.

This embodiment of the present invention provides a service discovery method performed by a device in a NAN network. As shown in FIG. 1 and FIG. 2, the NAN network includes a NAN service initiating device 101 and a first service responding device 102, and the method includes the following steps.

201. The NAN service initiating device sends a service discovery message.

The NAN service initiating device sends the service discovery message based on a service that is subscribed to or published by the NAN service initiating device, and the service discovery message includes information about the service that is subscribed to or published by the NAN service initiating device. For example, the service discovery message carries a matching identifier indicating the service that is subscribed to or published by the NAN service initiating device. The NAN service initiating device sends the service discovery message through broadcasting, and the first service responding device within a signal coverage area of the NAN service initiating device may receive the service discovery message.

202. The first service responding device receives the service discovery message and performs matching based on the service discovery message.

The first service responding device performs, based on the information about the service that is subscribed to or published by the NAN service initiating device in the service discovery message, matching with a service that is required or can be provided by the first service responding device.

203. The first service responding device sends a service response message to the NAN service initiating device, to respond to the NAN service initiating device.

With development of technologies, when a NAN device supports only a single-hop service discovery, due to a limitation of a Wi-Fi technology, a transmission distance of the Wi-Fi technology is limited only to a 0-100 meter range, and the Wi-Fi technology cannot be well applied in some large-range scenarios such as a large shopping mall or a stadium. Limited by the transmission distance of Wi-Fi, NAN can be applied only to a user in a specified area. Therefore, it is further required to enable a NAN device to support a multi-hop NAN data link.

Figure 3:
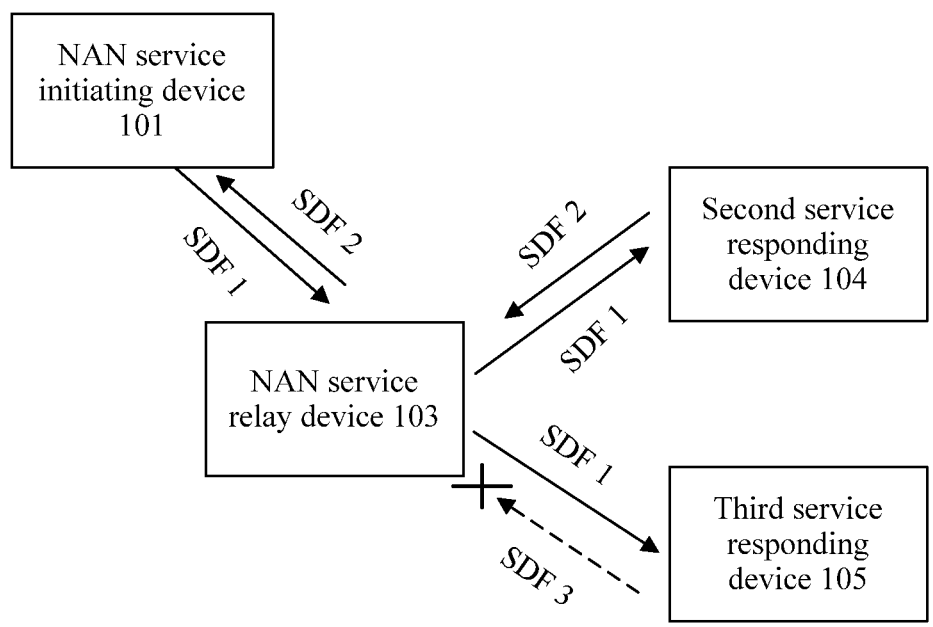
FIG. 3 is a schematic structural diagram of a NAN network according to another embodiment of the present invention.

As shown in FIG. 3, an embodiment of the present invention provides a NAN network. A NAN service initiating device (also referred to as a first NAN device in this specification) 101, a NAN service relay device (also referred to as a second NAN device in this specification) 103, and a second service responding device 104 (also referred to as a third NAN device in this specification) support a multi-hop service discovery, and a third service responding device 105 supports only a single-hop service discovery.

Figure 4:
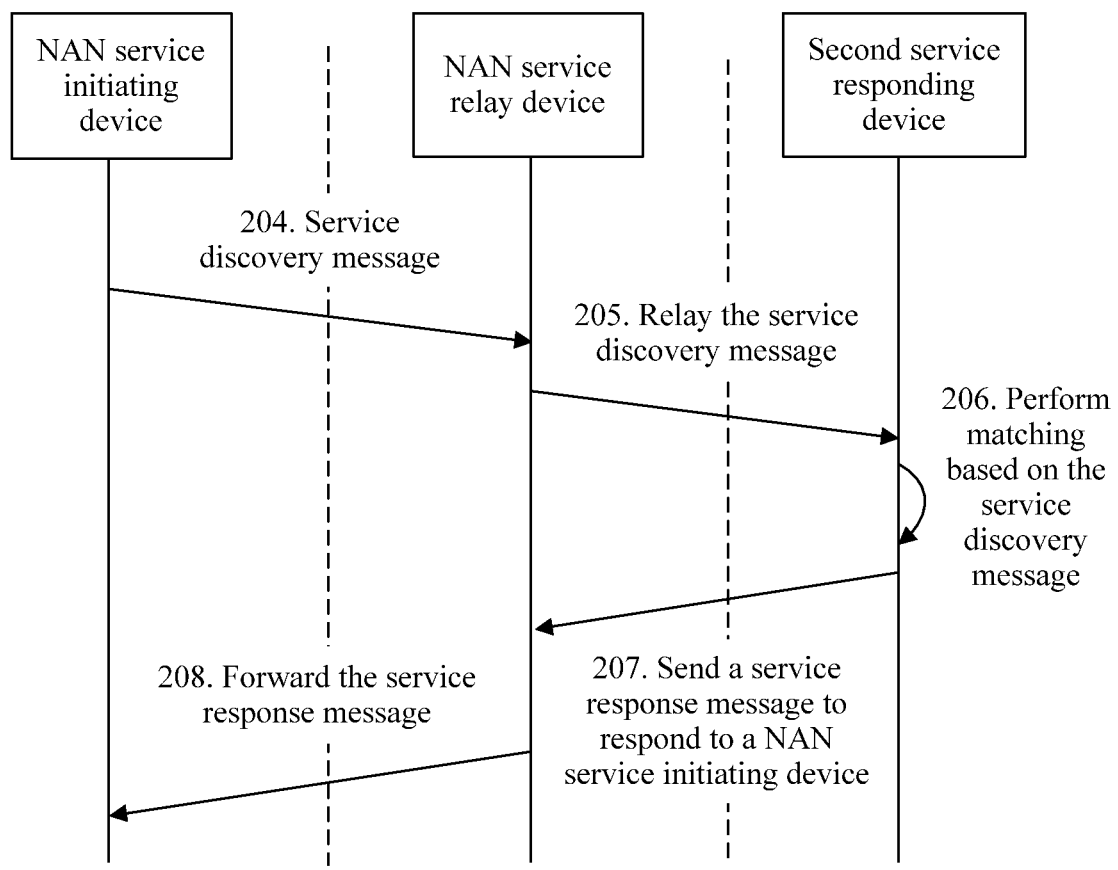
FIG. 4 is a schematic flowchart of a service discovery method performed by a device in a NAN network according to another embodiment of the present invention.

As shown in FIG. 3 and FIG. 4, for the NAN service initiating device 101, the NAN service relay device 103, and the second service responding device 104, an embodiment of the present invention provides a multi-hop service discovery method, and the method includes the following steps.

204. The NAN service initiating device sends a service discovery message.

The first NAN device sends the service discovery message based on a service that is subscribed to or published by the first NAN device, and the service discovery message includes information about the service that is subscribed to or published by the first NAN device. For specific content, refer to step 201. Details are not described herein again.

205. The NAN service relay device relays the service discovery message to the second service responding device based on the received service discovery message.

206. The second service responding device performs matching based on the service discovery message.

The second service responding device performs, based on the information about the service that is subscribed to or published by the NAN service initiating device in the service discovery message, matching with a service that can be provided by the second service responding device. When the matching succeeds, step 207 is performed.

207. The second service responding device sends a service response message for the NAN service initiating device to the NAN service relay device, to respond to the NAN service initiating device.

208. The NAN service relay device forwards the service response message to the NAN service initiating device.

In the foregoing method, the NAN service relay device and the second service responding device that support the multi-hop service discovery may determine, based on the received service discovery message, whether the message is a single-hop service discovery message or a multi-hop service discovery message. When the service discovery message needs to be forwarded, the NAN service relay device forwards the service discovery message, and when the service carried in the service discovery message matches the service that is required or can be provided by the second service responding device, the second service responding device sends the service response message for the NAN service initiating device to the NAN service relay device that relays the service discovery message, so that the NAN service relay device can forward the service response message to the NAN service initiating device, and the NAN service initiating device can receive the response of the second service responding device.

Embodiment 2

Figure 5:
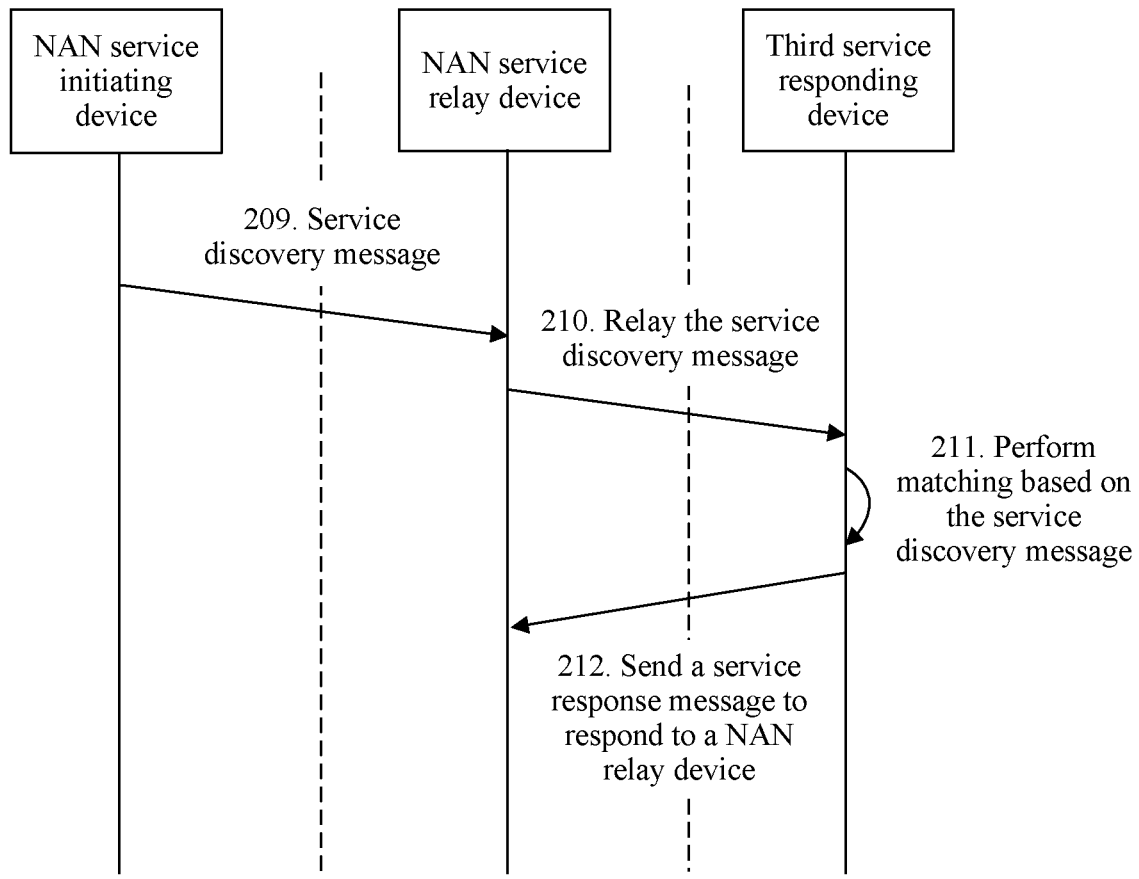
FIG. 5 is a schematic flowchart of a service discovery method performed by a device in a NAN network according to another embodiment of the present invention.

As shown in FIG. 3 and FIG. 5, for the NAN service initiating device 101, the NAN service relay device 103, and the third service responding device 105, this embodiment of the present invention provides a service discovery method performed by a device in a NAN network, and the method includes the following steps.

209. The NAN service initiating device sends a service discovery message.

The NAN service initiating device sends the service discovery message based on a service that is subscribed to or published by the NAN service initiating device, and the service discovery message includes information about a service that is required by the NAN service initiating device.

210. The NAN service relay device receives the service discovery message and relays the service discovery message to the third service responding device.

211. The third service responding device performs matching based on the service discovery message.

The third service responding device performs, based on information about the service that is subscribed to or published by the NAN service initiating device in the service discovery message, matching with a service that is required or can be provided by the third service responding device. When the matching succeeds, step 212 is performed.

212. The third service responding device sends a service response message for the NAN service relay device to the NAN service relay device, to respond to the NAN service relay device.

In the foregoing method, when the third service responding device that supports only the single-hop service discovery receives the relayed service discovery message, the third service responding device identifies the relayed service discovery message as a single-hop service discovery message sent by the NAN service relay device, so that the third service responding device matches the relayed service discovery message with the service that is required or can be provided by the third service responding device, and when the matching succeeds, the third service responding device considers the NAN service relay device as a NAN service initiating device, and sends the service response message for the NAN service relay device to the NAN service relay device. Because the NAN service relay device cannot provide the service required by the third service responding device, the NAN service relay device does not reply to the response of the third service responding device. In this case, the response produced by the third service responding device for the relayed multi-hop service discovery message becomes an invalid response, and consequently the third service responding device and the NAN service relay device waste device resources and network resources.

In this embodiment of the present invention, service identifier information or service control type information carried in a service discovery message is modified in a NAN device that relays the service discovery message. When a NAN device receiving the relayed service discovery message supports a multi-hop service discovery, the NAN device can obtain, based on the service discovery message, service identifier information or service control type information existing before the modification, performs, based on the service identifier information or the service control type information existing before the modification, matching with a service that is required or can be provided by the NAN device, and responds when the matching succeeds. When a NAN device receiving the relayed service discovery message does not support a multi-hop service discovery, the NAN device cannot obtain service identifier information or service control type information existing before the modification, and therefore cannot perform, based on the service identifier information or the service control type information existing before the modification, matching with a service that is required or can be provided by the NAN device. In this way, the NAN device that does not support the multi-hop service discovery is enabled not to respond to the relayed multi-hop service discovery message on the premise that the relayed service discovery message can be correctly received by the NAN device that supports the multi-hop service discovery.

Embodiment 3

Figure 6:
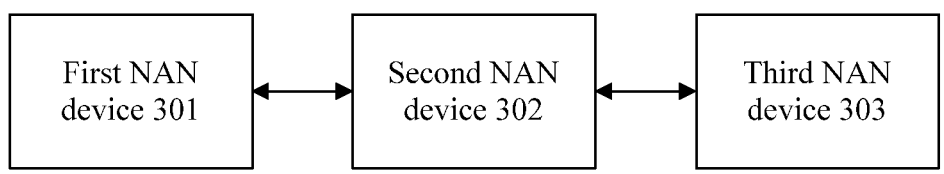
FIG. 6 is a schematic structural diagram of a NAN network according to another embodiment of the present invention.

This embodiment of the present invention can be applied to a communications system shown in FIG. 6. The communications system includes a first NAN device 301, a second NAN device 302, and a third NAN device 303. Both the second NAN device 302 and the third NAN device 303 support a multi-hop service discovery. The second NAN device 302 and the third NAN device 303 each may be used as a relay device to forward, to another NAN device, a service discovery message that needs to be relayed, and may also be used as a relay device to provide a data link for the another NAN device for relay. It should be noted that, the second NAN device 302 and the third NAN device 303 each may respond to the service discovery message that matches the second NAN device 302 and the third NAN device 303.

In the embodiments of the present invention, for example, the first NAN device 301 may be a NAN service initiating device, and is configured to send a service discovery message to perform a service discovery, that is, to publish, to another device, a service that is subscribed to by the first NAN device (in other words, a service that is required) or a service that is published by the first NAN device (in other words, a service that can be provided). The second NAN device 302 is used as a service relay device that relays the service discovery initiated by the first NAN device. The third NAN device 303 is a device receiving the message that is relayed by the second NAN device 302 and that is used for the service discovery. The third NAN device 303 may be a NAN device (the second service responding device 104 shown in FIG. 3) that supports the multi-hop service discovery, and may respond to the service discovery message that matches the third NAN device 303.

Embodiment 4

Figure 7:
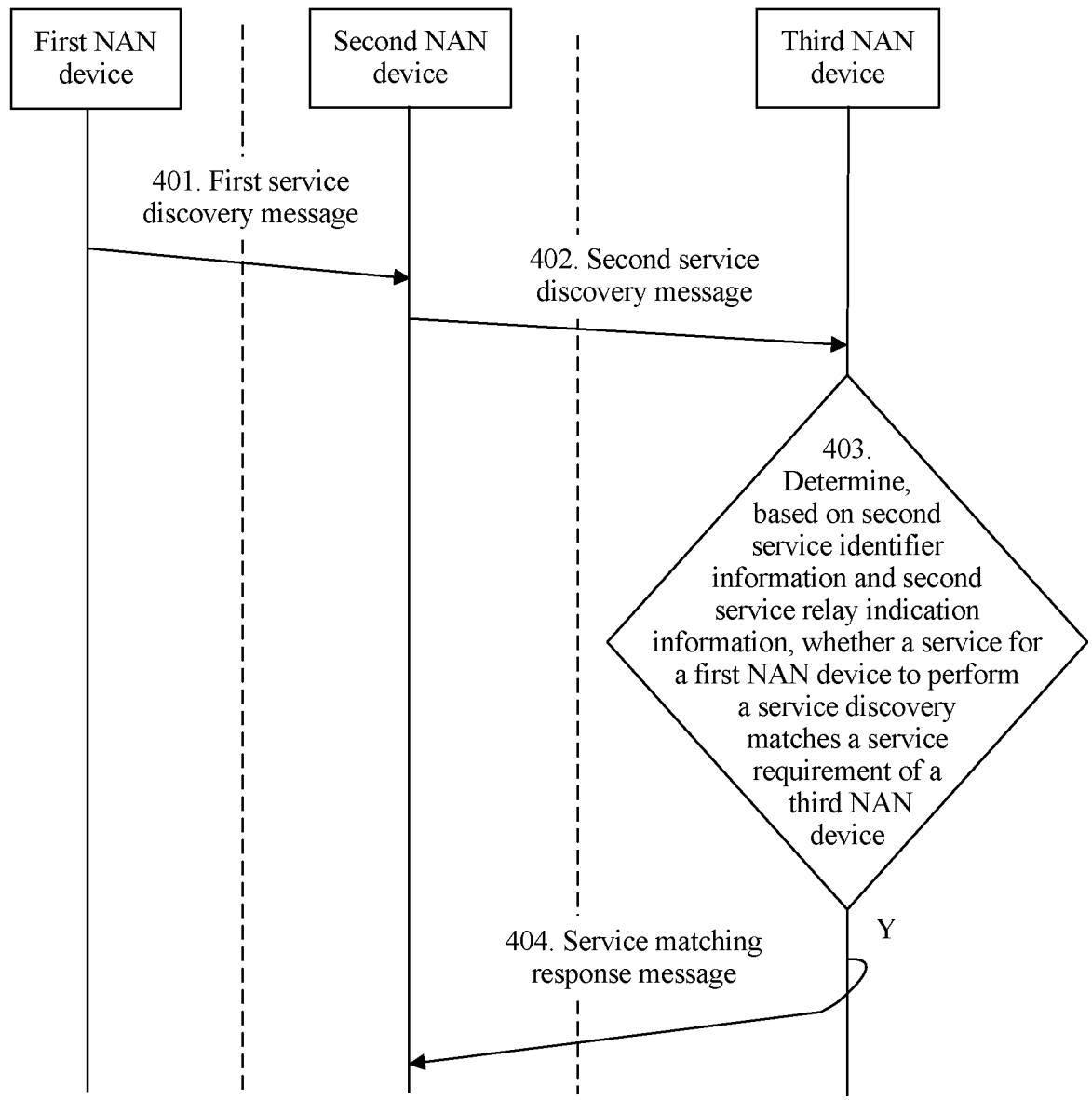
FIG. 7 is a schematic flowchart of a service discovery method according to an embodiment of the present invention.

To resolve the foregoing problem, as shown in FIG. 7, this embodiment of the present invention provides a multi-hop service discovery method. The method is applied to the communications system provided in the foregoing embodiment and includes the following steps.

401. A second NAN device receives a first service discovery message that is sent by a first NAN device and that is used for a service discovery, where the first service discovery message includes first service identifier information and first service relay indication information. The first service identifier information is used to indicate a service corresponding to the first service discovery message (namely, a service that is subscribed to or published by using the first service discovery message), and the first service relay indication information is used to indicate a quantity of times the service discovery has been relayed.

That the first service discovery message is used for the service discovery means that the first service discovery message is used to notify another NAN device in a same NAN network of a status change of the first NAN device, that is, notify a service that needs to be subscribed to or published by the first NAN device or a response to the another NAN device such as follow-up. Further, the first NAN device may further send the first service discovery message to the another NAN device, to further determine information used for establishing a data link for service data exchange.

That the first NAN device sends the first service discovery message is specifically: the first NAN device may send the first service discovery message through broadcasting in a NAN network in which the first NAN device is located, so that the second NAN device within a signal coverage area of the first NAN device can receive the first service discovery message; or the first NAN device may send the first service discovery message to the second NAN device in a unicast manner, provided that the second NAN device can receive the first service discovery message.

Specifically, a NAN device receiving the first service discovery message may match, based on the first service identifier information, the service that is subscribed to or published by using the first service discovery message with a service that is required or can be provided by the NAN device receiving the first service discovery message. The first service identifier information may include information, carried in the first service discovery message, about a service that is subscribed to or published to perform the service discovery. When the NAN device receiving the first service discovery message performs matching on the first service discovery message, the NAN device needs to match the information about the service that is subscribed to or published to perform the service discovery with a service requirement of the NAN device, namely, a service control type. When the matching succeeds, the NAN device responds based on the received first service discovery message. The service that is subscribed to or published to perform the service discovery may be a service that is subscribed to or published by the first NAN device, and may include a service identifier or a service name. The service control type may be service publish, service subscribe, and service follow-up.

Specifically, the first service relay indication information is used to indicate the quantity of times the service discovery has been relayed, and the service discovery may mean that a service that is subscribed to or can be provided by the first NAN device is indicated by using the first service discovery message.

That the service discovery is relayed may be specifically: a device sending the first service discovery message may not be a device that is corresponding to the first service discovery message and that can subscribe to or provide a service (which may also be understood as a device generating the first service discovery message). The first service discovery message may be sent by a service relay device, and the second NAN device herein serves as a service relay device that relays the first service discovery message. The service relay device may further spread, after receiving a service discovery message used for the service discovery, service information (such as service identifier information) in the service discovery message, or may further spread, after receiving a relayed service discovery message sent by another service relay device, service information in the relayed service discovery message. The service information in the relayed service discovery message may be different from or the same as the service information in the original service discovery message. A process in which a service relay device receives a service discovery message and sends another service discovery message to spread service information that is in the received service discovery message and that is used for the service discovery is also referred to as service discovery relay. A quantity of times a service corresponding to service information carried in the first service discovery message is relayed by a service relay device may also be expressed as the quantity of times the service discovery has been relayed. For example, if the first service discovery message is sent by the device generating the first service discovery message, the quantity of times the service discovery has been relayed is 0; or if the first service discovery message is sent by a first service relay device, the quantity of times the service discovery corresponding to the first service discovery message has been relayed is 1. The first service relay indication information may directly indicate that the service discovery corresponding to the first service discovery message has been relayed, or may be information indirectly indicating that the service discovery corresponding to the first service discovery message has been relayed, for example, a quantity of times the first service discovery message has been relayed.

It should be noted that, the first service relay indication information is used to indicate the quantity of times the service discovery has been relayed. It may also be understood that if the service discovery has been relayed, although the quantity of times the service discovery has been relayed that are indicated by the first service relay indication information may not be totally consistent with an actual quantity of times, the first service relay indication information may be used to determine whether the service discovery has been relayed, that is, whether the service discovery is a multi-hop service discovery.

For example, the first service relay indication information is a hop count (Hopcount), and the hop count is an actual hop count between a NAN device sending the first service discovery message and a NAN device generating the first service discovery message. When the hop count is greater than 0, the first service discovery message has been relayed at least once. When the second NAN device determines, based on the first service relay indication information, that the quantity of times the service discovery has been relayed is less than a maximum hop count, the second NAN device generates, based on the first service discovery message, a second service discovery message used for the service discovery, and determines to relay the service discovery.

Specifically, the quantity of times the service discovery has been relayed may also be a quantity of times a NAN device receiving a service discovery message used for the service discovery generates another service discovery message based on information carried in the received service discovery message. Specifically, a NAN device in a NAN network is configured as follows: Each time when a NAN device receives a service discovery message used for the service discovery, the NAN device generates another service discovery message based on information carried in the received service discovery message, and in this case, a quantity of NAN devices through which the service discovery message used for the service discovery passes in a transmission path may be the quantity of times the service discovery has been relayed. Alternatively, a NAN device in a NAN network is configured as follows: a NAN device at a specified location generates another service discovery message according to a preset rule based on information carried in a received service discovery message, and in this case, a quantity of NAN devices at specified locations through which the service discovery message used for the service discovery passes may be the quantity of times the service discovery has been relayed. For example, the first three relay devices in a transmission path of a service discovery message that is sent by a NAN device generating the service discovery message generate another service discovery message based on information carried in service discovery messages separately received by the first three relay devices.

It should be noted that, the first service identifier information may be a service name of the service that is subscribed to or published to perform the service discovery, or may be a value obtained after a conversion operation is performed on a service name of the service that is subscribed to or published, provided that a NAN device that responds to the service discovery message needs to match, based on the first service identifier information, the service that is subscribed to or published by using the first service discovery message with a service that is subscribed to or published by the NAN device. When the first service discovery message is not relayed and does not need to be relayed by the second NAN device, the second NAN device may match, based on the first service identifier information, the service that is subscribed to or published by the first NAN device by using the first service discovery message to perform the service discovery with a service requirement of the second NAN device.

Preferably, a hash operation is performed on the service name (Service Name) of the service that is subscribed to or published, and then first 48 bits are used as the first service identifier information.

It should be noted that the first service identifier information may be directly carried in the first service discovery message, or may be implicitly carried in the first service discovery message in another form. Specifically, the first service identifier information is implicitly carried in the first service discovery message in a form such as a Bloom filter (Bloom filter).

402. The second NAN device generates, based on the first service discovery message, a second service discovery message used for the service discovery, and sends the second service discovery message, where the second NAN device serves as a service relay device that relays the service discovery initiated by the first NAN device.

The second service discovery message includes second service identifier information and second service relay indication information.

The generating the second service discovery message based on the first service discovery message includes: generating the second service identifier information based on the first service identifier information, and generating the second service relay indication information based on the first service relay indication information.

The first service identifier information is different from the second service identifier information, the second service identifier information is used to indicate information about a service corresponding to the second service discovery message, namely, information about a service that is subscribed to or published by using the second service discovery message, and the second service relay indication information is used to indicate a quantity of times the service discovery has been relayed.

That the second service identifier information is different from the first service identifier information is specifically: when a NAN device that does not support a multi-hop service discovery receives a service discovery message including the second service identifier information, a service obtained by the NAN device based on the second service identifier information is different from a service obtained by the NAN device based on the first service identifier information. When a third NAN device in this embodiment of the present invention receives the service discovery message including the second service identifier information, a service that may be obtained by the third NAN device based on the second service identifier information and the second service relay indication information is the same as a service obtained by the third NAN device based on the first service identifier information and the first service relay indication information. Still further, the third NAN device may obtain, based on the second service identifier information and the second service relay indication information, a service that is required or can be provided by a NAN device generating the service discovery message. Therefore, when a NAN device receiving the second service discovery message is a NAN device that does not support the multi-hop service discovery, even if a service requirement of the NAN device corresponds to a service matching a service that is subscribed to or can be provided by the NAN device generating the service discovery message, the NAN device cannot match, based on the second service identifier information, the service that is subscribed to or can be provided by the NAN device generating the service discovery message with the service requirement of the NAN device. In this way, the NAN device determines that the service requirement of the NAN device does not match the service that is subscribed to or can be provided by the NAN device generating the service discovery message, and the NAN device does not respond.

It should be noted that, the second service relay indication information is used to indicate the quantity of times the service discovery has been relayed. It may also be understood that if the service discovery has been relayed, although the quantity of times the service discovery has been relayed that are indicated by the second service relay indication information may not be totally consistent with an actual quantity of times, the second service relay indication information may be used to determine whether the service discovery indicated by the second service relay indication information has been relayed, that is, whether the service discovery is a multi-hop service discovery.

The second service relay indication information is generated based on the first service relay indication information, where the second service relay indication information is used to indicate a quantity of times service publication is relayed. The quantity of times the service publication is relayed may be 1 plus a quantity of times the service publication is relayed that are indicated by the first service relay indication information, or may be a preset value plus a quantity of times the service publication is relayed that are indicated by the first service relay indication information, provided that a quantity of times the service publication is relayed that are corresponding to the second service discovery message can be 1 plus a quantity of times the service publication is relayed that are corresponding to the first service discovery message.

The generating the second service identifier information based on the first service identifier information may be generating the second service identifier information according to a preset rule or a preset parameter in the second NAN device based on the first service relay indication information, provided that when a NAN device that does not support the multi-hop service discovery and has a service matching the service corresponding to the first service discovery message receives the service discovery message carrying the second service identifier information, the NAN device cannot match, based on the second service identifier information, a service that is subscribed to or published by using the second service discovery message with the service that is required or can be provided by the NAN device, and when a NAN device that supports the multi-hop service discovery and has a service matching the service corresponding to the first service discovery message receives the service discovery message carrying the second service identifier information, the NAN device may generate the first service identifier information according to the preset rule or the preset parameter in the second NAN device based on the second service identifier information and the second service relay indication information.

For example, the first NAN device performs a reversible operation such as addition/subtraction/multiplication/division on the first service identifier information and a preset value or performs an operation of inverting, filling, disordering, or replacing some bits, to obtain the second service identifier information.

It should be noted that, a service relay device is a device that spreads, by using a relayed service discovery message, service information (such as service identifier information) of a NAN device generating the service discovery message. The service relay device may be implemented as a dedicated device such as a proxy (proxy) device or a NAN device that is in the NAN network and that performs a relay function according to a rule. This is not limited in the present invention.

The second NAN device may send the second service discovery message through broadcasting in a NAN network in which the second NAN device is located, so that the third NAN device within the signal coverage area of the first NAN device can receive the second service discovery message; or the second NAN device may send the second service discovery message to the third NAN device in a unicast manner, provided that the third NAN device can receive the second service discovery message.

The second service identifier information and the second service relay indication information may be directly carried in the second service discovery message, or may be implicitly carried in the second service discovery message in another form. Specifically, the second service identifier information is implicitly carried in the second service discovery message in a form such as a Bloom filter (Bloom filter).

403. A third NAN device determines, based on second service identifier information and second service relay indication information, whether a service that is subscribed to or published by the first NAN device to perform the service discovery matches a service requirement of the third NAN device.

A rule or a parameter may be preset in the third NAN device. The third NAN device may obtain third service identifier information according to the preset rule or the preset parameter based on the second service identifier information and the second service relay indication information, where the third service identifier information is used to indicate the service that is subscribed to or published by the first NAN device to perform the service discovery. The third NAN device determines, by comparing the service indicated by the third service identifier information with a service corresponding to the service requirement of the third NAN device, whether the service that is subscribed to or published by the first NAN device to perform the service discovery matches the service requirement of the third NAN device. Alternatively, the third NAN device may generate fourth service identifier information according to the preset rule or the preset parameter based on the second service identifier information and the service corresponding to the service requirement of the third NAN device, where the fourth service identifier information is used to indicate the service corresponding to the service requirement of the third NAN device. The third NAN device determines, by comparing the fourth service identifier information with the second service identifier information, whether the service that is subscribed to or published by the first NAN device to perform the service discovery matches the service requirement of the third NAN device.

It should be noted that, the preset rule or the preset parameter in the third NAN device corresponds to the preset rule or the preset parameter in the second NAN device. When the second NAN device obtains the second service identifier information and the second service relay indication information according to the preset rule or the preset parameter based on the first service identifier information and the first service relay indication information, the third NAN device may obtain the first service identifier information and the first service relay indication information according to the corresponding preset rule or the corresponding preset parameter based on the second service identifier information and the second service relay indication information. When a rule or a parameter the same as the preset rule or the preset parameter in the second NANA device is preset in each NAN device that relays the first service discovery message, the third NAN device may further obtain, according to the corresponding preset rule or the corresponding preset parameter based on the first service identifier information and the first service relay indication information, the service that is subscribed to or published by the first NAN device to perform the service discovery.

Preferably, before step 403, the third NAN device may further determine, based on the second service relay indication information, whether the second service discovery message needs to be relayed.

The third NAN device determines, based on the second service relay indication information carried in the second service discovery message, whether the second service discovery message has been relayed. Specifically, when a quantity of times the second service discovery message has been relayed that are indicated by the second service relay indication information is greater than 0, the third NAN device may directly determine whether the second service discovery message has been relayed.

404. The third NAN device sends a service matching response message to the second NAN device.

Specifically, when the matching succeeds, the third NAN device may send a first service response message for the first NAN device to the second NAN device, and the second NAN device may send a second service response message to the first NAN device based on the first service response message. In addition, a NAN data link between the first NAN device and the second NAN device and a NAN data link between the second NAN device and the third NAN device are separately established.

According to the service discovery method provided in this embodiment of the present invention, the second NAN device receives the first service discovery message that is sent by the first NAN device and that includes the first service identifier information and the first service relay indication information; and the second NAN device generates the second service identifier information and the second service relay indication information based on the first service identifier information and the first service relay indication information, and sends, to the third NAN device, the second service discovery message carrying the second service identifier information and the second service relay indication information, where the second service identifier information is different from the first service identifier information. In this way, when receiving the second service discovery message and determining, based on the second service relay indication information, that the second service discovery message has been relayed, the third NAN device can match, based on the second service identifier information and the second service relay indication information, the service that is subscribed to or published by the first NAN device to perform the service discovery with the service requirement of the third NAN device, and when the matching succeeds, responds based on the service that is subscribed to or published by the first NAN device to perform the service discovery.

When the third NAN device in this embodiment of the present invention receives the service discovery message including the second service identifier information, a service that may be obtained by the third NAN device based on the second service identifier information and the second service relay indication information is the same as a service obtained by the third NAN device based on the first service identifier information and the first service relay indication information. Still further, the second NAN device may obtain, based on the second service identifier information and the second service relay indication information, a corresponding service for a service publishing device to perform service publication. Therefore, matching can be performed, based on the second service identifier information and the second service relay indication information, on the service that is subscribed to or published by the first NAN device to perform the service discovery and the service requirement of the third NAN device. When a NAN device receiving the second service discovery message is a NAN device that does not support the multi-hop service discovery, even if a service requirement of the NAN device corresponds to a service matching the service for the service publishing device to perform the service publication, the NAN device cannot match, based on the second service identifier information, the service for the service publishing device to perform the service publication with the service requirement of the NAN device. In this way, the NAN device determines that the service requirement of the NAN device does not match the service for the service publishing device to perform the service publication, and the NAN device does not respond. Therefore, in the service discovery method provided in this embodiment of the present invention, the NAN device that does not support the multi-hop service discovery is enabled not to respond to a relayed multi-hop service discovery message on the premise that the relayed service discovery message is correctly received by a NAN device that supports the multi-hop service discovery.

Embodiment 5

Figure 8:
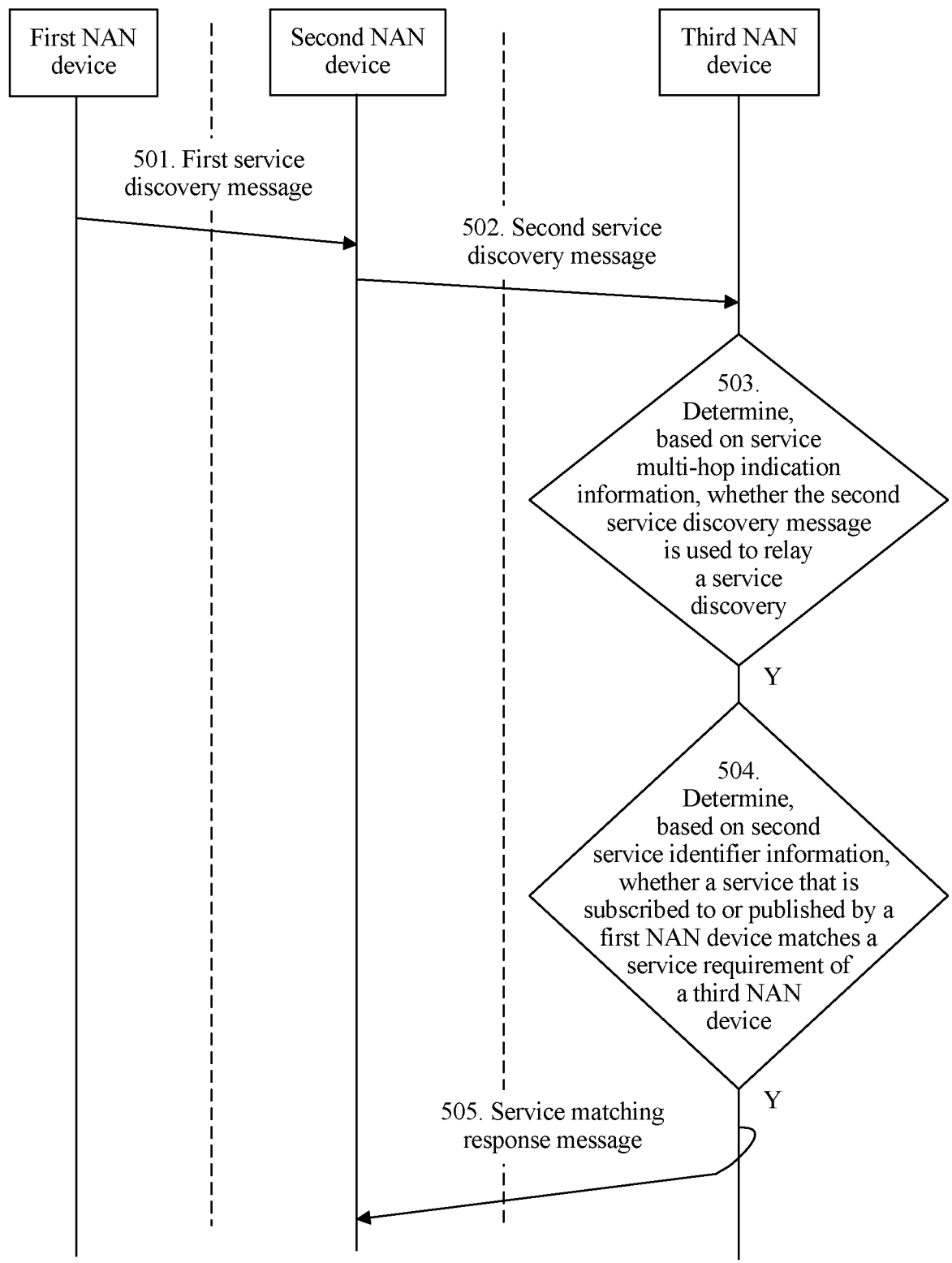
FIG. 8 is a schematic flowchart of a service discovery method according to another embodiment of the present invention.

Specifically, as shown in FIG. 8, this embodiment of the present invention provides a service discovery method. The method is applied to the communications system provided in the foregoing embodiment and includes the following steps.

501. A second NAN device receives a first service discovery message sent by a first NAN device, where the first service discovery message is used for a service discovery, the first service discovery message includes first service identifier information, and the first service identifier information is used to indicate a service corresponding to the first service discovery message.

That the first service discovery message is used for the service discovery means that the first service discovery message is used to notify another NAN device in a same NAN network of a status change of the first NAN device, that is, notify a service that needs to be subscribed to or published by the first NAN device or a response to the another NAN device such as follow-up. Further, the first NAN device may further send the first service discovery message to the another NAN device, to further determine information used for establishing a data link for service data exchange.

That the first NAN device sends the first service discovery message is specifically: the first NAN device may send the first service discovery message through broadcasting in a NAN network in which the first NAN device is located, so that the second NAN device within a signal coverage area of the first NAN device can receive the first service discovery message; or the first NAN device may send the first service discovery message to the second NAN device in a unicast manner, provided that the second NAN device can receive the first service discovery message.

Specifically, a NAN device receiving the first service discovery message may match, based on the first service identifier information, a service that is subscribed to or published by using the first service discovery message with a service that is required or can be provided by the NAN device receiving the first service discovery message. The first service identifier information may include information about a service that is subscribed to or published by the first NAN device to perform the service discovery. When the NAN device receiving the first service discovery message performs matching on the first service discovery message, the NAN device needs to match the information about the service that is subscribed to or published to perform the service discovery with a service requirement of the NAN device, namely, a service control type. When the matching succeeds, the NAN device responds based on the received first service discovery message. The service that is subscribed to or published to perform the service discovery may be a service that is subscribed to or published by the first NAN device, and may include a service identifier or a service name. The service control type may be service publish, service subscribe, and service follow-up.

Preferably, a hash operation is performed on a service name (Service Name) of the service that is subscribed to or published, and then first 48 bits are used as the first service identifier information.

It should be noted that the first service identifier information may be directly carried in the first service discovery message, or may be implicitly carried in the first service discovery message in another form. Specifically, the first service identifier information is implicitly carried in the first service discovery message in a form such as a Bloom filter (Bloom filter).

502. The second NAN device generates, based on the first service discovery message, a second service discovery message used for the service discovery, and sends the second service discovery message, where the second service discovery message includes second service identifier information and multi-hop service indication information, and the second service identifier information is different from the first service identifier information.

The second NAN device serves as a service relay device that relays the service discovery initiated by the first NAN device.

The multi-hop service indication information is used to indicate that the second service discovery message is used to relay the service discovery. That the service discovery is relayed is specifically: a device sending the first service discovery message may not be the corresponding first NAN device that performs the service discovery by using the first service discovery message. The first service discovery message may be sent by a service relay device, and the second NAN device herein serves as a service relay device that relays the first service discovery message. The service relay device may further spread, after receiving a service discovery message that is sent by the first NAN device and that is used for the service discovery, service information (such as service identifier information) in the service discovery message, or may further spread, after receiving a relayed service discovery message sent by another service relay device, service information in the relayed service discovery message. The service information in the relayed service discovery message may be different from or the same as the service information in the original service discovery message sent by the first NAN device. A process in which a service relay device receives a service discovery message and sends another service discovery message to spread service information that is in the received service discovery message and that is used for the service discovery is also referred to as service discovery relay.

It should be noted that, a service relay device is a device that spreads service information (such as service identifier information) of the first NAN device by using a relayed service discovery message. The service relay device may be implemented as a dedicated device such as a proxy (proxy) device or a NAN device that is in a NAN network and that performs a relay function according to a rule. This is not limited in the present invention. For example, the multi-hop service indication information includes a hop count (Hopcount), and the hop count is an actual hop count between a NAN device sending the second service discovery message and the first NAN device, that is, a quantity of times the second service discovery message has been relayed. When the hop count is greater than 0, the second service discovery message has been relayed at least once.

That the second service identifier information is different from the first service identifier information is specifically: when a NAN device that does not support a multi-hop service discovery receives a service discovery message including the second service identifier information, a service obtained by the NAN device based on the second service identifier information is different from a service obtained by the NAN device based on the first service identifier information. However, when a third NAN device in this embodiment of the present invention receives the service discovery message including the second service identifier information, a service that may be obtained by the third NAN device based on the second service identifier information is the same as a service obtained by the third NAN device based on the first service identifier information. Still further, the second NAN device may obtain, based on the second service identifier information, a corresponding service for a service publishing device to perform service publication. Therefore, when a NAN device receiving the second service discovery message is a NAN device that does not support the multi-hop service discovery, even if a service requirement of the NAN device corresponds to a service matching the service for the service publishing device to perform the service publication, the NAN device cannot match, based on the second service identifier information, the service for the service publishing device to perform the service publication with a service that is subscribed to or published by the NAN device. In this way, the NAN device determines that the service requirement of the NAN device does not match the corresponding service for the service publishing device to perform the service publication, and the NAN device does not respond.

The second service identifier information may be generated according to a preset rule or a preset parameter in the second NAN device, or may be generated according to a preset rule or a preset parameter in the second NAN device based on the first service identifier information, provided that when a NAN device that does not support the multi-hop service discovery and has a service matching the service corresponding to the first service discovery message receives the service discovery message carrying the second service identifier information, the NAN device cannot match, based on the second service identifier information, a service that is subscribed to or published by using the second service discovery message with the service of the NAN device, and when a NAN device that supports the multi-hop service discovery and has a service matching the service corresponding to the first service discovery message receives the service discovery message carrying the second service identifier information, the NAN device may generate the first service identifier information according to the preset rule or the preset parameter in the second NAN device based on the second service identifier information, and match, based on the first service identifier information, the service that is subscribed to or published by the first NAN device to perform the service discovery with a service corresponding to a service requirement of the NAN device.

For example, the first NAN device performs a reversible operation such as addition/subtraction/multiplication/division on the first service identifier information and a preset value or performs an operation of inverting, filling, disordering, or replacing some bits, to obtain the second service identifier information.

It should be noted that, a service relay device is a device that spreads service information (such as service identifier information) of the first NAN device by using a relayed service discovery message. The service relay device may be implemented as a dedicated device such as a proxy (proxy) device or a NAN device that is in a NAN network and that performs a relay function according to a rule. This is not limited in the present invention.

The second NAN device may send the second service discovery message through broadcasting in a NAN network in which the second NAN device is located, so that the third NAN device within the signal coverage area of the first NAN device can receive the second service discovery message; or the second NAN device may send the second service discovery message to the third NAN device in a unicast manner, provided that the third NAN device can receive the second service discovery message.

The second service identifier information and the second service relay indication information may be directly carried in the second service discovery message, or may be implicitly carried in the second service discovery message in another form. Specifically, the second service identifier information is implicitly carried in the second service discovery message in a form such as a Bloom filter (Bloom filter).

503. A third NAN device receives the second service discovery message, and the third NAN device determines, based on the multi-hop service indication information, whether the second service discovery message is used to relay the service discovery.

The third NAN device determines, based on the multi-hop service indication information carried in the second service discovery message, whether the second service discovery message is used to relay the service discovery. Specifically, when the multi-hop service indication information directly indicates that the second service discovery message is used to relay the service discovery, the third NAN device may directly determine whether the second service discovery message is used to relay the service discovery. When the multi-hop service indication information indirectly indicates whether the second service discovery message is used to relay the service discovery, for example, when the multi-hop service indication information indirectly indicates a quantity of times the service discovery has been relayed or a quantity of times the service discovery needs to be relayed and a maximum quantity of times the service discovery is allowed to be relayed, the third NAN device may correspondingly process the multi-hop service indication information, and determine, based on the processed information, whether the second service discovery message is used to relay the service discovery.

For example, the multi-hop service indication information includes a hop count, and when the hop count is greater than 0, the second service discovery message carrying the multi-hop service indication information is used to relay the service discovery.

When determining, based on the multi-hop service indication information, that the second service discovery message has been relayed, the third NAN device performs step 504.

504. The third NAN device determines, based on the second service identifier information, whether a service that is subscribed to or provided by the first NAN device matches a service requirement of the third NAN device.

A parameter may be preset in the third NAN device, and the preset parameter is equal to the second service identifier information. The third NAN device compares the preset parameter in the third NAN device with the second service identifier information carried in the second service discovery message, and when the preset parameter matches the second service identifier information, the third NAN device responds based on the first service identifier information. Alternatively, a correspondence between the second service identifier information and the first service identifier information may be set in the third NAN device. When the second service discovery message carries the second service identifier information, the third NAN device responds based on the correspondence and the first service identifier information. Preferably, the correspondence between the second service identifier information and the first service identifier information may be generated by the third NAN device according to a preset rule based on the second service identifier information, or may be generated by another device and set in the third NAN device.

Specifically, the third NAN device may obtain the first service identifier information according to the preset rule based on the second service identifier information, or obtain the first service identifier information based on the second service identifier information and the multi-hop service indication information. The third NAN device may match, based on the first service identifier information, the service that is subscribed to or published by using the first service discovery message with a service that is required or can be provided by the third NAN device. When the matching succeeds, the third NAN device may send a first service response message for the first NAN device to the second NAN device, and the second NAN device may send a second service response message to the first NAN device based on the first service response message. In addition, a NAN data link between the first NAN device and the second NAN device and a NAN data link between the second NAN device and the third NAN device are separately established.

It should be noted that, a rule preset in the third NAN device corresponds to the preset rule for obtaining the second service identifier information by the second NAN device based on the first service identifier information. For example, when the second NAN device obtains the second service identifier information according to the preset rule based on the first service identifier information and a preset value, the third NAN device inversely converts the second service identifier information according to the corresponding preset rule based on the same preset value, to obtain the first service identifier information.

Preferably, the third NAN device may obtain, according to the preset rule based on the second service identifier information, the first service identifier information corresponding to the service that is subscribed to or published by the first NAN device, and determine whether the first service identifier information matches third service identifier information. When the first service identifier information matches the third service identifier information, the service that is subscribed to or published by the first NAN device matches the service requirement of the third NAN device. The third service identifier information is used to indicate a service corresponding to the service requirement of the third NAN device, and the third service identifier information may be preset in the third NAN device, or may be obtained by the third NAN device according to the preset rule. The third NAN device may further generate fourth service identifier information based on the third service identifier information, and determine whether the second service identifier information matches the fourth service identifier information. When the second service identifier information matches the fourth service identifier information, the service that is subscribed to or published by the first NAN device matches the service requirement of the third NAN device.

505. The third NAN device sends a service matching response message to the second NAN device when the third NAN device determines that the service that is subscribed to or published by the first NAN device matches the service requirement of the third NAN device.

According to the service discovery method provided in this embodiment of the present invention, the second NAN device receives the first service discovery message that is sent by the first NAN device and that carries the first service identifier information, and sends the second service discovery message carrying the second service identifier information and the multi-hop service indication information, where the first service identifier information is different from the second service identifier information, so that when determining, based on the multi-hop service indication information, that the second service discovery message has been relayed, the third NAN device matches, based on the second service identifier information, the service that is subscribed to or published by the first NAN device with the service corresponding to the service requirement of the third NAN device, and responds when the matching succeeds. In addition, when a NAN device that does not support the multi-hop service discovery receives the second service discovery message, the NAN device cannot obtain, based on the second service identifier information in the second service discovery message, the service that is subscribed to or published by the first NAN device to perform the service discovery. Therefore, the NAN device cannot match the service that is subscribed to or published by the first NAN device to perform the service discovery with a service of the NAN device, and cannot respond to the second NAN device. Therefore, in the service discovery method provided in this embodiment of the present invention, the NAN device that does not support the multi-hop service discovery is enabled not to respond to a relayed multi-hop service discovery message on the premise that the relayed service discovery message is correctly received by a NAN device that supports the multi-hop service discovery.

Embodiment 6

Figure 9A:
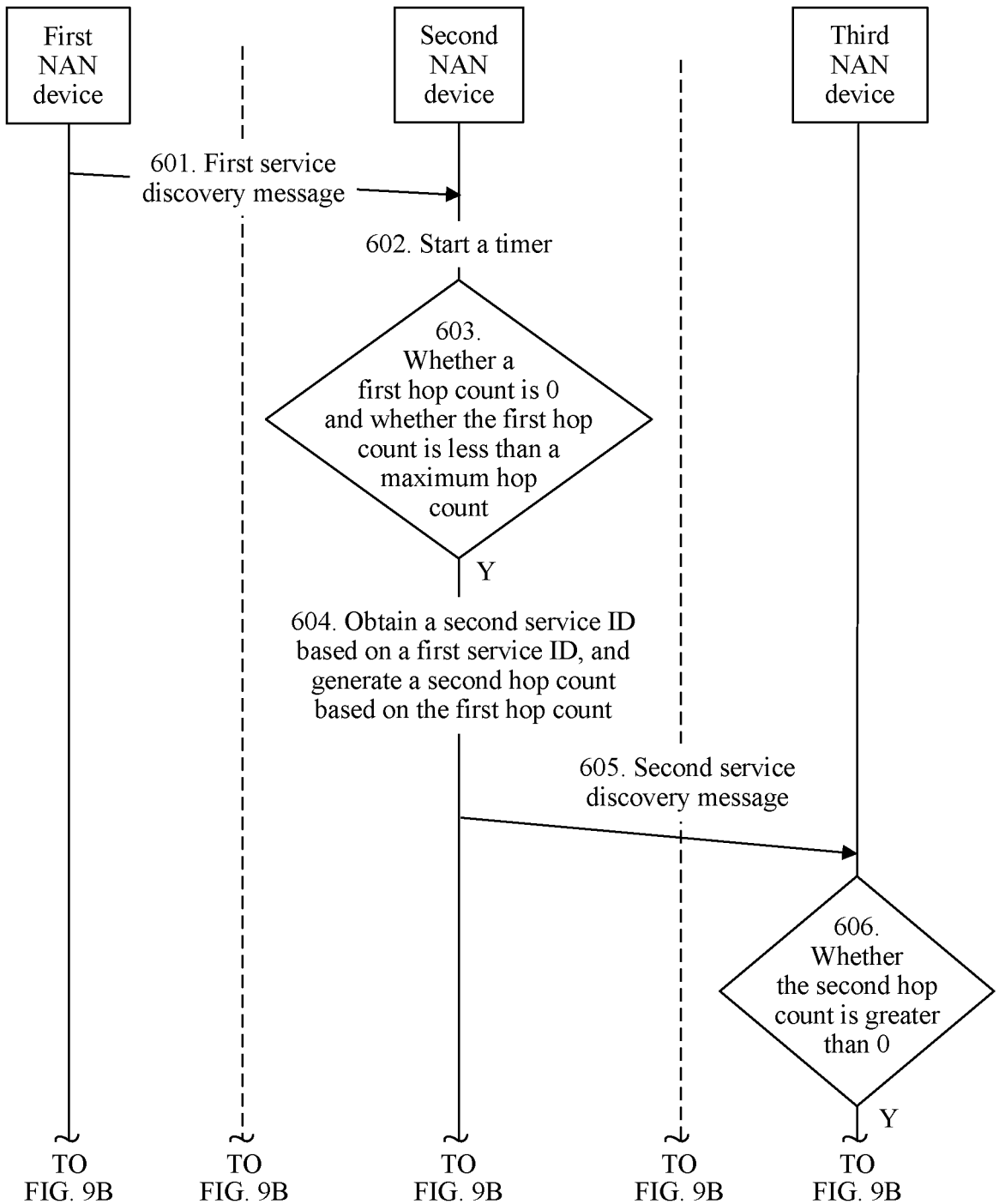
FIG. 9A and FIG. 9B are a schematic flowchart of a service discovery method according to another embodiment of the present invention.
Figure 9B:
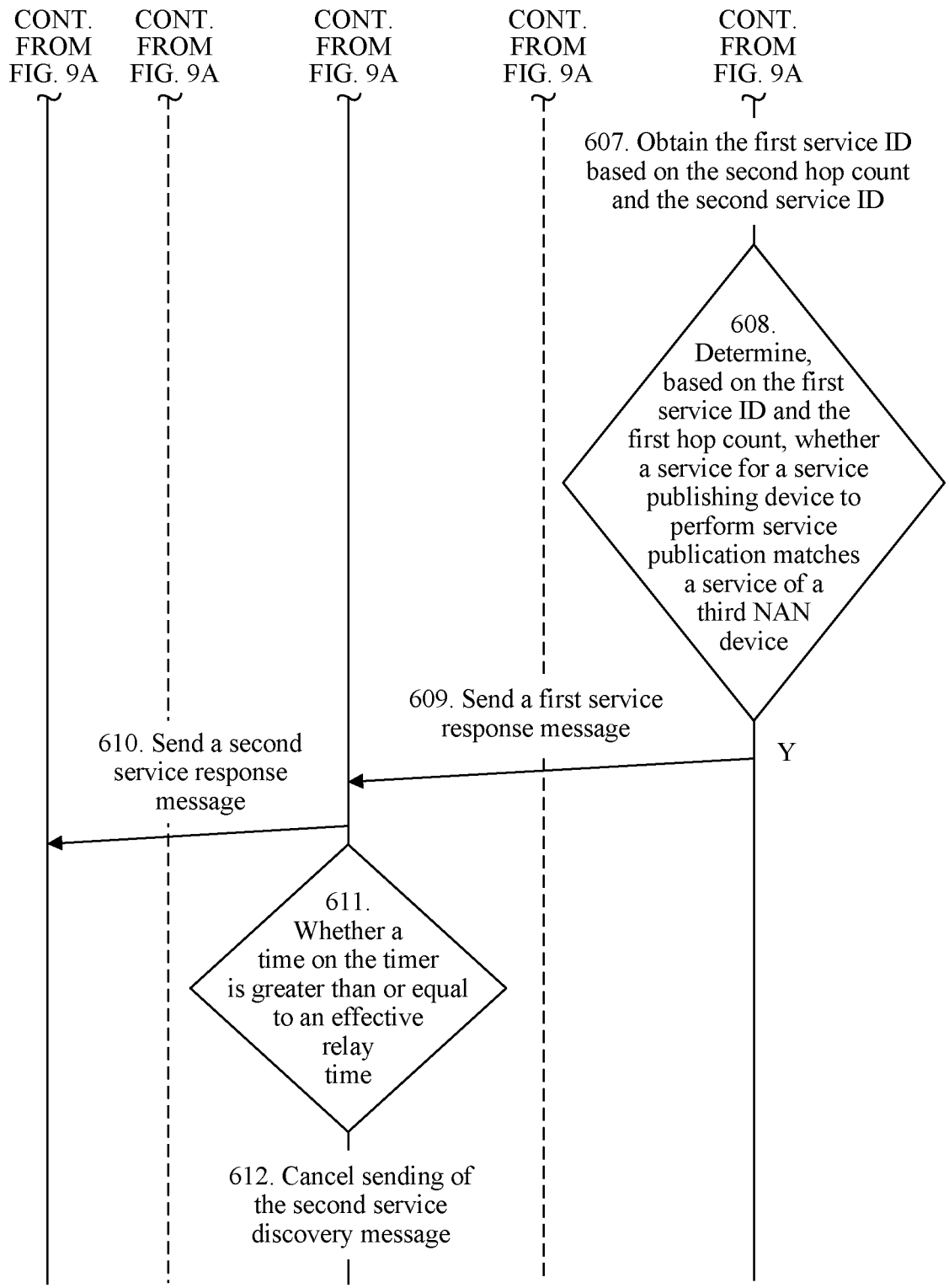

Specifically, as shown in FIG. 9A and FIG. 9B, this embodiment of the present invention provides a service discovery method. The method is applied to the communications system provided in the foregoing embodiment and includes the following steps.

601. A second NAN device receives a first service discovery message sent by a first NAN device, where the first service discovery message includes a first service ID, a first hop count, a maximum hop count, and an effective relay time.

That the first NAN device sends the first service discovery message is: the first NAN device may send the first service discovery message through broadcasting in a NAN network in which the first NAN device is located, so that the second NAN device within a signal coverage area of the first NAN device can receive the first service discovery message; or the first NAN device may send the first service discovery message to the second NAN device in a unicast manner, provided that the second NAN device can receive the first service discovery message.

The first service ID is used to indicate a service that is subscribed to or published by the first NAN device by using the first service discovery message. The first hop count is an actual hop count between the first NAN device that performs the service discovery corresponding to the first service discovery message and the first NAN device, that is, a quantity of relay devices through which the service discovery message corresponding to the service discovery passes. The maximum hop count is a maximum quantity of times the service discovery is allowed to be relayed, that is, a maximum quantity of relay devices through which the service discovery message corresponding to the service discovery passes. The effective relay time is an effective time of cyclically relaying the first service discovery message by the first NAN device. The first NAN device cyclically relays the first service discovery message based on a preset cycle, or may obtain a cycle time according to a preset rule based on the effective relay time and the like, and cyclically relay the first service discovery message based on the cycle time.

Specifically, the first service ID is information about the service that is subscribed to or published by the first NAN device by using the first service discovery message to perform the service discovery, that is, information about a service that is subscribed to or published. The first service ID may be a service name of the service, or may be a value obtained after a conversion operation is performed on a service name of the service. For example, an SHA-256 hash operation is performed on the service name (Service Name) of the service that is subscribed to or published by the first NAN device by using the service discovery message, and then first 48 bits are used as the first service ID. The first service ID may be directly carried, or may be implicitly carried in a form such as a Bloom filter (Bloom filter).

Preferably, as shown in Table 1, field information that is specially used to indicate a plurality of hops or information for indirectly indicating a plurality of hops such as hop count information may be added to the first service discovery message. For example, Hopcount and Hopcount limit are added to a data info field in a service control field in a service descriptor attribute (Service Descriptor Attribute, SDA) that is forcibly carried in the service discovery message, where Hopcount indicates a hop count, and Hopcount=0 when the first service discovery message is not relayed.

TABLE 1

| Bits | Information | Remarks |
|---|---|---|
| 0 | Security | |
| 1 | QoS | |
| 2 | Hopcount | Actual hop count between a sending device and the first NAN device |
| 3 | Hopcount limit | Maximum hop count of forwarding a service discovery message |

602. The second NAN device starts a timer.

When receiving the first service discovery message, the second NAN device starts the timer to perform timing. Timing may be performed by disposing a timer module on the second NAN device, or timing may be performed by using a timing apparatus disposed outside the second NAN device, provided that the second NAN device starts timing when receiving the first service discovery message and obtains a time on the timer.

603. The second NAN device determines whether the first hop count is 0 and whether the first hop count is less than the maximum hop count.

The second NAN device determines whether the first hop count is 0 and whether the first hop count is less than the maximum hop count. That the first hop count is 0 indicates that the first service discovery message is not relayed. The first NAN device is the first NAN device that performs the service discovery corresponding to the first service discovery message, and the first NAN device may generate and send the first service discovery message. That the first hop count is less than the maximum hop count means that the second NAN device needs to relay the first service discovery message.

604. The second NAN device obtains a second service ID based on the first service ID, and generates a second hop count based on the first hop count, where the first service ID is different from the second service ID.

That the second NAN device may obtain the second service ID according to a preset rule based on the first service ID specifically includes: the second NAN device performs an invertible operation such as addition/subtraction/multiplication/division on the first service ID and a preset value or performs an operation of inverting, filling, disordering, or replacing some bits, to obtain the second service ID; or the second NAN device may modify the first service ID according to the preset rule based on the first hop count and/or the maximum hop count, provided that when a NAN device that does not support a multi-hop service discovery and has a service matching the first service ID receives a service discovery message carrying the second service ID, the NAN device cannot match a service indicated by the second service ID with a service requirement of the NAN device.

It should be noted that, the first service ID may be modified only when a hop count is equal to 0 and the hop count is less than the maximum hop count, or the first service ID may be modified when a hop count is less than the maximum hop count. In the first case, for example, when the hop count is equal to 0 and the hop count is less than the maximum hop count, the second NAN device adds the preset value to the first service ID to obtain the second service ID, and when the hop count is greater than 0 and the hop count is less than the maximum hop count, the second NAN device does not modify the first service ID. In the second case, for example, when the hop count is less than the maximum hop count, the second NAN device adds a difference obtained by subtracting the hop count from the maximum hop count to the first service ID, to obtain the second service ID.

That the second NAN device generates the second hop count according to a preset rule based on the first hop count may be specifically: the second NAN device performs an operation such as addition/subtraction/multiplication/division on the first hop count and a preset value or performs an operation such as inverting, filling, disordering, or replacing some bits, to obtain the second hop count, provided that the second NAN device can obtain, based on the second hop count, a quantity of times the second service discovery message has been relayed.

For example, the second NAN device adds 1 to the first hop count to obtain the second hop count.

Optionally, when the first hop count is greater than 0, the second NAN device may generate the second service identifier information based on the first service identifier information, where the second hop count is greater than or equal to the first hop count. That the second hop count is greater than the first hop count may be: the second hop count is equal to the first hop count plus 1. If the second hop count is equal to the first hop count, "the second service relay indication information is used to indicate a quantity of times the service discovery has been relayed" may be understood as follows: Although the quantity of times the service discovery has been relayed that are indicated by the second service relay indication information may not be totally consistent with an actual quantity of times, the second hop count may be used to indicate that the service discovery has been relayed and is a multi-hop service discovery. It should be noted that, there is a very low probability that the second service ID obtained by the second NAN device through modification matches a service of a NAN device that does not support the multi-hop service discovery. Therefore, when the foregoing case occurs, the second NAN device determines that the NAN device is a NAN device that does not support the multi-hop service discovery, and the second NAN device is enabled not to process a response message sent by the NAN device.

605. The second NAN device sends a second service discovery message, where the second service discovery message carries the second hop count and the second service ID.

That the second NAN device sends a second service discovery message is:

the second NAN device may send the second service discovery message through broadcasting in a NAN network in which the second NAN device is located, so that a third NAN device within a signal coverage area of the second NAN device can receive the second service discovery message; or the second NAN device may send the second service discovery message to a third NAN device in a unicast manner, provided that the third NAN device can receive the second service discovery message. The second service discovery message carries the second hop count and the second service ID.

606. A third NAN device determines whether the second hop count is greater than 0.

The third NAN device determines whether the second hop count is greater than 0. When the second hop count is greater than 0, it indicates that the second service discovery message has been relayed at least once.

607. The third NAN device obtains the first service ID based on the second hop count and the second service ID.

The third NAN device may obtain the first service ID according to a preset rule based on the second service ID, or may obtain the first service ID according to a preset rule based on the second hop count and the second service ID, provided that the third NAN device can obtain the first service ID based on the second service ID. The third NAN device may obtain a first message type according to a preset rule based on a second message type.

It should be noted that, a rule preset in the third NAN device corresponds to the preset rule for obtaining the second service ID by the second NAN device based on the first service ID.

For example, the second NAN device adds the preset value to the first ID to obtain the second ID. Therefore, the third NAN device subtracts the same preset value from the second ID to obtain the first ID. Preferably, the preset value may be 1, that is, the second NAN device adds 1 to the first ID during each relay.

608. The third NAN device determines, based on the first service ID and the first hop count, whether a service for a service publishing device to perform service publication matches a service of the third NAN device.

It is determined, based on the first service ID and the first hop count, whether the service for the service publishing device to perform the service publication matches the service of the third NAN device. The service for the service publishing device to perform the service publication is first obtained based on the first service ID and the first hop count. Specifically, based on step 607 of obtaining the first service ID based on the second service ID and the second hop count, the first hop count may be obtained based on the second hop count, a corresponding service ID may be obtained based on the first service ID and the first hop count, and a service ID when a hop count is 0 is obtained based on the foregoing step, where a service indicated by the service ID is the service that is subscribed to or published by the first NAN device to perform the service discovery.

The determining whether a service for a service publishing device to perform service publication matches a service of the third NAN device is determining whether service information of a service that is required or can be provided by the third NAN device matches the service for the service publishing device to perform the service publication. Specifically, the service that is required or can be provided by the third NAN device may correspond to the service for the service publishing device to perform the service publication. Alternatively, the third NAN device may correspondingly convert, according to a preset rule, the service information of the service that is required or can be provided, and then determine, based on a result of the conversion, whether the two services are matched, or the third NAN device correspondingly converts the service for the service publishing device to perform the service publication, and then determines, based on a result of the conversion, whether the two services are matched. Specifically, when determining whether the third NAN device supports the service for the service publishing device to perform the service publication, the third NAN device usually further needs to match a type of the second service discovery message with a type of the service of the third NAN device. Because the type of the second service discovery message is the same as a type of the first service discovery message by default in this embodiment, when the service that is subscribed to or published by using the first service discovery message matches the service of the third NAN device, the type of the second service discovery message also matches the type of the service of the third NAN device. For example, when the service for the service publishing device to perform the service publication is a subscription service, and the third NAN device may provide a service corresponding to the service for the service publishing device to perform the service publication, the third NAN device supports the service for the service publishing device to perform the service publication. Alternatively, when the service for the service publishing device to perform the service publication is a publishing service, and the third NAN device requires the service for the service publishing device to perform the service publication, the third NAN device supports the service for the service publishing device to perform the service publication.

When the matching succeeds, step 609 is performed.

609. The third NAN device sends a first service response message to the second NAN device.

When the matching succeeds, the third NAN device sends a service response message for the second NAN device to the second NAN device.

Specifically, the first service response message carries information used by the third NAN device to establish a relayed NAN data link to the second NAN device. The information may include time slot (time slot) information and frequency information, the information is used to determine a common time-frequency resource, and the NAN data link is established on the time-frequency resource.

For example, when the second service discovery message is an SDF subscribe service subscribe message, the third NAN device sends an SDF publish service publish message to the second NAN device, and the SDF publish service publish message sent to the second NAN device carries multi-hop service matching indication information. When the second service discovery message is an SDF publish service publish message, the third NAN device sends an SDF follow-up service follow-up message to the second NAN device, and the SDF follow-up service follow-up message sent to the second NAN device carries multi-hop service matching indication information. The multi-hop service matching indication information is used to indicate that a service matching response message is used to respond to a relayed service discovery message, namely, the second service discovery message.

610. The second NAN device sends a second service response message to the first NAN device.

After the second NAN device receives the first service response message, the second NAN device sends the second service response message to the first NAN device. In addition, a NAN data link between the second NAN device and the third NAN device and a NAN data link between the second NAN device and the first NAN device are separately established.

Specifically, the second service response message carries information used by the second NAN device to establish a relayed NAN data link to the first NAN device. The information may include time slot (time slot) information and frequency information, the information is used to determine a common time-frequency resource, and the NAN data link is established on the time-frequency resource.

611. The second NAN device determines whether a time on the timer is greater than or equal to the effective relay time.

The second NAN device determines whether the time on the timer, namely, a time measured by the timer, is greater than or equal to the effective relay time, that is, whether a time of relaying the first service discovery message by the second NAN device is greater than an effective time of allowing the first service discovery message to be relayed.

Preferably, the effective relay time may be equal to a sum of discovery window (Discovery window, DW) times agreed upon in a plurality of NAN mechanisms.

When the time on the timer is greater than or equal to the effective relay time, step 512 is performed.

612. The second NAN device cancels sending of the second service discovery message.

The canceling sending may be suspending ongoing message sending or canceling upcoming message sending.

According to the service discovery method provided in this embodiment of the present invention, the second NAN device receives the first service discovery message sent by the first NAN device, and when determining, based on the first hop count and the maximum hop count, that the first service discovery message needs to be relayed, the second NAN device modifies the first service ID carried in the first service discovery message, to obtain the second service ID different from the first service ID, and forwards the second service discovery message carrying the second service ID and the second hop count, so that the third NAN device can obtain the first service ID and the first hop count based on the second service ID and the second hop count, match, based on the first service ID and the first hop count, a service for the first NAN device to perform service publication with a service requirement of the third NAN device, and send a service response message to the second NAN device when the matching succeeds. In this way, the second NAN device forwards the response message to the first NAN device. Therefore, the third NAN device may match, based on the forwarded second service discovery message, the service that is subscribed to or published by the first NAN device to perform the service discovery with the service of the third NAN device, and when the matching succeeds, respond to the service that is subscribed to or published by the first NAN device to perform the service discovery. When a NAN device receiving the second service discovery message is a NAN device that does not support the multi-hop service discovery, even if a service requirement of the NAN device corresponds to a service matching the service for the service publishing device to perform the service publication, the NAN device cannot match, based on the second service ID, the service for the service publishing device to perform the service publication with the service requirement of the NAN device. In this way, the NAN device determines that the service requirement of the NAN device does not match the service for the service publishing device to perform the service publication, and the NAN device does not respond. Therefore, in the service discovery method provided in this embodiment of the present invention, the NAN device that does not support the multi-hop service discovery is enabled not to respond to a relayed multi-hop service discovery message on the premise that the relayed service discovery message is correctly received by a NAN device that supports the multi-hop service discovery.

Embodiment 7

Figure 10:
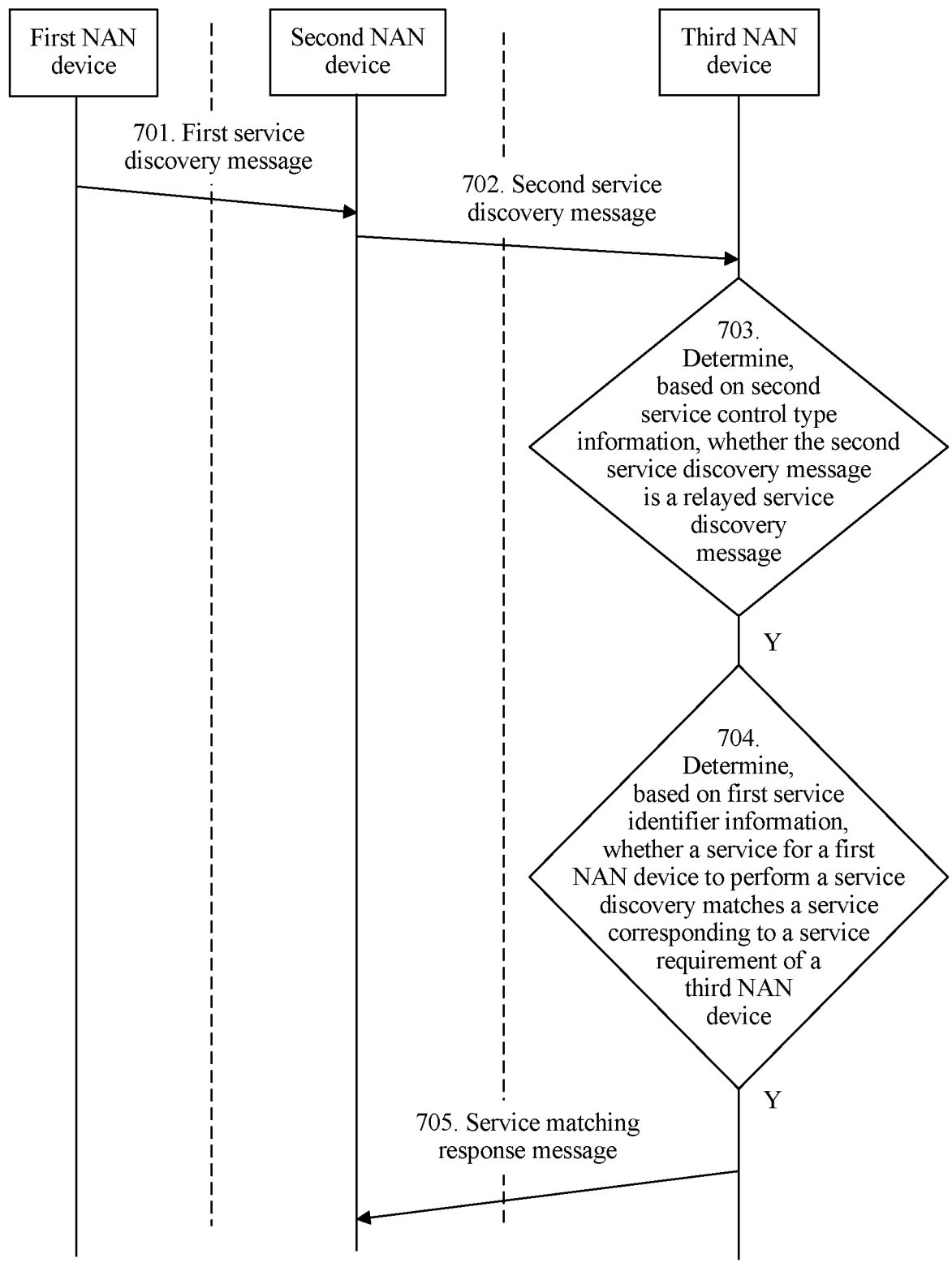
FIG. 10 is a schematic flowchart of a service discovery method according to another embodiment of the present invention.

Specifically, as shown in FIG. 10, this embodiment of the present invention provides a service discovery method. The method is applied to the communications system provided in the foregoing embodiment and includes the following steps.

701. A second NAN device receives a first service discovery message that is sent by a first NAN device and that is used for a service discovery, where the first service discovery message carries first service control type information and first service identifier information.

That the first service discovery message is used for the service discovery means that the first service discovery message is used to notify another NAN device in a same NAN network as the first NAN device of a status change of the first NAN device, that is, notify the another NAN device of a service that needs to be subscribed to or published by the first NAN device or a response to the another NAN device such as follow-up. Further, the first NAN device may further send the first service discovery message to the another NAN device, to further determine information used for establishing a data link for service exchange.

That the first NAN device sends the first service discovery message is: the first NAN device may send the first service discovery message through broadcasting in a NAN network in which the first NAN device is located, so that the second NAN device within a signal coverage area of the first NAN device can receive the first service discovery message; or the first NAN device may send the first service discovery message to the second NAN device in a unicast manner, provided that the second NAN device can receive the first service discovery message.

The first service control type information is used to indicate a control type of a service that is subscribed to or published by using the first service discovery message to perform the service discovery, namely, a service control type, of a service, carried in the first service discovery message. When a NAN device receiving the first service discovery message performs matching on the service that is subscribed to or published by using the first service discovery message, the NAN device needs to match information about the service that is subscribed to or published to perform the service discovery with a service requirement of the NAN device, namely, a service control type. When the matching succeeds, the NAN device responds based on the received first service discovery message. The service that is subscribed to or published to perform the service discovery may be a service control type of the service that is subscribed to or published by the first NAN device, namely, the service control type, of the service, carried in the first service discovery message. When a NAN device receiving the first service discovery message performs matching on the service that is subscribed to or published by using the first service discovery message, the NAN device needs to match information about the service that is subscribed to or published to perform the service discovery with a service requirement of the NAN device, namely, a service control type. When the matching succeeds, the NAN device responds based on the received first service discovery message. The service that is subscribed to or published to perform the service discovery may be the service that is subscribed to or published by the first NAN device, and the service control type of the service that is subscribed to or published by the first NAN device may be service publish, service subscribe, and service follow-up. The first service identifier information is used to indicate the service that is subscribed to or published by using the first service discovery message.

Specifically, the NAN device receiving the first service discovery message may match, based on the first service control type information, the service that is subscribed to or published by using the first service discovery message with a service that is subscribed to or published by the NAN device receiving the first service discovery message. The service that is subscribed to or published by the NAN device receiving the first service discovery message is a service of the NAN device, and the service of the NAN device includes a service that is required or provided by the NAN device.

It should be noted that, the first service control type information may be the service control type of the service for performing the service discovery by using the first service discovery message, provided that a NAN device that responds to the service discovery message needs to match, based on the first service control type information, the service that is subscribed to or published by using the first service discovery message with a service that is subscribed to or published by the NAN device. When the first service discovery message is not relayed and does not need to be relayed by the second NAN device, the second NAN device may match, based on the first service control type information, the service that is subscribed to or published by the first NAN device by using the first service discovery message to perform the service discovery with a service requirement of the second NAN device.

It should be noted that, the first service control type information may be directly carried in the first service discovery message, or may be implicitly carried in the first service discovery message in another form. Specifically, the first service control type information is implicitly carried in the first service discovery message in a form such as a Bloom filter (Bloom filter).

702. The second NAN device sends a second service discovery message, where the second service discovery message includes second service control type information and the first service identifier information.

The second service control type information is used to indicate a service control type carried in the second service discovery message. The second service control type information is different from the first service control type information. The first service identifier information is used to indicate the service that is subscribed to or published by the first NAN device to perform the service discovery.

That the second service control type information is different from the first service control type information is specifically: a control type, carried in the second service discovery message, of a service that is subscribed to or published to perform the service discovery is not the same as a control type, carried in the first service discovery message, of a service that is subscribed to or published to perform the service discovery. When a NAN device receiving the second service discovery message is a NAN device that does not support a multi-hop service discovery, even if the NAN device has a service matching the first service control type information, the NAN device matches, based on the second service control type information and the first service identifier information, a service that is subscribed to or published by using the second service discovery message with a service that is required or can be provided by the NAN device. In this way, the NAN device determines that the service that is required or can be provided by the NAN device does not match the service corresponding to the second service discovery message, and the NAN device does not send a response message.

For example, when the second NAN device receives the first service discovery message generated and sent by the first NAN device, the first NAN device performs the service discovery by sending the first service discovery message. The service control type in the first service discovery message may be determined based on a field in the first service discovery message, for example, a service control field in the first service discovery message. To ensure that the NAN device receiving the second service discovery message cannot respond when the NAN device is a NAN device that does not support the multi-hop service discovery, a value defined as reserved (reserved) in the service control field may be used to indicate a service control type of a relayed service discovery message. For example, a value 11, defined as reserved, of a service control type is redefined as a relayed service discovery message. When the second NAN device generates and sends the second service discovery message, a value of a service control field in the second service discovery message is 11, and another field such as a data info field in the second service discovery message may indicate a real service control type, namely, the service control type in the first service discovery message. If a third NAN device receives the second service discovery message, the third NAN device may determine, by using the data info field in the second service discovery message, whether a service that is subscribed to or can be provided by the third NAN device corresponds to the service that is subscribed to or published by the first NAN device to perform the service discovery, and the third NAN device responds if the two services correspond. If the NAN device receiving the second service discovery message is a NAN device that does not support the multi-hop service discovery, the device determines, based on the value 11 of the service control field, a control type of the service that is subscribed to or published by using the second service discovery message to perform the service discovery. When the value of the service control field is 11, the control type, carried in the second service discovery message, of the service that is subscribed to or published to perform the service discovery is a relayed service discovery message. Therefore, the device further determines, based on the real service control type indicated by the data info field in the second service discovery message, namely, the service discovery type in the first service discovery message, whether a service that is subscribed to or can be provided by the device corresponds to the service that is subscribed to or published by the first NAN device to perform the service discovery, and responds if the two services correspond. If the NAN device receiving the second service discovery message is a NAN device that does not support the multi-hop service discovery, the device determines, based on the value 11 of the service control field, a control type of the service that is subscribed to or published by using the second service discovery message to perform the service discovery. When the value of the service control field is 11, the control type, carried in the second service discovery message, of the service that is subscribed to or published to perform the service discovery is null. Therefore, even if the device has a service matching the first service control type information, the NAN device cannot match, based on the second service control type information and the first service identifier information, the service that is subscribed to or published by using the second service discovery message with a service that is required or can be provided by the NAN device, and the NAN device does not respond.

The second service control type information may be preset in the second NAN device, or the second service control type information may be obtained according to a preset rule or a correspondence based on the first service control type information, or the first service control type information is converted into the second service control type information according to a preset rule, provided that when a NAN device that does not support the multi-hop service discovery and has a service matching the service that is subscribed to or published by using the first service discovery message receives a service discovery message carrying the second service control type information, the NAN device cannot match, based on the second service control type information, the service that is subscribed to or published by using the second service discovery message with a service that is required or can be provided by the NAN device.

The first service identifier information may be sent by the first NAN device, and may be specifically carried in the first service discovery message, or may be obtained by the second NAN device according to a preset rule in the second NAN device, or may be obtained by the second NAN device from another apparatus or device.

Preferably, the second service discovery message may further include second service relay indication information. The second service relay indication information is used to indicate that the second service discovery message carrying the second service relay indication information has been relayed by a NAN device that supports the multi-hop service discovery. The second service relay indication information may directly indicate that the second service discovery message has been relayed, or may be information indirectly indicating that the second service discovery message has been relayed, for example, a quantity of times the second service discovery message has been relayed. For example, the second service relay indication information includes a hop count (Hopcount), and the hop count is an actual hop count between a NAN device sending the second service discovery message and the first NAN device, that is, the quantity of times the second service discovery message has been relayed. When the hop count is greater than 0, the second service discovery message has been relayed at least once.

Preferably, the second service discovery message may further carry a first service control type message. The first service control type message is used to indicate the control type of the service that is subscribed to or published by the first NAN device to perform the service discovery. In this embodiment, the first service control type message is used to indicate the control type of the service that is subscribed to or published by the first NAN device to perform the service discovery.

The second NAN device may send the second service discovery message through broadcasting in a NAN network in which the second NAN device is located, so that the third NAN device within a signal coverage area of the second NAN device can receive the second service discovery message; or the second NAN device may send the second service discovery message to the third NAN device in a unicast manner, provided that the third NAN device can receive the second service discovery message.

It should be noted that, the second service control type information and the first service identifier information may be directly carried in the second service discovery message, or may be implicitly carried in the second service discovery message in another form. Specifically, the second service control type information and the first service identifier information are implicitly carried in the second service discovery message in a form such as a Bloom filter (Bloom filter).

703. A third NAN device determines, based on the second service control type information, whether the second service discovery message is a relayed service discovery message.

The third NAN device determines, based on the second service control type information carried in the second service discovery message, whether the second service discovery message has been relayed. Specifically, when the service control type indicated by the second service control type information is a relayed service type, the third NAN device may directly determine whether the second service discovery message has been relayed. Alternatively, when the service control type indicated by the second service control type information is none of subscribe, publish, and follow-up, the third NAN device may determine that the second service discovery message has been relayed.

When determining that the second service discovery message is a relayed service discovery message, the third NAN device performs step 604.

704. The third NAN device determines, based on the first service identifier information, whether a service that is subscribed to or provided by the first NAN device to perform the service discovery matches a service corresponding to a service requirement of the third NAN device.

A parameter may be preset in the third NAN device, and the preset parameter is equal to the first service identifier information. The third NAN device compares the preset parameter in the third NAN device with the first service identifier information carried in the second service discovery message, to determine whether the service that is subscribed to or published by the first NAN device to perform the service discovery matches the service corresponding to the service requirement of the third NAN device. Alternatively, the third NAN device may match, according to a preset rule, the service corresponding to the service requirement of the third NAN device with the service indicated by the first service identifier information, to determine whether the service that is subscribed to or published by the first NAN device to perform the service discovery matches the service corresponding to the service requirement of the third NAN device.

Preferably, when the second service discovery message further carries a first service control type, the third NAN device may further determine whether the control type of the service that is subscribed to or published by the first NAN device to perform the service discovery matches a control type of the service corresponding to the service requirement of the third NAN device.

705. The third NAN device sends a service matching response message to the second NAN device.

The third NAN device sends the service matching response message to the second NAN device, where the service matching response message carries a message that may be used by the second NAN device to confirm with the third NAN device whether the control type of the service that is subscribed to or published by the first NAN device to perform the service discovery matches the control type of the service corresponding to the service requirement of the third NAN device.

That the third NAN device sends a service matching response message to the second NAN device may include: the third NAN device sends, to the second NAN device, a service matching response message carrying the control type of the service corresponding to the service requirement of the third NAN device, so that the second NAN device can match the control type of the service corresponding to the service requirement of the third NAN device with the control type of the service that is subscribed to or published by the first NAN device to perform the service discovery; the third NAN device sends, to the second NAN device, an acknowledgement message for confirming that the service that is subscribed to or published by the first NAN device to perform the service discovery matches the service corresponding to the service requirement of the third NAN device, so that after receiving the acknowledgement message, the second NAN device sends, to the third NAN device, the control type of the service that is subscribed to or published by the first NAN device to perform the service discovery, and the third NAN device can match the control type of the service corresponding to the service requirement of the third NAN device with the control type of the service that is subscribed to or published by the first NAN device to perform the service discovery; or when the second service discovery message further carries the first service control type, and the third NAN device determines that the control type of the service that is subscribed to or published by the first NAN device to perform the service discovery matches the control type of the service corresponding to the service requirement of the third NAN device, the third NAN device sends, to the second NAN device, a response message for the service that is subscribed to or published by the first NAN device to perform the service discovery.

For example, when the third NAN device sends, to the second NAN device, the service matching response message carrying the control type of the service corresponding to the service requirement of the third NAN device, the service response message includes fifth service identifier information generated by the third NAN device based on the service corresponding to the service requirement of the third NAN device. After receiving the service matching response message, the second NAN device may match, based on the fifth service identifier information, the service corresponding to the service requirement of the third NAN device with the service that is subscribed to or published by the first NAN device to perform the service discovery.

For example, when the third NAN device sends, to the second NAN device, the acknowledgement message for confirming that the service that is subscribed to or published by the first NAN device to perform the service discovery matches the service corresponding to the service requirement of the third NAN device, after receiving the acknowledgement message, the second NAN device sends, to the third NAN device, the control type of the service that is subscribed to or published by the first NAN device to perform the service discovery, and the third NAN device may match the control type of the service corresponding to the service requirement of the third NAN device with the control type of the service that is subscribed to or published by the first NAN device to perform the service discovery.

For example, when the second service discovery message further includes the first service control type information, and the first service control type information is used to indicate the control type of the service that is subscribed to or published by the first NAN device to perform the service discovery, the third NAN device compares the service corresponding to the service requirement of the third NAN device with the first service control type information carried in the second service discovery message, and when the matching succeeds, the third NAN device responds based on the first service control type information. When the first service control type information is subscribe, and the service indicated by the first service identifier information can be provided based on the service requirement of the third NAN device, it is determined that the service that is subscribed to or published by the first NAN device to perform the service discovery matches the service corresponding to the service requirement of the third NAN device. When the first service control type information is publish, and the service indicated by the first service identifier information needs to be used based on the service requirement of the third NAN device, it is determined that the service that is subscribed to or published by the first NAN device to perform the service discovery matches the service corresponding to the service requirement of the third NAN device.

According to the service discovery method provided in this embodiment of the present invention, the second NAN device receives the first service discovery message sent by the first NAN device; and when the second NAN device determines that the first service discovery message needs to be relayed, the second NAN device modifies the carried first service control type information in the second NAN device, to obtain the second service control type information different from the first service control type information, and forwards, to the third NAN device, the second service discovery message carrying the second service control type information and the first service identifier information, so that when receiving the second service discovery message carrying the second service control type information, the third NAN device can determine, based on the second service control type information, that the second service discovery message has been relayed, and send the matching response message to the second NAN device based on the first service identifier information. In this way, the second NAN device can confirm with the third NAN device whether the control type of the service that is subscribed to or published by the first NAN device to perform the service discovery matches the control type of the service corresponding to the service requirement of the third NAN device, and when the two control types are matched, the third NAN device can correspondingly respond to the service that is subscribed to or published by the first NAN device to perform the service discovery. In addition, when receiving the second service discovery message, a NAN device that does not support the multi-hop service discovery service cannot identify the second service control type information. Therefore, in the service discovery method provided in this embodiment of the present invention, the NAN device that does not support the multi-hop service discovery is enabled not to respond to a relayed multi-hop service discovery message on the premise that the relayed service discovery message is correctly received by a NAN device that supports the multi-hop service discovery.

Embodiment 8

Figure 11A:
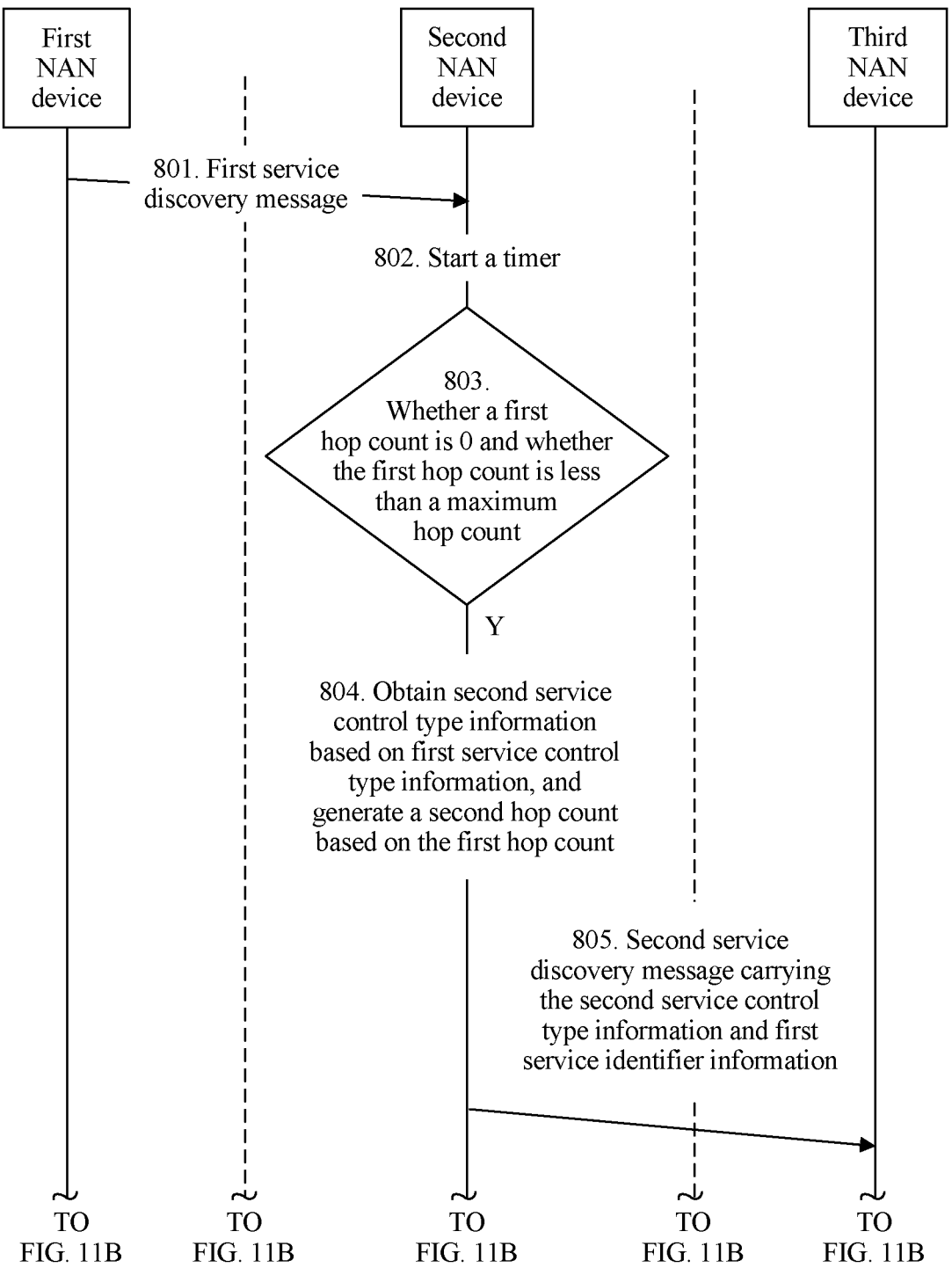
FIG. 11A to FIG. 11C are a schematic flowchart of a service discovery method according to another embodiment of the present invention.
Figure 11B:
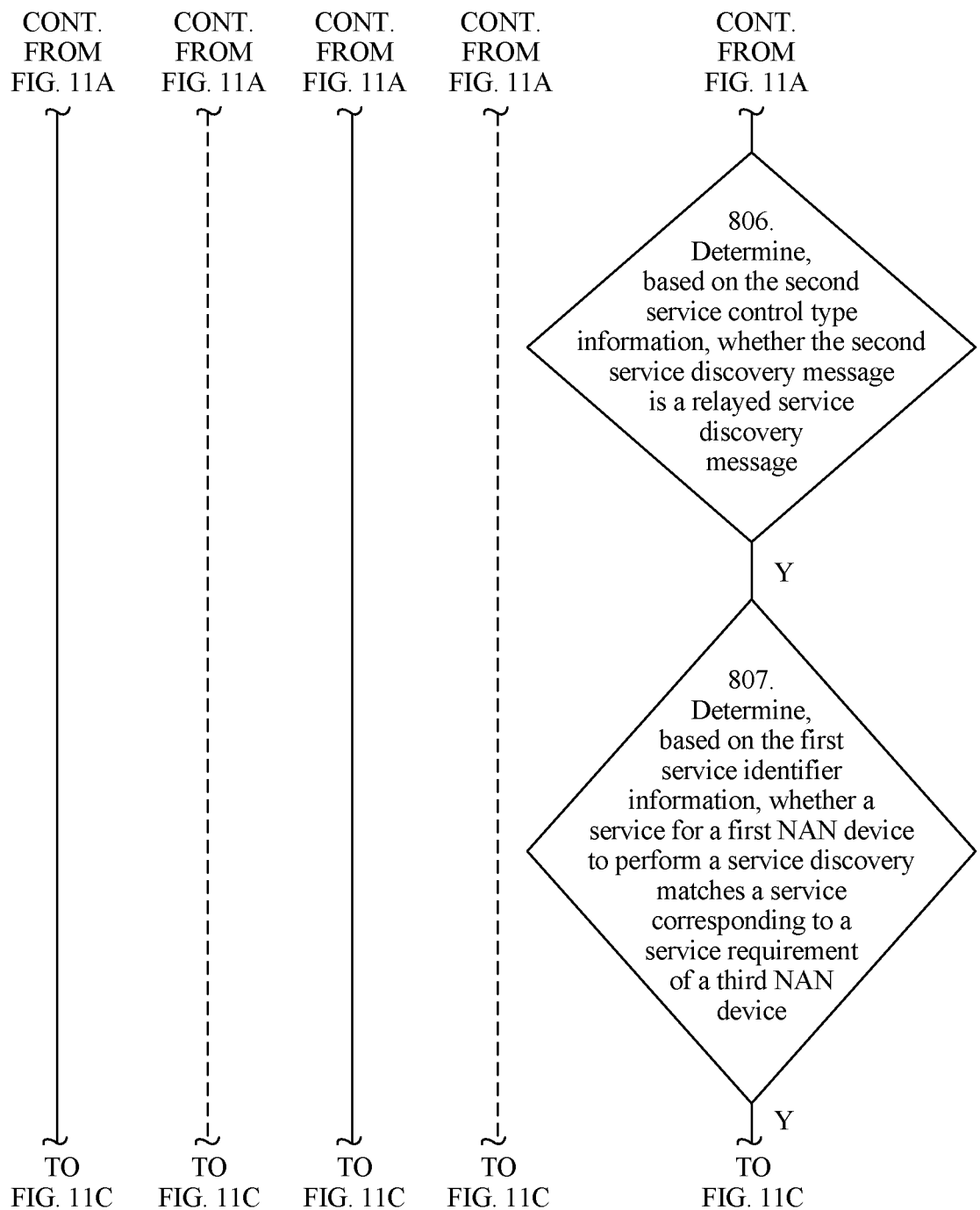
Figure 11C:
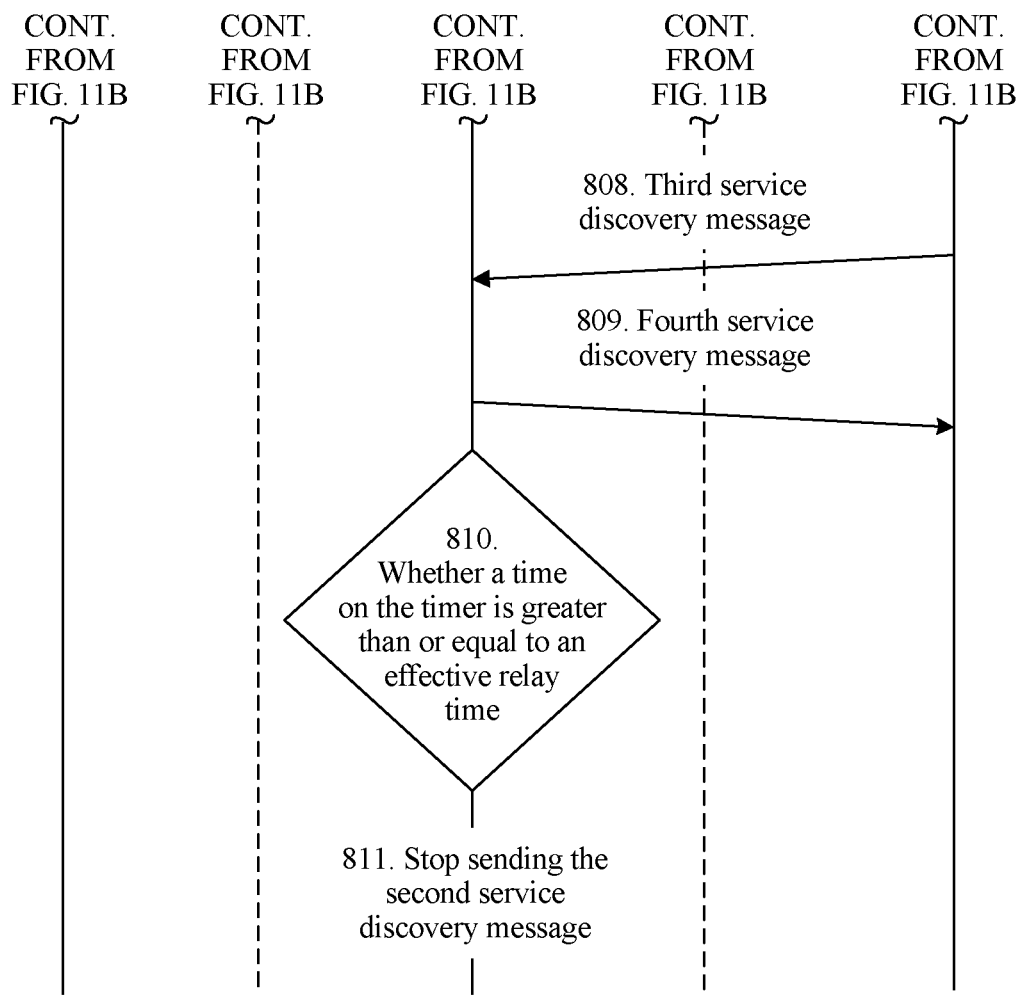

Specifically, as shown in FIG. 11A to FIG. 11C, this embodiment of the present invention provides a service discovery method. The method is applied to the communications system provided in the foregoing embodiment and includes the following steps.

801. A second NAN device receives a first service discovery message that is sent by a first NAN device and that is used for a service discovery, where the first service discovery message includes first service control type information, a first hop count, a maximum hop count, and an effective relay time.

That the first service discovery message is used for the service discovery means that the first service discovery message is used to notify another NAN device in a same NAN network of a status change of the first NAN device, that is, notify a service that needs to be subscribed to or published by the first NAN device or a response to the another NAN device such as follow-up. Further, the first NAN device may further send the first service discovery message to the another NAN device, to further determine information used for establishing a data link for service data exchange.

That the first NAN device sends the first service discovery message is: the first NAN device may send the first service discovery message through broadcasting in a NAN network in which the first NAN device is located, so that the second NAN device within a signal coverage area of the first NAN device can receive the first service discovery message; or the first NAN device may send the first service discovery message to the second NAN device in a unicast manner, provided that the second NAN device can receive the first service discovery message.

The first service control type information is used to indicate a control type of a service that is subscribed to or published by using the first service discovery message to perform the service discovery, namely, a service control type, of a service, carried in the first service discovery message. When a NAN device receiving the first service discovery message performs matching on the service that is subscribed to or published by using the first service discovery message, the NAN device needs to match information about the service that is subscribed to or published to perform the service discovery with a service requirement of the NAN device, namely, a service control type. When the matching succeeds, the NAN device responds based on the received first service discovery message. The control type indicated by the first service control type information may be service publish, service subscribe, or service follow-up. Preferably, the first service control type information may be 00, 01, or 10. For example, when the second NAN device receives the first service discovery message generated and sent by the first NAN device, the first NAN device performs the service discovery by sending the first service discovery message. The service control type in the first service discovery message may be determined based on a field in the first service discovery message, for example, a service control field in the first service discovery message. To ensure that a NAN device receiving a second service discovery message cannot respond when the NAN device is a NAN device that does not support a multi-hop service discovery, a value defined as reserved (reserved) in the service control field may be used to indicate a service control type of a relayed service discovery message. For example, a value 11, defined as reserved, of a service control type is redefined as a relayed service discovery message. When the second NAN device generates and sends the second service discovery message, a value of a service control field in the second service discovery message is 11, and another field such as a data info field in the second service discovery message may indicate a real service control type, namely, the service control type in the first service discovery message. If a third NAN device receives the second service discovery message, the third NAN device may determine, by using the data info field in the second service discovery message, whether a service that is subscribed to or can be provided by the third NAN device corresponds to the service that is subscribed to or published by the first NAN device to perform the service discovery, and the third NAN device responds if the two services correspond. If the NAN device receiving the second service discovery message is a NAN device that does not support the multi-hop service discovery, the device determines, based on the value 11 of the service control field, a control type of a service that is subscribed to or published by using the second service discovery message to perform the service discovery. When the value of the service control field is 11, the control type, carried in the second service discovery message, of the service that is subscribed to or published to perform the service discovery is null. Therefore, even if the device has a service matching the first service control type information, the NAN device cannot match, based on second service control type information and first service identifier information, the service that is subscribed to or published by using the second service discovery message with a service that is required or can be provided by the NAN device. In this way, the NAN device does not need to respond, thereby saving device power and air interface resources. The first hop count is an actual hop count between the first NAN device that performs the service discovery corresponding to the first service discovery message and the first NAN device, that is, a quantity of relay devices through which the service discovery message corresponding to the service discovery passes. The maximum hop count is a maximum quantity of times the service discovery is allowed to be relayed, that is, a maximum quantity of relay devices through which the service discovery message corresponding to the service discovery passes. The effective relay time is an effective time of cyclically relaying the first service discovery message by the first NAN device. The first NAN device cyclically relays the first service discovery message based on a preset cycle, or may obtain a cycle time according to a preset rule based on the effective relay time and the like, and cyclically relay the first service discovery message based on the cycle time.

Specifically, the NAN device receiving the first service discovery message may match, based on the first service control type information, the service that is subscribed to or published by using the first service discovery message with a service that is subscribed to or published by the NAN device receiving the first service discovery message. The service that is subscribed to or published by the NAN device receiving the first service discovery message is a service of the NAN device, and the service of the NAN device includes a service that is required or provided by the NAN device.

It should be noted that, the first service control type information may be the service control type of the service for performing the service discovery by using the first service discovery message, provided that a NAN device that responds to the service discovery message needs to match, based on the first service control type information, the service that is subscribed to or published by using the first service discovery message with a service that is subscribed to or published by the NAN device. When the first service discovery message is not relayed and does not need to be relayed by the second NAN device, the second NAN device may match, based on the first service control type information, the service that is subscribed to or published by the first NAN device by using the first service discovery message to perform the service discovery with a service that is required or can be provided by the second NAN device.

It should be noted that, the first service control type information may be directly carried in the first service discovery message, or may be implicitly carried in the first service discovery message in another form. Specifically, the first service control type information is implicitly carried in the first service discovery message in a form such as a Bloom filter (Bloom filter).

The first service control type information is usually in a service descriptor attribute (Service Descriptor Attribute) that is forcibly carried in the service discovery message.

Preferably, as shown in Table 1 in Embodiment 6, field information that is specially used to indicate a plurality of hops or information for indirectly indicating a plurality of hops such as hop count information may be added to the first service discovery message. For example, Hopcount and Hopcount limit are added to a data info field in a service control field in the service descriptor attribute (Service Descriptor Attribute, SDA) that is forcibly carried in the service discovery message, where Hopcount indicates a hop count, and Hopcount=0 when the first service discovery message is not relayed.

Preferably, as shown in Table 2, a service control type field in the service control field in the service descriptor attribute (Service Descriptor Attribute, SDA) that is forcibly carried in the service discovery message is used to indicate the first service control type information. When the service control type is 00, the service control type of the service for performing the service discovery by using the first service discovery message is service publish (Publish). When the service control type is 01, the service control type of the service for performing the service discovery by using the first service discovery message is service subscribe (Subscribe). When the service control type is 10, the service control type of the service for performing the service discovery by using the first service discovery message is service follow-up (Follow up).

TABLE 2

| Bits | Information | Remarks |
| --- | --- | --- |
| 0-1 | Service control type (Service Control Type) | 00: Publish 01: Subscribe 10: Follow up |

802. The second NAN device starts a timer.

For specific content, refer to step 602 in the foregoing embodiment. Details are not described herein again.

803. The second NAN device determines whether the first hop count is 0 and whether the first hop count is less than the maximum hop count.

For specific content, refer to step 603 in the foregoing embodiment. Details are not described herein again.

804. The second NAN device obtains second service control type information based on the first service control type information, and generates a second hop count based on the first hop count.

The first service control type information is different from the second service control type information.

Specifically, the second NAN device may modify the first service control type information according to a preset rule to obtain the second service control type information. Preferably, the second service control type information may be defined as a relayed service type, or may be defined as an invalid service type or a service type to which a NAN device that does not support the multi-hop service discovery does not respond. When receiving a service discovery message carrying the second service control type information, the NAN device that does not support the multi-hop service discovery cannot successfully perform matching on the service discovery message carrying the second service control type information. For example, the first service control type information includes subscribe, publish, or follow-up, the second service control type information includes another type, and the another type is different from subscribe, publish, or follow-up. Alternatively, the first service control type information includes 00, 01, or 10, and the second service control type information includes 11.

For example, when the service control type field in the service control field in the service descriptor attribute (Service Descriptor Attribute, SDA) that is forcibly carried in the service discovery message is used to indicate the first service control type information or the second service control type information, the second NAN device may modify the first service control type information to a preset value, namely, the second service control type information, where the second service control type information may be defined as a relayed (relayed) service type. For example, when the service control type is 11, the service control type of the service for performing the service discovery by using the second service discovery message is a relayed (relayed) service.

TABLE 3

| Bits | Information | Remarks |
| --- | --- | --- |
| 0-1 | Service control type (Service Control Type) | 00: Publish<br>01: Subscribe<br>10: Follow up<br>11: Relayed |

In addition, as shown in Table 4, a real type field for the service discovery message, namely, a service control type, is added to the data info field in the service control field in the service descriptor attribute (Service Descriptor Attribute, SDA) that is forcibly carried in the service discovery message, so that the first service control type information is carried in the service discovery message, that is, the service control type of the service for performing the service discovery by using the first service discovery message. When the service control type' is 00, the service control type of the service for performing the service discovery by using the first service discovery message is service publish. When the service control type' is 01, the service control type of the service for performing the service discovery by using the first service discovery message is service subscribe.

TABLE 4

| Bits | Information | Remarks |
| --- | --- | --- |
| 0 | Security | |
| 1 | QoS | |
| ... | ... | ... |
| 2 | Hopcount | Actual hop count between a sending device and the first NAN device |

TABLE 4-continued

| Bits | Information | Remarks |
| --- | --- | --- |
| 3 | Hopcount limit | Maximum hop count of forwarding a service discovery message |
| 4 | Service Control type' | Two low-order bits are used, and six high-order bits are reserved<br>00: Publish<br>01: Subscribe |

After receiving the second service discovery message, the third NAN device may determine, based on the real type field for the service discovery message, namely, the service control type', in the data info field in the service control field in the service descriptor attribute (Service Descriptor Attribute, SDA) that is forcibly carried in the service discovery message, whether a service that is required or can be provided by the third NAN device matches the service control type of the service for performing the service discovery by using the first service discovery message.

That the second NAN device generates the second hop count according to a preset rule based on the first hop count may be specifically: the second NAN device performs an operation such as addition/subtraction/multiplication/division on the first hop count and a preset value or performs an operation such as inverting, filling, disordering, or replacing some bits, to obtain the second hop count, provided that the third NAN device can obtain, based on the second hop count, a quantity of times the second service discovery message has been relayed.

For example, the second NAN device adds 1 to the first hop count to obtain the second hop count.

805. The second NAN device sends a second service discovery message, where the second service discovery message carries the second service control type information and first service identifier information.

That the second NAN device sends a second service discovery message is: the second NAN device may send the second service discovery message through broadcasting in a NAN network in which the second NAN device is located, so that the third NAN device within the signal coverage area of the first NAN device can receive the second service discovery message; or the second NAN device may send the second service discovery message to the third NAN device in a unicast manner, provided that the second NAN device can receive the second service discovery message.

Preferably, the second service discovery message further carries the second hop count. When receiving the second service discovery message, the third NAN device may determine whether the second hop count is greater than 0. When the second hop count is greater than 0, it indicates that the second service discovery message has been relayed at least once.

806. A third NAN device determines, based on the second service control type information, whether the second service discovery message is a relayed service discovery message.

The third NAN device determines, based on the second service control type information carried in the second service discovery message, whether the second service discovery message has been relayed. Specifically, when a service control type indicated by the second service control type information is a relayed service type, the third NAN device may directly determine whether the second service discovery message has been relayed. Alternatively, when a service control type indicated by the second service control type information is none of subscribe, publish, and follow-up, the third NAN device may determine that the second service discovery message has been relayed.

807. The third NAN device determines, based on the first service identifier information, whether a service that is subscribed to or provided by the first NAN device to perform the service discovery matches a service corresponding to a service requirement of the third NAN device.

For specific content, refer to step 604 in the foregoing embodiment. Details are not described herein again.

Preferably, the third NAN device may further generate fifth service identifier information based on the service corresponding to the service requirement of the third NAN device, where the fifth service identifier information is used to indicate the service corresponding to the service requirement of the third NAN device, so that the third NAN device can match the fifth service identifier information with the first service identifier information, and when the first service identifier information matches the fifth service identifier information, determine that the service that is subscribed to or published by the first NAN device to perform the service discovery matches the service corresponding to the service requirement of the third NAN device.

When the matching succeeds, step 808 is performed.

808. The third NAN device sends a third service discovery message to the second NAN device.

Specifically, the third service discovery message may include third service control type information, and the third service control type information is used to indicate a control type of the service corresponding to the service requirement of the third NAN device, so that the second NAN device performs, based on the third service control type information, matching with the control type of the service that is subscribed to or published by the first NAN device to perform the service discovery.

For example, after determining that the service that is subscribed to or published by the first NAN device to perform the service discovery matches the service corresponding to the service requirement of the third NAN device, the third NAN device sends the third service discovery message to the second NAN device. The third service discovery message carries the third service control type information, and the control type indicated by the third service control type information is service subscribe. When the control type of the service that is subscribed to or published by the first NAN device to perform the service discovery is service publish, the second NAN device determines that the service corresponding to the service requirement of the third NAN device matches the service that is subscribed to or published by the first NAN device to perform the service discovery and that the control types of the two services are also matched.

809. The second NAN device sends a fourth service discovery message to the third NAN device.

When the second NAN device determines that the control type of the service that is subscribed to or published by the first NAN device to perform the service discovery matches a third service control type, the second NAN device sends the fourth service discovery message to the third NAN device, where the fourth service discovery message is used to indicate, to the third NAN device, that the third service control type matches the control type of the service that is subscribed to or published by the first NAN device to perform the service discovery.

Specifically, the fourth service discovery message may carry information used by the second NAN device to establish a relayed NAN data link to the third NAN device. The information may include time slot (time slot) information and frequency information, the information is used to determine a common time-frequency resource, and the NAN data link is established on the time-frequency resource. In this way, after the third NAN device receives a sixth service response message, the NAN data link is established between the second NAN device and the third NAN device.

Preferably, the second NAN device may further send, to the first NAN device, information used by the second NAN device to establish a relayed NAN data link to the first NAN device. The information may include time slot (time slot) information and frequency information, the information is used to determine a common time-frequency resource, and the NAN data link is established on the time-frequency resource. In this way, after the first NAN device receives the information, the NAN data link is established between the second NAN device and the first NAN device.

810. The second NAN device determines whether a time on the timer is greater than or equal to the effective relay time.

For specific content, refer to step 61 in the foregoing embodiment. Details are not described herein again.

811. The second NAN device stops sending the second service response message to the third NAN device.

According to the service discovery method provided in this embodiment of the present invention, the second NAN device receives the first service discovery message sent by the first NAN device, and sends the second service discovery message to the third NAN device when the second NAN device determines, based on the first hop count and the maximum hop count, that the first service discovery message needs to be relayed, where the second service discovery message carries the second service control type information and the first service identifier information, and the second service control type information different from the first service control type information is obtained after the second NAN device modifies the carried first service control type information. The third NAN device may obtain, based on the second service control type information, the first service control type information, determine that the second service discovery message has been relayed, match, based on the first service control type and the fifth service identifier information, the service that is subscribed to or published by the first NAN device to perform the service discovery with the service corresponding to the service requirement of the third NAN device, and sends the third service discovery message to the second NAN device when the matching succeeds, where the third service discovery message carries the third service control type information indicating the control type of the service corresponding to the service requirement of the third NAN device. The second NAN device may perform, based on the third service control type information, matching with the control type of the service that is subscribed to or published by the first NAN device to perform the service discovery, so that the second NAN device sends a first service response message to the third NAN device when the matching succeeds, to establish a NAN data link between the first NAN device, a service relay device, and a service responding device. When receiving the second service discovery message, a NAN device that does not support the multi-hop service discovery cannot match, based on the second service control type information, the service that is subscribed to or published by the first NAN device to perform the service discovery with a service that is required or provided by the NAN device, and therefore cannot respond to the first NAN device. Therefore, in the service discovery method provided in this embodiment of the present invention, the NAN device that does not support the multi-hop service discovery is enabled not to respond to a relayed multi-hop service discovery message on the premise that the relayed service discovery message is correctly received by a NAN device that supports the multi-hop service discovery.

Embodiment 9

Figure 12A:
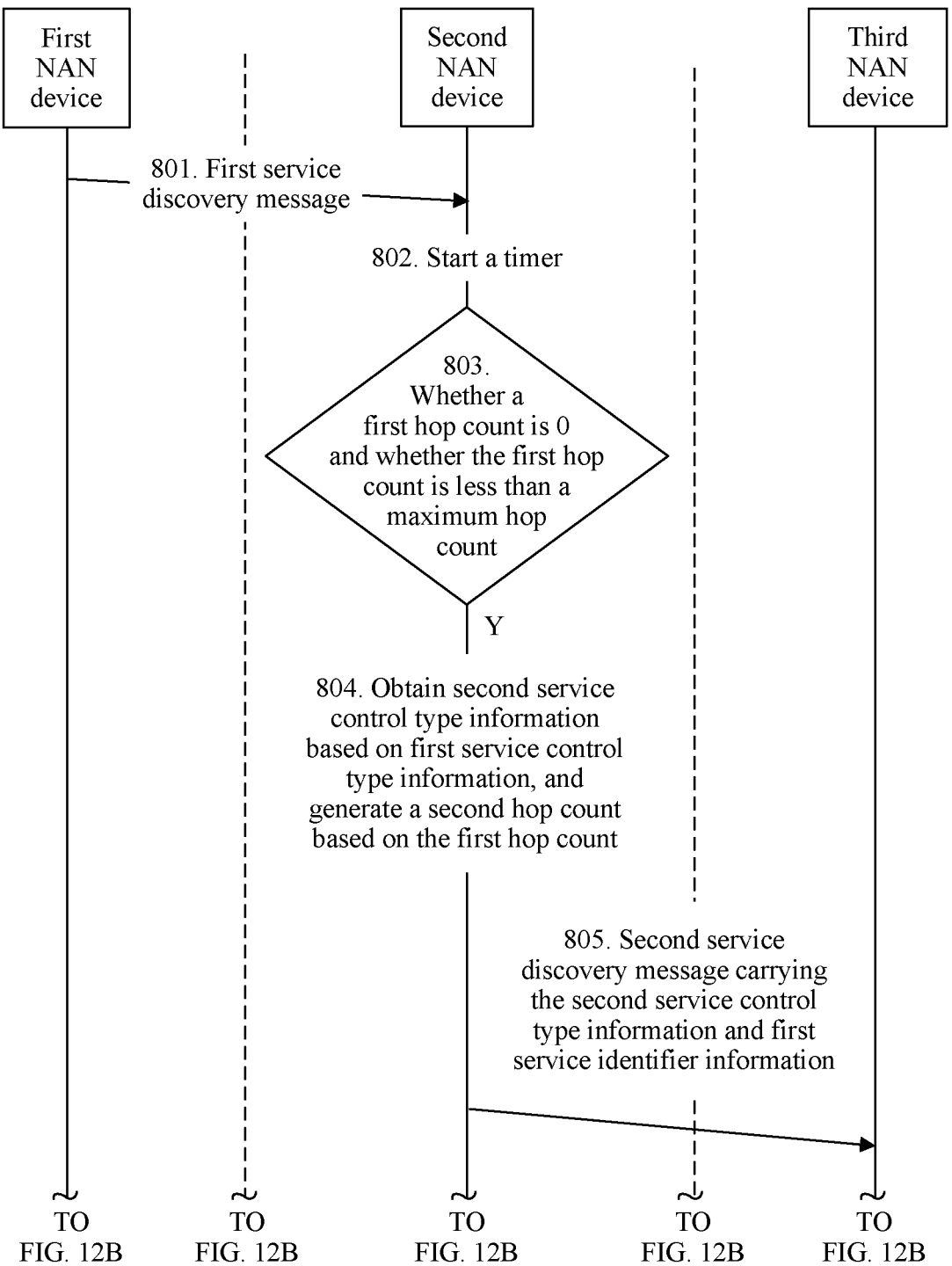
FIG. 12A to FIG. 12C are a schematic flowchart of a service discovery method according to another embodiment of the present invention.
Figure 12B:
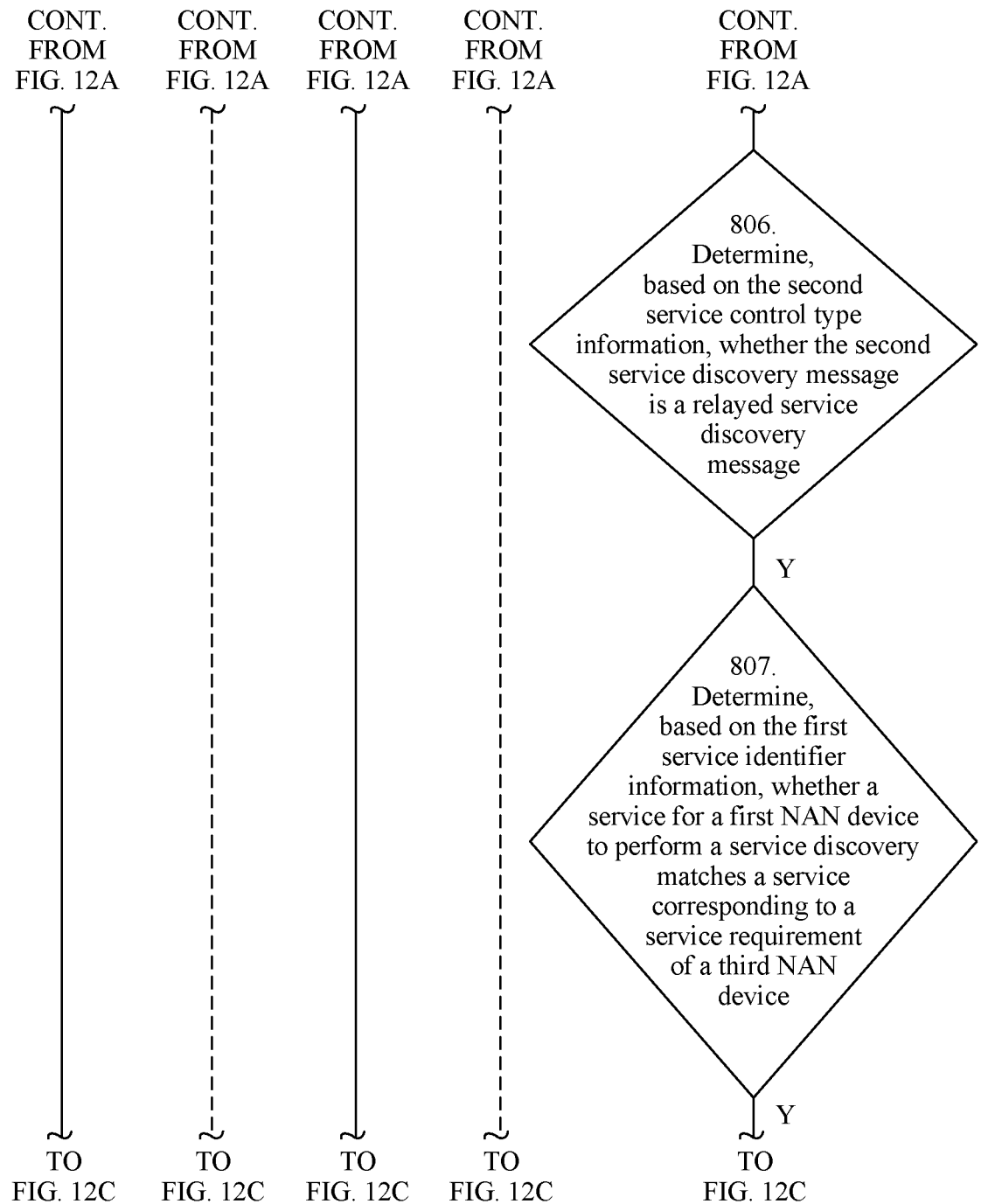
Figure 12C:
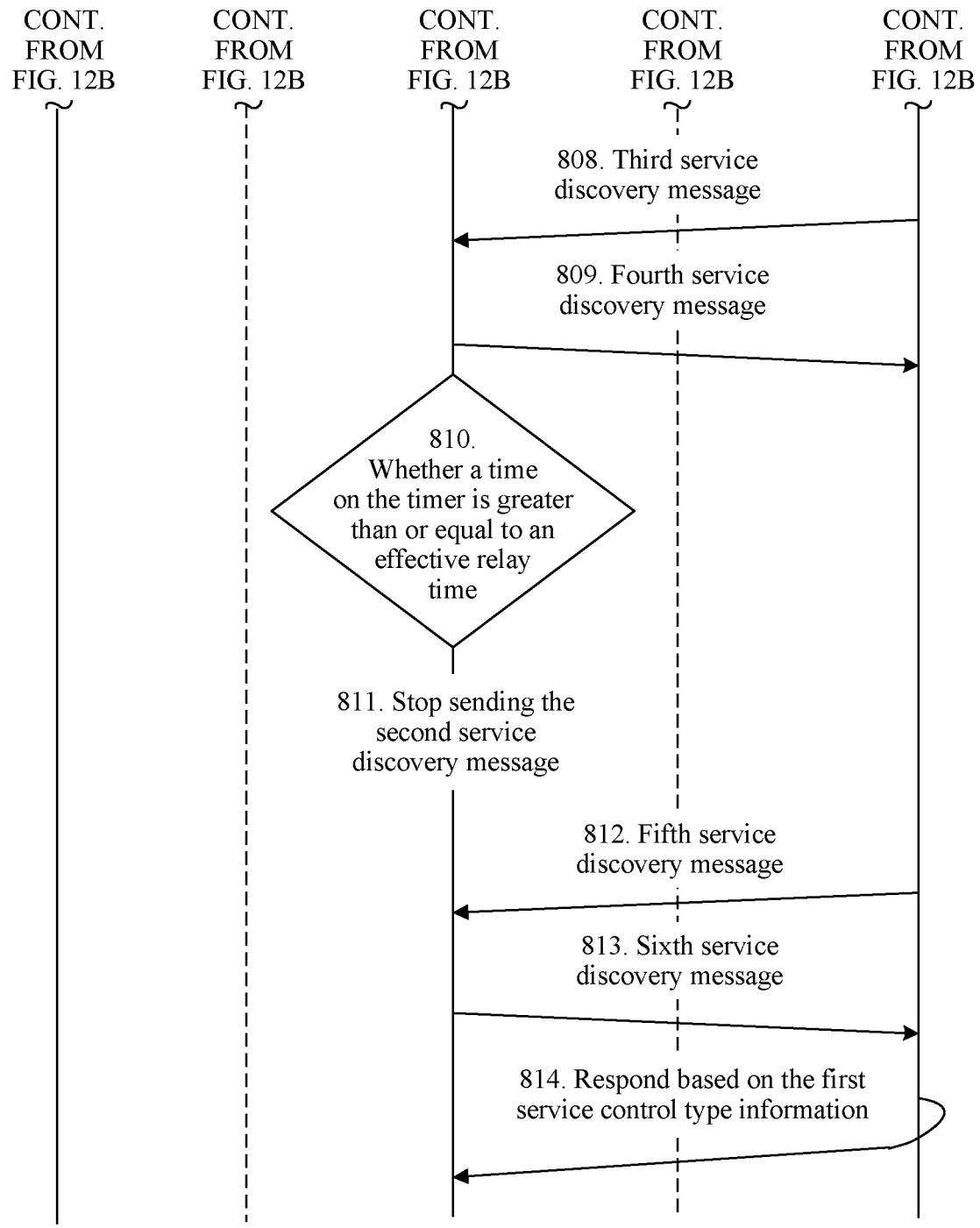

Specifically, as shown in FIG. 12A to FIG. 12C, after step 807, the service discovery method provided in this embodiment of the present invention may further include the following steps.

812. The third NAN device sends a fifth service discovery message to the second NAN device.

The fifth service discovery message may include only service control type request information. The service control type request information is used to request, from the second NAN device, the control type of the service that is subscribed to or published by the first NAN device to perform the service discovery, so that the third NAN device can obtain, from the second NAN device, the control type of the service that is subscribed to or published by the first NAN device to perform the service discovery, and match the control type of the service that is subscribed to or published by the first NAN device to perform the service discovery with the control type of the service corresponding to the service requirement of the third NAN device.

813. The second NAN device receives the fifth service discovery message, and sends a sixth service discovery message to the third NAN device, where the sixth service discovery message includes the first service control type information.

The second NAN device receives the fifth service discovery message sent by the third NAN device. The third NAN device is a NAN device that relays the second service discovery message. When the second NAN device determines that the control type of the service that is subscribed to or published by the first NAN device to perform the service discovery matches the third service control type, the second NAN device sends the sixth service discovery message to the third NAN device, where the sixth service discovery message is used to indicate, to the third NAN device, that the third service control type matches the control type of the service that is subscribed to or published by the first NAN device to perform the service discovery.

814. The third NAN device receives the sixth service discovery message, and responds based on the first service control type information.

Specifically, the third NAN device receives the sixth service discovery message sent by the second NAN device, and responds to the second NAN device based on an indication in the sixth service discovery message.

Preferably, the sixth service discovery message may further include the first service control type information, and the first service control type information is used to indicate the control type of the service that is subscribed to or published by the first NAN device to perform the service discovery. The third NAN device performs, based on the first service control type information, matching with the service corresponding to the service requirement of the third NAN device, and responds when the matching succeeds.

Preferably, when the service type indicated by the first service control type information is service subscribe, and a service indicated by second service identifier information can be provided based on the service requirement of the third NAN device, it is determined that the control type of the service that is subscribed to or published by the first NAN device to perform the service discovery matches the control type of the service corresponding to the service requirement of the third NAN device, in other words, the service that is subscribed to by the first NAN device matches the service requirement of the third NAN device.

When the service type indicated by the first service control type information is service publish, and the third NAN device needs to use a service indicated by second service identifier information, it is determined that the service that is subscribed to or published by the first NAN device to perform the service discovery matches the service requirement of the third NAN device, in other words, the service that is published by the first NAN device matches the service requirement of the third NAN device.

The foregoing mainly describes the solutions in the embodiments of the present invention from the perspective of interaction between network elements. It may be understood that, the service discovery apparatus may be an electronic device and includes a corresponding hardware structure and/or a corresponding software module for implementing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the service discovery apparatus according to the foregoing method embodiment. For example, each function module may be obtained through division for each corresponding function, or two or more functions may be integrated into one processing module. The integrated module may be implemented in a form of hardware, or may be implemented in a form of a software function module. It should be noted that the module division in the embodiments of the present invention is an example, and is merely logical function division. There may be another division manner in actual implementation.

Figure 13A:
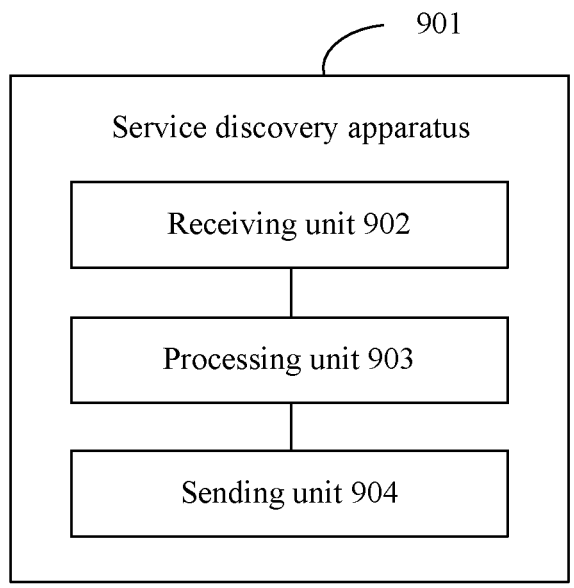
FIG. 13A is a schematic structural diagram of a service discovery apparatus according to an embodiment of the present invention.

When each function module is obtained through division for each corresponding function, FIG. 13A is a possible schematic structural diagram of a service discovery apparatus 901 used in the foregoing embodiment. The service discovery apparatus 901 includes a receiving unit 902, a processing unit 903, and a sending unit 904.

When the service discovery apparatus 901 is the second NAN device, the service discovery apparatus 901 may implement the method performed by the second NAN device in Embodiment 4. The receiving unit 902 is configured to support the service discovery apparatus 901 in performing the process 401 in FIG. 7. The processing unit 903 is configured to control the sending unit 904 to support the service discovery apparatus 901 in performing the process 402 in FIG. 7. All related content of steps in the foregoing method embodiment may be cited in function descriptions of corresponding function modules, and details are not described herein again.

When the service discovery apparatus 901 is the third NAN device, the service discovery apparatus 901 may implement the method performed by the third NAN device in Embodiment 4. The receiving unit 902 is configured to support the service discovery apparatus 901 in performing the process 403 in FIG. 8. The processing unit 903 is configured to control the sending unit 904 to support the service discovery apparatus 901 in performing the process 404 in FIG. 8. All related content of steps in the foregoing method embodiment may be cited in function descriptions of corresponding function modules, and details are not described herein again.

When the service discovery apparatus 901 is the second NAN device, the service discovery apparatus 901 may implement the method performed by the second NAN device in Embodiment 5. The receiving unit 902 is configured to support the service discovery apparatus 901 in performing the process 501 in FIG. 8. The processing unit 903 is configured to control the sending unit 904 to support the service discovery apparatus 901 in performing the process 502 in FIG. 8. All related content of steps in the foregoing method embodiment may be cited in function descriptions of corresponding function modules, and details are not described herein again.

When the service discovery apparatus 901 is the third NAN device, the service discovery apparatus 901 may implement the method performed by the third NAN device in Embodiment 5. The receiving unit 902 is configured to support the service discovery apparatus 901 in performing the process 503 in FIG. 8. The processing unit 903 is configured to control the sending unit 904 to support the service discovery apparatus 901 in performing the process 504 in FIG. 8. All related content of steps in the foregoing method embodiment may be cited in function descriptions of corresponding function modules, and details are not described herein again.

When the service discovery apparatus 901 is the second NAN device, the service discovery apparatus 901 may implement the method performed by the second NAN device in Embodiment 6. The receiving unit 902 is configured to support the service discovery apparatus 901 in performing the processes 601 and 609 in FIG. 9A and FIG. 9B. The processing unit 903 is configured to control the sending unit 904 to support the service discovery apparatus 901 in performing the processes 602 to 605 and the processes 610 to 612 in FIG. 9B. All related content of steps in the foregoing method embodiment may be cited in function descriptions of corresponding function modules, and details are not described herein again.

When the service discovery apparatus 901 is the third NAN device, the service discovery apparatus 901 may implement the method performed by the third NAN device in Embodiment 6. The receiving unit 902 is configured to support the service discovery apparatus 901 in performing the process 605 in FIG. 9A. The processing unit 903 is configured to control the sending unit 904 to support the service discovery apparatus 901 in performing the processes 606 to 609 in FIG. 9A and FIG. 9B. All related content of steps in the foregoing method embodiment may be cited in function descriptions of corresponding function modules, and details are not described herein again.

When the service discovery apparatus 901 is the second NAN device, the service discovery apparatus 901 may implement the method performed by the second NAN device in Embodiment 7. The receiving unit 902 is configured to support the service discovery apparatus 901 in performing the processes 701 and 705 in FIG. 10. The processing unit 903 is configured to control the sending unit 904 to support the service discovery apparatus 901 in performing the process 702 in FIG. 10. All related content of steps in the foregoing method embodiment may be cited in function descriptions of corresponding function modules, and details are not described herein again.

When the service discovery apparatus 901 is the third NAN device, the service discovery apparatus 901 may implement the method performed by the third NAN device in Embodiment 7. The receiving unit 902 is configured to support the service discovery apparatus 901 in performing the process 702 in FIG. 10. The processing unit 903 is configured to control the sending unit 904 to support the service discovery apparatus 901 in performing the processes 703 to 705 in FIG. 10. All related content of steps in the foregoing method embodiment may be cited in function descriptions of corresponding function modules, and details are not described herein again.

When the service discovery apparatus 901 is the second NAN device, the service discovery apparatus 901 may implement the method performed by the second NAN device in Embodiment 8. The receiving unit 902 is configured to support the service discovery apparatus 901 in performing the processes 801 and 808 in FIG. 11A and FIG. 11C and the process 813 in FIG. 12C. The processing unit 903 is configured to control the sending unit 904 to support the service discovery apparatus 901 in performing the processes 802 to 805 and the processes 809 to 811 in FIG. 11A and FIG. 11C and the process 813 in FIG. 12C. All related content of steps in the foregoing method embodiment may be cited in function descriptions of corresponding function modules, and details are not described herein again.

When the service discovery apparatus 901 is the third NAN device, the service discovery apparatus 901 may implement the method performed by the third NAN device in Embodiment 8. The receiving unit 902 is configured to support the service discovery apparatus 901 in performing the processes 805 and 811 in FIG. 11A and FIG. 11C and the process 814 in FIG. 12C. The processing unit 903 is configured to control the sending unit 904 to support the service discovery apparatus 901 in performing the processes 805 and 811 in FIG. 11A and FIG. 11C and the process 814 in FIG. 12C. All related content of steps in the foregoing method embodiment may be cited in function descriptions of corresponding function modules, and details are not described herein again.

Figure 13B:
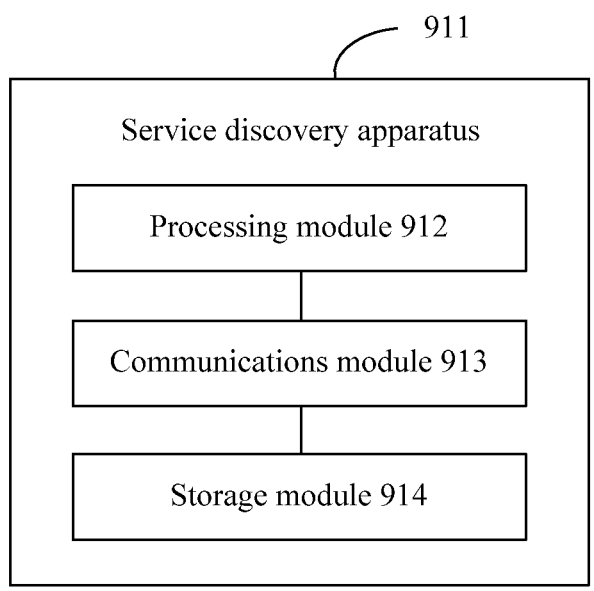
FIG. 13B is a schematic structural diagram of another service discovery apparatus according to another embodiment of the present invention.

When an integrated unit is used, FIG. 13B is another possible schematic structural diagram of a service discovery apparatus used in the foregoing embodiment. A service discovery apparatus 911 includes a processing module 912 and a communications module 913. The service discovery apparatus 911 may further include a storage module 914, configured to store program code and data of the service discovery apparatus 911.

When the service discovery apparatus 901 is the second NAN device, the service discovery apparatus 901 may implement the method performed by the second NAN device in Embodiment 4. The processing module 912 is configured to control and manage an action of the service discovery apparatus. For example, the processing module 912 is configured to control the communications module 913 to support the service discovery apparatus in performing the processes 401 and 402 in FIG. 7 and/or another process of the technology described in this specification.

When the service discovery apparatus 901 is the third NAN device, the service discovery apparatus 901 may implement the method performed by the third NAN device in Embodiment 4. The processing module 912 is configured to control and manage an action of the service discovery apparatus. For example, the processing module 912 is configured to control the communications module 913 to support the service discovery apparatus in performing the processes 403 and 404 in FIG. 7 and/or another process of the technology described in this specification.

When the service discovery apparatus 901 is the second NAN device, the service discovery apparatus 901 may implement the method performed by the second NAN device in Embodiment 5. The processing module 912 is configured to control and manage an action of the service discovery apparatus. For example, the processing module 912 is configured to control the communications module 913 to support the service discovery apparatus in performing the processes 501 and 502 in FIG. 8 and/or another process of the technology described in this specification.

When the service discovery apparatus 901 is the third NAN device, the service discovery apparatus 901 may implement the method performed by the third NAN device in Embodiment 5. The processing module 912 is configured to control and manage an action of the service discovery apparatus. For example, the processing module 912 is configured to control the communications module 913 to support the service discovery apparatus in performing the processes 503 and 504 in FIG. 8 and/or another process of the technology described in this specification.

When the service discovery apparatus 901 is the second NAN device, the service discovery apparatus 901 may implement the method performed by the second NAN device in Embodiment 6. The processing module 912 is configured to control and manage an action of the service discovery apparatus. For example, the processing module 912 is configured to control the communications module 913 to support the service discovery apparatus in performing the processes 601 to 605 and the processes 609 to 612 in FIG. 9B and/or another process of the technology described in this specification.

When the service discovery apparatus 901 is the third NAN device, the service discovery apparatus 901 may implement the method performed by the third NAN device in Embodiment 6. The processing module 912 is configured to control and manage an action of the service discovery apparatus. For example, the processing module 912 is configured to control the communications module 913 to support the service discovery apparatus in performing the processes 605 to 609 in FIG. 9A and FIG. 9B and/or another process of the technology described in this specification.

When the service discovery apparatus 901 is the second NAN device, the service discovery apparatus 901 may implement the method performed by the second NAN device in Embodiment 7. The processing module 912 is configured to control and manage an action of the service discovery apparatus. For example, the processing module 912 is configured to control the communications module 913 to support the service discovery apparatus in performing the processes 701, 702, and 705 in FIG. 10 and/or another process of the technology described in this specification.

When the service discovery apparatus 901 is the third NAN device, the service discovery apparatus 901 may implement the method performed by the third NAN device in Embodiment 7. The processing module 912 is configured to control and manage an action of the service discovery apparatus. For example, the processing module 912 is configured to control the communications module 913 to support the service discovery apparatus in performing the processes 702 to 705 in FIG. 10 and/or another process of the technology described in this specification.

When the service discovery apparatus 901 is the second NAN device, the service discovery apparatus 901 may implement the method performed by the second NAN device in Embodiment 8. The processing module 912 is configured to control and manage an action of the service discovery apparatus. For example, the processing module 912 is configured to control the communications module 913 to support the service discovery apparatus in performing the processes 811 to 805 and the processes 808 to 811 in FIG. 11A to FIG. 11C and the process 813 in FIG. 12C and/or another process of the technology described in this specification.

When the service discovery apparatus 901 is the third NAN device, the service discovery apparatus 901 may implement the method performed by the third NAN device in Embodiment 8. The processing module 912 is configured to control and manage an action of the service discovery apparatus. For example, the processing module 912 is configured to control the communications module 913 to support the service discovery apparatus in performing the processes 805 to 808 and the process 811 in FIG. 11A to FIG. 11C and the processes 812 and 814 in FIG. 12C and/or another process of the technology described in this specification.

The processing module 912 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or a combination thereof. The processing module may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 913 may be implemented by using an interface circuit, for example, a transceiver, a transceiver circuit, or a communications interface. The storage module 914 may be a memory.

Figure 13C:
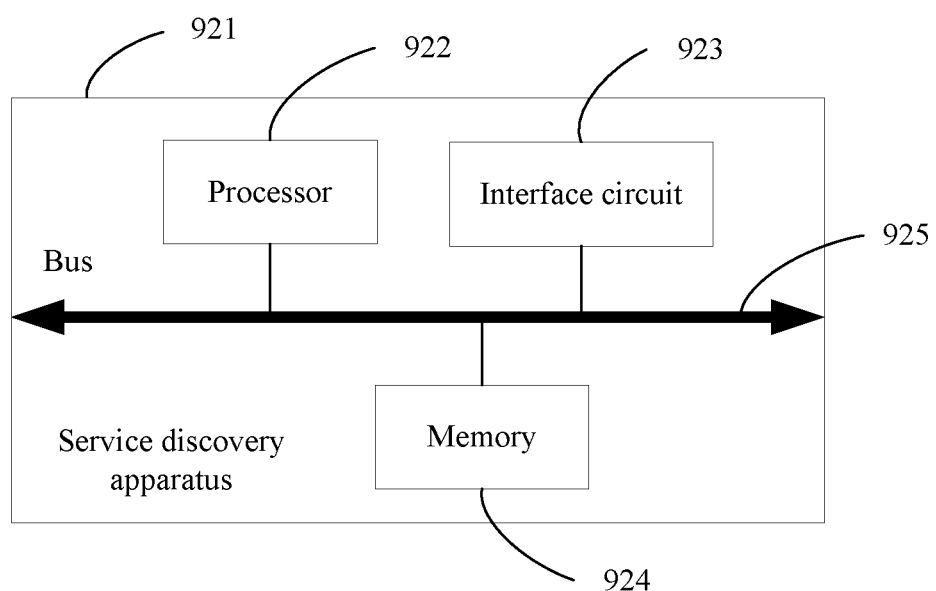
FIG. 13C is a schematic structural diagram of a service discovery apparatus according to another embodiment of the present invention.

When the processing module 912 is a processor, the communications module 913 is an interface circuit, and the storage module 914 is a memory, the service discovery apparatus in this embodiment of the present invention may be a service discovery apparatus shown in FIG. 13C.

Referring to FIG. 13C, the service discovery apparatus 921 includes a processor 922, an interface circuit 923, a memory 924, and a bus 925. The processor 922, the interface circuit 923, and the memory 924 are connected to each other through the bus 925. The bus 925 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 13C, but this does not mean that there is only one bus or only one type of bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM for short, English full name: Read-Only Memory), a random access memory (RAM for short, English full name: Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service discovery method, comprising:
    receiving, by a third neighbor awareness networking (NAN) device, a second service discovery message from a second NAN device and used for a service discovery, wherein the second service discovery message comprises second service identifier information and multi-hop service indication information, wherein the second service identifier information indicates information about a service that is subscribed to or published by using the second service discovery message, wherein the multi-hop service indication information indicates that the second service discovery message is used to relay the service discovery, and wherein the second service discovery message is generated by the second NAN device based on a first service discovery message, wherein the first service discovery message is received by the second NAN device from a first NAN device and used for the service discovery, wherein the second NAN device serves as a service relay device that relays the service discovery initiated by the first NAN device, wherein the first service discovery message comprises first service identifier information, wherein the first service identifier information indicates information about a service that is subscribed to or published by using the first service discovery message, and wherein the second service identifier information is different from the first service identifier information;
    determining, by the third NAN device based on the second service identifier information, whether a service that is subscribed to or published by the first NAN device matches a service requirement of the third NAN device when the third NAN device determines, based on the multi-hop service indication information, that the second service discovery message is used to relay the service discovery; and
    sending, by the third NAN device, a service matching response message to the second NAN device when the third NAN device determines that the service that is subscribed to or published by the first NAN device matches the service requirement of the third NAN device.

2. The service discovery method according to claim 1, wherein determining, by the third NAN device based on the second service identifier information, whether the service that is subscribed to or published by the first NAN device matches the service requirement of the third NAN device comprises:
    obtaining, based on the second service identifier information, the first service identifier information corresponding to the service that is subscribed to or published by the first NAN device; and
    determining whether the first service identifier information matches third service identifier information, wherein the third service identifier information indicates a service that is subscribed to or published based on the service requirement of the third NAN device.

3. The service discovery method according to claim 1, wherein determining, by the third NAN device based on the second service identifier information, whether the service that is subscribed to or published by the first NAN device matches the service requirement of the third NAN device comprises:
    generating fourth service identifier information based on third service identifier information, wherein the third service identifier information indicates a service corresponding to the service requirement of the third NAN device; and
    determining whether the second service identifier information matches the fourth service identifier information.

4. The service discovery method according to claim 1, wherein sending, by the third NAN device, the service matching response message to the second NAN device comprises sending, by the third NAN device when the second service discovery message is a service descriptor frame (SDF) subscribe service subscribe message, an SDF publish service publish message to the second NAN device.

5. The service discovery method according to claim 4, wherein the SDF publish service publish message sent to the second NAN device carries multi-hop service matching indication information, wherein the multi-hop service matching indication information indicates that the service matching response message responds to a relayed service discovery message.

6. The service discovery method according to claim 1, wherein sending, by the third NAN device, the service matching response message to the second NAN device comprises sending, by the third NAN device when the second service discovery message is an SDF publish service publish message, an SDF follow-up service follow-up message to the second NAN device.

7. The service discovery method according to claim 6, wherein the SDF follow-up service follow-up message sent to the second NAN device carries multi-hop service matching indication information, wherein the multi-hop service matching indication information indicates that the service matching response message responds to a relayed service discovery message.

8. A service discovery apparatus, wherein the service discovery apparatus is a second neighbor awareness networking (NAN) device and comprises:
an interface circuit; and
a processor coupled to the interface circuit and configured to:
receive, using the interface circuit, a first service discovery message from a first NAN device and used for a service discovery, wherein the first service discovery message comprises first service identifier information, and wherein the first service identifier information indicates information about a service that is subscribed to or published using the first service discovery message; and
generate, based on the first service discovery message when the service discovery apparatus serves as a service relay device that relays the service discovery initiated by the first NAN device, a second service discovery message used for the service discovery by generating a second service identifier information based on the first service identifier information; and
send, using the interface circuit, the second service discovery message,
wherein the second service discovery message comprises the second service identifier information and multi-hop service indication information, wherein the second service identifier information indicates information about a service that is subscribed to or published by using the second service discovery message, wherein the second service identifier information is different from the first service identifier information, and wherein the multi-hop service indication information indicates that the second service discovery message is used to relay the service discovery.

9. The service discovery apparatus according to claim 8, wherein the first service discovery message further includes an effective relay time, and wherein the processor is further configured to:

start a timer when the first service discovery message is received; and
control the interface circuit to cancel sending of the second service discovery message when a time on the timer is greater than or equal to the effective relay time.

10. A service discovery apparatus, wherein the service discovery apparatus is a third neighbor awareness networking (NAND device and comprises:
a processor; and
an interface circuit coupled to the processor, wherein the interface circuit is configured to receive a second service discovery message from a second NAN device and used for a service discovery, wherein the second service discovery message includes second service identifier information and multi-hop service indication information, wherein the second service identifier information indicates information about a service that is subscribed to or published by using the second service discovery message, wherein the multi-hop service indication information indicates that the second service discovery message is used to relay the service discovery, wherein the second service discovery message is generated by the second NAN device based on a first service discovery message, wherein the first service discovery message is received by the second NAN device from a first NAN device and used for the service discovery, wherein the second NAN device serves as a service relay device that relays the service discovery initiated by the first NAN device, wherein the first service discovery message includes first service identifier information, wherein the first service identifier information indicates information about a service that is subscribed to or published by using the first service discovery message, wherein the second service identifier information is different from the first service identifier information, and
wherein the processor is configured to:
determine, based on the second service identifier information when determining, based on the multi-hop service indication information, that the second service discovery message is used to relay the service discovery, whether a service that is subscribed to or published by the first NAN device matches a service requirement of the service discovery apparatus; and
control the interface circuit to send a service matching response message to the second NAN device when determining that the service that is subscribed to or published by the first NAN device matches the service requirement of the service discovery apparatus.

11. The service discovery apparatus according to claim 10, wherein the processor is further configured to:
obtain, based on the second service identifier information, the first service identifier information corresponding to the service that is subscribed to or published by the first NAN device; and
determine whether the first service identifier information matches third service identifier information, wherein the third service identifier information indicates a service corresponding to the service requirement of the service discovery apparatus.

12. The service discovery apparatus according to claim 10, wherein the processor is further configured to:
generate fourth service identifier information based on third service identifier information, wherein the third service identifier information indicates a service corresponding to the service requirement of the service discovery apparatus; and determine whether the second service identifier information matches the fourth service identifier information.

13. The service discovery apparatus according to claim 10, wherein the processor is further configured to control the interface circuit to send a service descriptor frame (SDF) an SDF publish service publish message to the second NAN device when the second service discovery message is an SDF subscribe service subscribe message.

14. The service discovery apparatus according to claim 13, wherein the SDF publish service publish message sent to the second NAN device carries multi-hop service matching indication information, and wherein the multi-hop service matching indication information indicates that the service matching response message is used to respond to a relayed service discovery message.

15. The service discovery apparatus according to claim 10, wherein the processor is further configured to control the interface circuit to send an SDF follow-up service follow-up message to the second NAN device when the second service discovery message is an SDF publish service publish message.

16. The service discovery apparatus according to claim 15, wherein the SDF follow-up service follow-up message sent to the second NAN device carries multi-hop service matching indication information, and wherein the multi-hop service matching indication information indicates that the service matching response message is used to respond to a relayed service discovery message.

* * * * *

UNITED STATES PATENT AND TRADEMARK OFFICE
CERTIFICATE OF CORRECTION

PATENT NO. : 10,819,778 B2  
APPLICATION NO. : 16/348260  
DATED : October 27, 2020  
INVENTOR(S) : Xiaoxian Li and Ping Fang Page 1 of 1

It is certified that error appears in the above-identified patent and that said Letters Patent is hereby corrected as shown below:

In the Claims

Claim 1, Column 74, Line 8: "service discovery, and" should read "service discovery,"

Claim 10, Column 76, Line 8: "(NAND device and" should read "(NAND) device and"

Claim 13, Column 77, Line 8 and 9: "frame (SDF) an SDF publish" should read "frame (SDF) publish"

Signed and Sealed this  
Fifteenth Day of December, 2020

Andrei Iancu  
*Director of the United States Patent and Trademark Office*